US012564777B2

(12) United States Patent
Bologna et al.

(10) Patent No.: US 12,564,777 B2
(45) Date of Patent: Mar. 3, 2026

(54) SYSTEM AND METHOD OF ASSEMBLING A PROTECTIVE SPORTS HELMET

(71) Applicant: Riddell, Inc., Des Plaines, IL (US)

(72) Inventors: Vittorio Bologna, Des Plaines, IL (US); Murphy Gillogly, Des Plaines, IL (US); Andrew Tryner, Des Plaines, IL (US); Thad M. Ide, Des Plaines, IL (US)

(73) Assignee: Riddell, Inc., Des Plaines, IL (US)

( * ) Notice: Subject to any disclaimer, the term of this patent is extended or adjusted under 35 U.S.C. 154(b) by 93 days.

(21) Appl. No.: 18/360,196

(22) Filed: Jul. 27, 2023

(65) Prior Publication Data

US 2023/0364489 A1     Nov. 16, 2023

Related U.S. Application Data

(63) Continuation of application No. 17/567,760, filed on Jan. 3, 2022, now Pat. No. 11,712,615, which is a
(Continued)

(51) Int. Cl.
*A42B 3/20*     (2006.01)
*A42B 3/04*     (2006.01)
(Continued)

(52) U.S. Cl.
CPC ............ *A63B 71/10* (2013.01); *A42B 3/0406* (2013.01); *A42B 3/08* (2013.01); *A42B 3/125* (2013.01);
(Continued)

(58) Field of Classification Search
CPC ..... A63B 71/10; A63B 71/1225; G06F 30/00; A42B 3/0406; A42B 3/08; A42B 3/125;
(Continued)

(56) References Cited

U.S. PATENT DOCUMENTS

| 676,293 A | 6/1901 | Samuel |
| 1,060,220 A | 4/1913 | White |
| | (Continued) | |

FOREIGN PATENT DOCUMENTS

| CA | 100226 | 7/1906 |
| CA | 2778050 | 4/2011 |
| | (Continued) | |

OTHER PUBLICATIONS

International Search Report and Written Opinion issued in PCT/US14/11877 dated Apr. 24, 2014 (12 pages).
(Continued)

*Primary Examiner* — Thuy Dao
(74) *Attorney, Agent, or Firm* — Barnes & Thornburg LLP

(57)     ABSTRACT

A partial bespoke protective sports equipment to be worn by a player engaged in a sporting activity is provided. The partial bespoke sports equipment system includes methods for acquiring, storing and processing a player's unique data, namely the anatomical features of the body part against which the partial bespoke equipment is worn. The systems also includes methods of using the player's unique data to manufacture the partial bespoke protective equipment with a partially custom formed internal padding. The system and method allows for the design and manufacture of partial bespoke protective sports equipment that is purposely designed and manufactured to substantially match the anatomical specifications of the player's body part.

39 Claims, 23 Drawing Sheets

Related U.S. Application Data continuation of application No. 17/026,882, filed on Sep. 21, 2020, now Pat. No. 11,213,736, which is a continuation of application No. 15/655,535, filed on Jul. 20, 2017, now Pat. No. 10,780,338.

(60) Provisional application No. 62/364,629, filed on Jul. 20, 2016.

(51) Int. Cl.

| | |
|---|---|
| A42B 3/06 | (2006.01) |
| A42B 3/08 | (2006.01) |
| A42B 3/12 | (2006.01) |
| A42B 3/28 | (2006.01) |
| A42C 2/00 | (2006.01) |
| A63B 71/10 | (2006.01) |
| A63B 71/12 | (2006.01) |
| G06F 30/00 | (2020.01) |
| G06F 119/18 | (2020.01) |

(52) U.S. Cl.
CPC ............... *A42B 3/127* (2013.01); *A42B 3/20* (2013.01); *A42B 3/283* (2013.01); *A42C 2/002* (2013.01); *A42C 2/007* (2013.01); *A63B 71/1225* (2013.01); *G06F 30/00* (2020.01); *A63B 2071/1208* (2013.01); *A63B 2071/1233* (2013.01); *A63B 2071/1241* (2013.01); *A63B 2071/125* (2013.01); *A63B 2071/1258* (2013.01); *G06F 2119/18* (2020.01)

(58) Field of Classification Search
CPC ........... A42B 3/127; A42B 3/20; A42B 3/283; A42B 3/04; A42B 3/046; A42C 2/002; A42C 2/007; A42C 2/00; G06T 17/00
See application file for complete search history.

(56) References Cited

U.S. PATENT DOCUMENTS

| | | |
|---|---|---|
| 1,244,559 A | 10/1917 | Stocks |
| 1,522,952 A | 1/1925 | Goldsmith |
| 1,655,007 A | 1/1928 | Boettge |
| 1,691,202 A | 11/1928 | La Van |
| 1,705,879 A | 3/1929 | Rodgers |
| D81,055 S | 4/1930 | Heater |
| 1,808,966 A | 6/1931 | Morgan |
| 1,841,232 A | 1/1932 | Wells |
| 2,140,716 A | 12/1938 | Pryale |
| 2,293,308 A | 8/1942 | Riddell, Sr. |
| 2,296,335 A | 9/1942 | Brady |
| 2,515,807 A | 7/1950 | Spooner |
| 2,634,415 A | 4/1953 | Turner |
| 2,688,747 A | 9/1954 | Marx |
| 2,785,404 A | 3/1957 | Strohm |
| 3,039,109 A | 6/1962 | Simpson |
| 3,088,002 A | 4/1963 | Heisig |
| 3,116,490 A | 1/1964 | Zbikowski |
| 3,153,792 A | 10/1964 | Marietta |
| 3,153,973 A | 10/1964 | Marietta |
| 3,155,981 A | 11/1964 | Mckissick |
| 3,166,761 A | 1/1965 | Strohm |
| 3,174,155 A | 3/1965 | Pitman |
| 3,186,004 A | 6/1965 | Carlini |
| 3,197,784 A | 8/1965 | Richard |
| 3,208,080 A | 9/1965 | Hirsch |
| 3,273,162 A | 9/1966 | Andrews, III |
| 3,274,613 A | 9/1966 | Sowle |
| 3,296,582 A | 1/1967 | Ide |
| 3,344,433 A | 10/1967 | Stapenhill |
| 3,364,499 A | 1/1968 | Kwoka |
| 3,373,443 A | 3/1968 | Marietta |
| 3,418,657 A | 12/1968 | Lastnik |
| 3,447,162 A | 6/1969 | Aileo |
| 3,447,163 A | 6/1969 | Bothwell |
| 3,462,763 A | 8/1969 | Schneider |
| 3,501,772 A | 3/1970 | Wyckoff |
| 3,551,911 A | 1/1971 | Holden |
| 3,566,409 A | 3/1971 | Hopper |
| 3,568,210 A | 3/1971 | Marietta |
| 3,582,990 A | 6/1971 | Frieder |
| 3,590,388 A | 7/1971 | Holt |
| 3,600,714 A | 8/1971 | Greathouse |
| 3,609,764 A | 10/1971 | Morgan |
| 3,616,463 A | 11/1971 | Theodore et al. |
| 3,629,864 A | 12/1971 | Latina |
| 3,646,606 A | 2/1972 | Buxton |
| 3,713,640 A | 1/1973 | Margan |
| 3,720,955 A | 3/1973 | Rawlings |
| 3,729,744 A | 5/1973 | Rappleyea |
| 3,761,959 A | 10/1973 | Dunning |
| 3,785,395 A | 1/1974 | Andreasson |
| 3,787,895 A | 1/1974 | Belvedere |
| 3,815,152 A | 6/1974 | Bednarczuk |
| 3,818,508 A | 6/1974 | Lammers |
| 3,820,163 A | 6/1974 | Rappleyea |
| 3,843,970 A | 10/1974 | Marietta |
| 3,845,389 A | 10/1974 | Phillips |
| 3,860,966 A | 1/1975 | Brown |
| 3,872,511 A | 3/1975 | Nichols |
| 3,882,547 A | 5/1975 | Morgan |
| 3,897,597 A | 8/1975 | Kasper |
| 3,946,441 A | 3/1976 | Johnson |
| 3,972,038 A | 7/1976 | Fletcher |
| 3,972,320 A | 8/1976 | Kalman |
| 3,992,721 A | 11/1976 | Morton |
| 3,999,220 A | 12/1976 | Keltner |
| 4,006,496 A | 2/1977 | Marker |
| 4,023,209 A | 5/1977 | Frieder |
| 4,023,213 A | 5/1977 | Rovani |
| 4,038,700 A | 8/1977 | Gyory |
| 4,054,953 A | 10/1977 | De Barsy |
| 4,060,855 A | 12/1977 | Rappleyea |
| 4,064,565 A | 12/1977 | Griffiths |
| 4,101,983 A | 7/1978 | Dera |
| 4,124,208 A | 11/1978 | Burns |
| 4,134,155 A | 1/1979 | Robertson |
| 4,136,403 A | 1/1979 | Walther |
| 4,168,542 A | 9/1979 | Small |
| 4,196,429 A | 4/1980 | Davis |
| D257,073 S | 9/1980 | Jenkins |
| 4,223,409 A | 9/1980 | Lee |
| 4,239,106 A | 12/1980 | Aileo |
| 4,250,894 A | 2/1981 | Frei |
| 4,282,610 A | 8/1981 | Steigerwald |
| 4,287,613 A | 9/1981 | Schulz |
| 4,300,242 A | 11/1981 | Nava |
| 4,307,471 A | 12/1981 | Lovell |
| 4,345,338 A | 8/1982 | Frieder, Jr. |
| 4,354,284 A | 10/1982 | Gooding |
| D267,287 S | 12/1982 | Gooding |
| 4,363,140 A | 12/1982 | Correale |
| 4,370,759 A | 2/1983 | Zide |
| 4,375,108 A | 3/1983 | Gooding |
| 4,404,690 A | 9/1983 | Farquharson |
| D271,249 S | 11/1983 | Farquharson |
| D271,347 S | 11/1983 | Bourque |
| 4,432,099 A | 2/1984 | Grick |
| 4,440,160 A | 4/1984 | Fischell |
| 4,466,138 A | 8/1984 | Gessalin |
| 4,468,656 A | 8/1984 | Clifford |
| 4,478,587 A | 10/1984 | Mackal |
| 4,502,035 A | 2/1985 | Obenauf |
| 4,534,068 A | 8/1985 | Mitchell |
| 4,558,470 A | 12/1985 | Mitchell |
| 4,566,137 A | 1/1986 | Gooding |
| 4,586,200 A | 5/1986 | Poon |
| 4,587,677 A | 5/1986 | Clement |
| 4,590,801 A | 5/1986 | Merhav |
| 4,608,998 A | 9/1986 | Murdock |
| 4,665,569 A | 5/1987 | Santini |
| 4,665,748 A | 5/1987 | Peters |
| 4,691,556 A | 9/1987 | Mellander |

(56) References Cited

U.S. PATENT DOCUMENTS

| | | | |
|---|---|---|---|
| 4,724,549 | A | 2/1988 | Herder |
| D295,902 | S | 5/1988 | Foulkes |
| 4,761,005 | A | 8/1988 | French |
| 4,763,275 | A | 8/1988 | Carlin |
| 4,763,284 | A | 8/1988 | Carlin |
| 4,766,614 | A | 8/1988 | Cantwell |
| 4,776,043 | A | 10/1988 | Coleman |
| D298,367 | S | 11/1988 | Ball |
| D299,978 | S | 2/1989 | Chiarella |
| 4,853,980 | A | 8/1989 | Zarotti |
| 4,856,119 | A | 8/1989 | Hermann |
| 4,873,867 | A | 10/1989 | Mcpherson |
| 4,883,271 | A | 11/1989 | French |
| 4,903,346 | A | 2/1990 | Reddemann |
| 4,916,759 | A | 4/1990 | Arai |
| 4,937,888 | A | 7/1990 | Straus |
| 4,982,452 | A | 1/1991 | Chaise |
| 4,996,724 | A | 3/1991 | Dextrase |
| 4,996,877 | A | 3/1991 | Stewart |
| 5,014,365 | A | 5/1991 | Schulz |
| 5,023,958 | A | 6/1991 | Rotzin |
| 5,031,246 | A | 7/1991 | Kronenberger |
| 5,035,009 | A | 7/1991 | Wingo, Jr. |
| 5,056,162 | A | 10/1991 | Tirums |
| 5,101,517 | A | 4/1992 | Douglas |
| 5,101,580 | A | 4/1992 | Lyden |
| 5,136,728 | A | 8/1992 | Kamata |
| 5,150,479 | A | 9/1992 | Oleson |
| 5,175,889 | A | 1/1993 | Infusino |
| 5,203,034 | A | 4/1993 | Foehl |
| 5,204,998 | A | 4/1993 | Liu |
| 5,221,088 | A | 6/1993 | Mcteigue |
| 5,231,703 | A | 8/1993 | Garneau |
| 5,263,203 | A | 11/1993 | Kraemer |
| 5,271,103 | A | 12/1993 | Darnell |
| 5,272,773 | A | 12/1993 | Kamata |
| 5,287,562 | A | 2/1994 | Rush |
| 5,293,649 | A | 3/1994 | Corpus |
| 5,298,208 | A | 3/1994 | Sibley |
| 5,309,576 | A | 5/1994 | Broersma |
| 5,315,718 | A | 5/1994 | Barson |
| D348,752 | S | 7/1994 | Ho |
| 5,327,588 | A | 7/1994 | Garneau |
| 5,331,969 | A | 7/1994 | Silberstein |
| 5,345,614 | A | 9/1994 | Tanaka |
| 5,348,008 | A | 9/1994 | Bornn |
| 5,383,363 | A | 1/1995 | Kulmaczewski |
| 5,408,879 | A | 4/1995 | Vreeburg |
| D358,003 | S | 5/1995 | Losi, II |
| 5,450,631 | A | 9/1995 | Egger |
| 5,461,730 | A | 10/1995 | Carrington |
| D364,487 | S | 11/1995 | Tutton |
| 5,473,527 | A | 12/1995 | Gold |
| 5,475,878 | A | 12/1995 | Dawn |
| 5,487,305 | A | 1/1996 | Ristic |
| 5,515,546 | A | 5/1996 | Shifrin |
| 5,517,691 | A | 5/1996 | Blake |
| 5,517,695 | A | 5/1996 | Murray |
| 5,518,802 | A | 5/1996 | Colvin |
| 5,522,091 | A | 6/1996 | Rudolf |
| D371,867 | S | 7/1996 | Losi, II |
| D371,869 | S | 7/1996 | Chen |
| D372,342 | S | 7/1996 | Chen |
| 5,534,343 | A | 7/1996 | Landi |
| 5,539,935 | A | 7/1996 | Rush, III |
| 5,544,367 | A | 8/1996 | March, II |
| 5,546,609 | A | 8/1996 | Rush, III |
| 5,553,330 | A | 9/1996 | Carveth |
| 5,561,866 | A | 10/1996 | Ross |
| 5,596,491 | A | 1/1997 | Gold |
| D378,624 | S | 3/1997 | Chartrand |
| 5,615,132 | A | 3/1997 | Horton |
| 5,621,922 | A | 4/1997 | Rush, III |
| 5,645,077 | A | 7/1997 | Foxlin |
| 5,661,854 | A | 9/1997 | March, II |
| 5,666,670 | A | 9/1997 | Ryan |
| 5,697,099 | A | 12/1997 | Siska, Jr. |
| 5,704,707 | A | 1/1998 | Gebelein |
| 5,708,988 | A | 1/1998 | Mcguine |
| 5,713,082 | A | 2/1998 | Bassette |
| 5,723,786 | A | 3/1998 | Klapman |
| 5,732,414 | A | 3/1998 | Monica |
| 5,745,028 | A | 4/1998 | Hock |
| 5,745,029 | A | 4/1998 | Garcia |
| 5,774,901 | A | 7/1998 | Minami |
| 5,787,513 | A | 8/1998 | Sharmat |
| 5,794,271 | A | 8/1998 | Hastings |
| 5,799,337 | A | 9/1998 | Brown |
| 5,819,206 | A | 10/1998 | Horton |
| 5,829,065 | A | 11/1998 | Cahill |
| 5,833,796 | A | 11/1998 | Matich |
| 5,856,811 | A | 1/1999 | Shih |
| 5,867,840 | A | 2/1999 | Hirosawa |
| 5,883,145 | A | 3/1999 | Hurley |
| 5,891,372 | A | 4/1999 | Besset |
| 5,896,590 | A | 4/1999 | Fleisch |
| 5,916,181 | A | 6/1999 | Socci |
| 5,930,840 | A | 8/1999 | Arai |
| 5,940,890 | A | 8/1999 | Dallas |
| 5,941,272 | A | 8/1999 | Feldman |
| 5,943,706 | A | 8/1999 | Miyajima |
| 5,950,243 | A | 9/1999 | Winters |
| 5,950,244 | A | 9/1999 | Fournier |
| 5,953,761 | A | 9/1999 | Jurga |
| 5,956,777 | A | 9/1999 | Popovich |
| 5,978,972 | A | 11/1999 | Stewart |
| 5,978,973 | A | 11/1999 | Chartrand |
| 6,002,994 | A | 12/1999 | Lane |
| 6,009,563 | A | 1/2000 | Swanson |
| 6,032,297 | A | 3/2000 | Barthold |
| 6,032,530 | A | 3/2000 | Hock |
| 6,056,674 | A | 5/2000 | Cook |
| 6,057,758 | A | 5/2000 | Dempsey |
| 6,070,271 | A | 6/2000 | Williams |
| 6,073,271 | A | 6/2000 | Alexander |
| 6,079,053 | A | 6/2000 | Clover, Jr. |
| 6,088,840 | A | 7/2000 | Im |
| 6,089,251 | A | 7/2000 | Pestel |
| 6,090,044 | A | 7/2000 | Bishop |
| 6,128,786 | A | 10/2000 | Maddux |
| 6,131,196 | A | 10/2000 | Vallion |
| 6,138,284 | A | 10/2000 | Arai |
| 6,154,889 | A | 12/2000 | Moore, III |
| 6,178,560 | B1 | 1/2001 | Halstead |
| D437,472 | S | 2/2001 | Ruscitti |
| 6,186,145 | B1 | 2/2001 | Brown |
| 6,189,156 | B1 | 2/2001 | Loiars |
| 6,198,394 | B1 | 3/2001 | Jacobsen |
| 6,204,813 | B1 | 3/2001 | Wadell |
| 6,219,850 | B1 | 4/2001 | Halstead |
| 6,226,801 | B1 | 5/2001 | Alexander |
| D445,218 | S | 7/2001 | Watters |
| 6,259,944 | B1 | 7/2001 | Margulis |
| 6,261,042 | B1 | 7/2001 | Pratt |
| 6,272,692 | B1 | 8/2001 | Abraham |
| 6,282,724 | B1 | 9/2001 | Abraham |
| 6,292,952 | B1 | 9/2001 | Watters |
| 6,298,483 | B1 | 10/2001 | Schiebl |
| 6,298,497 | B1 | 10/2001 | Chartrand |
| 6,301,718 | B1 | 10/2001 | Rigal |
| 6,302,844 | B1 | 10/2001 | Walker |
| 6,305,030 | B1 | 10/2001 | Brignone |
| 6,314,586 | B1 | 11/2001 | Duguid |
| 6,331,168 | B1 | 12/2001 | Socci |
| 6,332,228 | B1 | 12/2001 | Takahara |
| 6,339,849 | B1 | 1/2002 | Nelson |
| 6,351,853 | B1 | 3/2002 | Halstead |
| 6,360,376 | B1 | 3/2002 | Carrington |
| 6,361,507 | B1 | 3/2002 | Foxlin |
| 6,366,871 | B1 | 4/2002 | Geva |
| 6,375,612 | B1 | 4/2002 | Guichon |
| 6,378,140 | B1 | 4/2002 | Abraham |
| 6,385,780 | B1 | 5/2002 | Racine |
| 6,389,607 | B1 | 5/2002 | Wood |

(56)                    References Cited

U.S. PATENT DOCUMENTS

| | | | |
|---|---|---|---|
| 6,397,151 | B1 | 5/2002 | Yamagishi |
| 6,406,168 | B1 | 6/2002 | Whiting |
| 6,421,841 | B2 | 7/2002 | Ikeda |
| 6,434,755 | B1 | 8/2002 | Halstead |
| 6,441,747 | B1 | 8/2002 | Khair |
| 6,442,765 | B1 | 9/2002 | Fallon |
| 6,446,270 | B1 | 9/2002 | Durr |
| D465,067 | S | 10/2002 | Ide |
| 6,463,351 | B1 | 10/2002 | Clynch |
| 6,467,099 | B2 | 10/2002 | Dennis |
| 6,484,133 | B1 | 11/2002 | Vogt |
| 6,532,602 | B2 | 3/2003 | Watters |
| 6,539,336 | B1 | 3/2003 | Vock |
| 6,567,116 | B1 | 5/2003 | Aman |
| D475,486 | S | 6/2003 | Ide |
| 6,588,022 | B1 | 7/2003 | Anders |
| 6,604,246 | B1 | 8/2003 | Obreja |
| 6,611,782 | B1 | 8/2003 | Wooster |
| 6,611,789 | B1 | 8/2003 | Darley |
| 6,647,787 | B2 | 11/2003 | Fore |
| 6,658,671 | B1 | 12/2003 | Von Holst |
| 6,701,535 | B2 | 3/2004 | Dobbie |
| 6,722,711 | B2 | 4/2004 | Kitzis |
| 6,730,047 | B2 | 5/2004 | Socci |
| 6,735,551 | B2 | 5/2004 | Voegeli |
| 6,748,250 | B1 | 6/2004 | Berman |
| D492,818 | S | 7/2004 | Ide |
| D496,762 | S | 9/2004 | Durocher |
| 6,785,985 | B2 | 9/2004 | Marvin |
| 6,798,392 | B2 | 9/2004 | Hartwell |
| 6,826,509 | B2 | 11/2004 | Crisco, III |
| 6,925,657 | B2 | 8/2005 | Takahashi |
| 6,925,851 | B2 | 8/2005 | Reinbold |
| 6,928,385 | B2 | 8/2005 | Ebisawa |
| 6,931,671 | B2 | 8/2005 | Skiba |
| 6,934,971 | B2 | 8/2005 | Ide |
| 6,964,638 | B2 | 11/2005 | Theodoracopulos |
| D512,534 | S | 12/2005 | Maddux |
| D521,191 | S | 5/2006 | Berger |
| 7,054,784 | B2 | 5/2006 | Flentov |
| D523,180 | S | 6/2006 | Frye |
| 7,062,795 | B2 | 6/2006 | Skiba |
| 7,087,015 | B1 | 8/2006 | Comrie |
| 7,092,846 | B2 | 8/2006 | Vock |
| D528,705 | S | 9/2006 | Ide |
| 7,111,329 | B2 | 9/2006 | Stroud |
| 7,162,392 | B2 | 1/2007 | Vock |
| 7,234,812 | B2 | 6/2007 | Piorkowski |
| 7,240,376 | B2 | 7/2007 | Ide |
| 7,243,378 | B2 | 7/2007 | Desarmaux |
| 7,254,843 | B2 | 8/2007 | Talluri |
| 7,288,326 | B2 | 10/2007 | Elzey |
| 7,328,462 | B1 | 2/2008 | Straus |
| 7,341,776 | B1 | 3/2008 | Milliren |
| D570,055 | S | 5/2008 | Ferrara |
| 7,386,401 | B2 | 6/2008 | Vock |
| D572,410 | S | 7/2008 | Udelhofen |
| D572,412 | S | 7/2008 | Udelhofen |
| D581,099 | S | 11/2008 | Ahn |
| D582,607 | S | 12/2008 | Ferrara |
| 7,478,108 | B2 | 1/2009 | Townsend |
| D586,507 | S | 2/2009 | Fink |
| D587,852 | S | 3/2009 | Nimmons |
| D587,853 | S | 3/2009 | Nimmons |
| 7,526,389 | B2 | 4/2009 | Greenwald |
| 7,548,168 | B2 | 6/2009 | Ishikawa |
| D598,610 | S | 8/2009 | Soukup |
| D603,099 | S | 10/2009 | Bologna |
| D603,100 | S | 10/2009 | Bologna |
| 7,634,820 | B2 | 12/2009 | Rogers |
| 7,673,351 | B2 | 3/2010 | Copeland |
| 7,693,668 | B2 | 4/2010 | Vock |
| D617,503 | S | 6/2010 | Szalkowski |
| 7,735,157 | B2 | 6/2010 | Ikeda |
| 7,743,640 | B2 | 6/2010 | Lampe |
| 7,774,866 | B2 | 8/2010 | Ferrara |
| 7,802,320 | B2 | 9/2010 | Morgan |
| D625,050 | S | 10/2010 | Chen |
| 7,832,023 | B2 | 11/2010 | Crisco |
| 7,841,025 | B1 | 11/2010 | Fink |
| 7,849,524 | B1 | 12/2010 | Williamson |
| 7,861,326 | B2 | 1/2011 | Harty |
| 7,870,617 | B2 | 1/2011 | Butler |
| 7,900,279 | B2 | 3/2011 | Kraemer |
| 7,917,972 | B1 | 4/2011 | Krueger |
| 7,930,771 | B2 | 4/2011 | Depreitere |
| 7,952,577 | B2 | 5/2011 | Harvill |
| 7,987,525 | B2 | 8/2011 | Summers |
| 8,026,396 | B2 | 9/2011 | Mitsuda |
| 8,069,498 | B2 | 12/2011 | Maddux |
| 8,087,099 | B2 | 1/2012 | Sawabe |
| 8,104,324 | B2 | 1/2012 | Hennig |
| 8,105,184 | B2 | 1/2012 | Lammer |
| 8,117,679 | B2 | 2/2012 | Pierce |
| 8,156,569 | B2 | 4/2012 | Cripton |
| 8,176,574 | B2 | 5/2012 | Bryant |
| 8,201,269 | B2 | 6/2012 | Maddux |
| D663,076 | S | 7/2012 | Parsons |
| 8,209,784 | B2 | 7/2012 | Larry |
| D666,779 | S | 9/2012 | Harris |
| 8,280,681 | B2 | 10/2012 | Vock |
| 8,296,867 | B2 | 10/2012 | Rudd |
| 8,296,868 | B2 | 10/2012 | Belanger |
| 8,382,685 | B2 | 2/2013 | Vaccari |
| D679,058 | S | 3/2013 | Szalkowski |
| D681,280 | S | 4/2013 | Bologna |
| D681,281 | S | 4/2013 | Bologna |
| 8,418,270 | B2 | 4/2013 | Desjardins |
| 8,465,376 | B2 | 6/2013 | Bentley |
| 8,466,794 | B2 | 6/2013 | Mack |
| 8,468,613 | B2 | 6/2013 | Harty |
| 8,524,338 | B2 | 9/2013 | Anderson |
| 8,544,117 | B2 | 10/2013 | Erb |
| 8,544,118 | B2 | 10/2013 | Brine, III |
| 8,566,968 | B2 | 10/2013 | Marzec |
| 8,572,767 | B2 | 11/2013 | Bryant |
| 8,621,671 | B1 | 1/2014 | Schiebl |
| D699,895 | S | 2/2014 | Hill |
| 8,640,267 | B1 | 2/2014 | Cohen |
| 8,656,520 | B2 | 2/2014 | Rush, III |
| 8,661,564 | B2 | 3/2014 | Dodd |
| 8,690,655 | B2 | 4/2014 | Meyer |
| 8,702,516 | B2 | 4/2014 | Bentley |
| 8,707,470 | B1 | 4/2014 | Novicky |
| 8,726,424 | B2 | 5/2014 | Thomas |
| 8,730,231 | B2 | 5/2014 | Snoddy |
| 8,739,317 | B2 | 6/2014 | Abernethy |
| 8,756,719 | B2 | 6/2014 | Veazie |
| D708,792 | S | 7/2014 | Aaskov |
| 8,776,272 | B1 | 7/2014 | Straus |
| 8,786,415 | B2 | 7/2014 | Cavallaro |
| 8,813,269 | B2 | 8/2014 | Nelson |
| 8,814,150 | B2 | 8/2014 | Ferrara |
| 8,819,871 | B2 | 9/2014 | Anthony |
| 8,826,468 | B2 | 9/2014 | Harris |
| 8,850,622 | B2 | 10/2014 | Finiel |
| 8,850,623 | B2 | 10/2014 | Mazzoccoli |
| 8,860,570 | B2 | 10/2014 | Thomas |
| 8,863,319 | B2 | 10/2014 | Knight |
| 8,874,251 | B2 | 10/2014 | Thornton |
| D718,002 | S | 11/2014 | Littrell, Jr. |
| 8,887,312 | B2 | 11/2014 | Bhatnagar |
| 8,887,318 | B2 | 11/2014 | Mazzarolo |
| 8,894,514 | B2 | 11/2014 | Jennings |
| 8,927,088 | B2 | 1/2015 | Faden |
| 8,955,169 | B2 | 2/2015 | Weber |
| 8,961,440 | B2 | 2/2015 | Huang |
| 8,966,670 | B2 | 3/2015 | Cheng |
| 8,966,671 | B2 | 3/2015 | Rumbaugh |
| 9,017,806 | B2 | 4/2015 | Jacobsen |
| 9,024,770 | B2 | 5/2015 | Reuben |
| 9,026,396 | B2 | 5/2015 | Evans |
| 9,032,558 | B2 | 5/2015 | Leon |
| 9,035,776 | B2 | 5/2015 | Miller, II |

(56)  References Cited

U.S. PATENT DOCUMENTS

| | | | |
|---|---|---|---|
| 9,044,198 | B2 | 6/2015 | Benzel |
| 9,095,179 | B2 | 8/2015 | Kwan |
| 9,107,466 | B2 | 8/2015 | Hoying |
| 9,113,672 | B2 | 8/2015 | Witcher |
| 9,119,431 | B2 | 9/2015 | Bain |
| 9,131,741 | B2 | 9/2015 | Maliszewski |
| 9,131,744 | B2 | 9/2015 | Erb |
| 9,141,759 | B2 | 9/2015 | Burich |
| 9,179,727 | B2 | 11/2015 | Grant |
| 9,182,208 | B2 | 11/2015 | Ebisawa |
| 9,185,946 | B2 | 11/2015 | Leary |
| 9,194,136 | B2 | 11/2015 | Cormier |
| D746,000 | S | 12/2015 | Daniels |
| 9,210,961 | B2 | 12/2015 | Torres |
| D747,040 | S | 1/2016 | Milam |
| D747,554 | S | 1/2016 | Daniel |
| 9,236,997 | B2 | 1/2016 | Yoon |
| 9,247,780 | B2 | 2/2016 | Iuliano |
| 9,249,853 | B2 | 2/2016 | Cormier |
| 9,257,054 | B2 | 2/2016 | Coza |
| D752,821 | S | 3/2016 | Bologna |
| D752,822 | S | 3/2016 | Bologna |
| D752,823 | S | 3/2016 | Bologna |
| 9,271,542 | B2 | 3/2016 | Mccue |
| 9,289,024 | B2 | 3/2016 | Withnall |
| D753,346 | S | 4/2016 | Erb |
| 9,314,060 | B2 | 4/2016 | Giles |
| 9,314,062 | B2 | 4/2016 | Marz |
| 9,314,063 | B2 | 4/2016 | Bologna |
| 9,320,311 | B2 | 4/2016 | Szalkowski |
| 9,326,737 | B2 | 5/2016 | Simon |
| 9,332,800 | B2 | 5/2016 | Brown |
| 9,339,073 | B2 | 5/2016 | De La Fuente |
| 9,380,823 | B2 | 7/2016 | Johnson |
| 9,380,961 | B2 | 7/2016 | Borkholder |
| D764,116 | S | 8/2016 | Collette |
| 9,408,423 | B2 | 8/2016 | Guerra |
| 9,420,843 | B2 | 8/2016 | Cormier |
| 9,439,469 | B2 * | 9/2016 | Phipps .................. A42B 3/064 |
| 9,440,413 | B2 | 9/2016 | Lewis |
| 9,460,604 | B1 | 10/2016 | Daniel |
| 9,462,842 | B2 | 10/2016 | Hoshizaki |
| 9,468,249 | B2 | 10/2016 | Fraser |
| 9,474,316 | B2 | 10/2016 | Berry |
| 9,493,643 | B2 | 11/2016 | Li |
| 9,498,014 | B2 * | 11/2016 | Princip .................. A42B 3/065 |
| 9,500,464 | B2 | 11/2016 | Aurel |
| 9,508,335 | B2 | 11/2016 | Benattar |
| D773,742 | S | 12/2016 | Williams |
| 9,516,910 | B2 | 12/2016 | Szalkowski |
| 9,530,248 | B2 | 12/2016 | Zhang |
| 9,545,127 | B1 | 1/2017 | Sandifer |
| 9,554,607 | B2 | 1/2017 | Mack |
| D778,504 | S | 2/2017 | Collette |
| 9,566,471 | B2 | 2/2017 | Deangelis |
| 9,572,390 | B1 | 2/2017 | Simpson |
| 9,572,391 | B2 | 2/2017 | Mcinnis |
| 9,572,402 | B2 | 2/2017 | Jarvis |
| 9,578,917 | B2 | 2/2017 | Cohen |
| 9,586,116 | B2 | 3/2017 | Churchman |
| 9,596,901 | B1 | 3/2017 | Anvari |
| 9,597,567 | B1 | 3/2017 | Tran |
| 9,603,404 | B2 | 3/2017 | Pocatko |
| D784,628 | S | 4/2017 | Fleming |
| 9,610,476 | B1 | 4/2017 | Tran |
| 9,622,531 | B1 | 4/2017 | Crispino |
| 9,622,533 | B2 | 4/2017 | Warmouth |
| 9,629,409 | B1 | 4/2017 | Cannon, Jr. |
| 9,642,410 | B2 | 5/2017 | Grice |
| 9,648,915 | B2 | 5/2017 | Jennings |
| 9,656,148 | B2 | 5/2017 | Bologna |
| 9,693,594 | B1 | 7/2017 | Castro |
| 9,702,516 | B1 | 7/2017 | Vasquez |
| 9,711,146 | B1 | 7/2017 | Cronin |
| 9,713,355 | B2 | 7/2017 | Daoust |
| 9,724,588 | B1 | 8/2017 | Cronin |
| 9,726,249 | B2 | 8/2017 | Horstemeyer |
| 9,730,482 | B2 | 8/2017 | Allen |
| 9,750,296 | B2 | 9/2017 | Knight |
| 9,750,297 | B1 | 9/2017 | Mini Townson |
| 9,756,891 | B1 | 9/2017 | Mcghie |
| 9,763,487 | B1 | 9/2017 | Brown, Jr. |
| 9,763,488 | B2 | 9/2017 | Bologna |
| 9,763,571 | B2 | 9/2017 | Kozloski |
| 9,770,060 | B2 | 9/2017 | Infusino |
| 9,775,396 | B1 | 10/2017 | Olivares Velasco |
| 9,788,589 | B2 | 10/2017 | Lewis |
| 9,788,593 | B2 | 10/2017 | Lebel |
| 9,788,600 | B2 | 10/2017 | Wawrousek |
| 9,791,336 | B2 | 10/2017 | Zhu |
| 9,795,177 | B1 | 10/2017 | Weaver |
| 9,795,180 | B2 | 10/2017 | Lowe |
| 9,801,424 | B2 | 10/2017 | Mazzarolo |
| 9,817,439 | B2 | 11/2017 | Gosieski |
| 9,820,522 | B2 | 11/2017 | Prabhu |
| 9,833,684 | B2 | 12/2017 | Warmouth |
| 9,839,251 | B2 | 12/2017 | Pannikottu |
| 9,841,075 | B2 | 12/2017 | Russo |
| 9,849,361 | B2 | 12/2017 | Coza |
| D807,587 | S | 1/2018 | Lebel |
| 9,854,988 | B2 | 1/2018 | Oakley |
| 9,861,153 | B2 | 1/2018 | Finisdore |
| 9,861,876 | B2 | 1/2018 | Vito |
| 9,881,206 | B2 | 1/2018 | Hohteri |
| 9,895,099 | B2 | 2/2018 | Rennaker |
| 9,900,669 | B2 | 2/2018 | Touma |
| 9,918,110 | B2 | 3/2018 | Anwar |
| 9,924,756 | B2 | 3/2018 | Hyman |
| 9,925,440 | B2 | 3/2018 | Davis |
| 9,943,128 | B2 | 4/2018 | Atashbar |
| 9,949,516 | B2 | 4/2018 | Pickett |
| 9,962,118 | B2 | 5/2018 | Kozloski |
| 9,962,905 | B2 | 5/2018 | Duoss |
| 9,968,154 | B2 | 5/2018 | Tenenbaum |
| 9,980,530 | B2 | 5/2018 | Hassan |
| 9,986,779 | B2 | 6/2018 | Pritz |
| 10,004,973 | B2 | 6/2018 | Weatherby |
| 10,010,122 | B2 | 7/2018 | Kamradt |
| 10,022,593 | B2 | 7/2018 | Krysiak |
| 10,022,613 | B2 | 7/2018 | Tran |
| 10,024,743 | B2 | 7/2018 | Davis |
| 10,028,679 | B2 | 7/2018 | Paris |
| 10,029,633 | B2 | 7/2018 | Phipps |
| 10,039,338 | B2 | 8/2018 | Kelly |
| 10,049,549 | B2 | 8/2018 | Howard |
| 10,050,650 | B2 | 8/2018 | O'Hagan |
| 10,058,761 | B2 | 8/2018 | Thompson |
| 10,071,282 | B2 | 9/2018 | Deangelis |
| 10,071,301 | B2 | 9/2018 | Vock |
| 10,085,508 | B2 | 10/2018 | Surabhi |
| 10,085,509 | B2 | 10/2018 | Warmouth |
| 10,092,055 | B2 | 10/2018 | Hector, Jr. |
| 10,098,402 | B2 | 10/2018 | Booher, Sr. |
| 10,105,076 | B2 | 10/2018 | Chu |
| 10,105,584 | B1 | 10/2018 | Whitcomb |
| 10,117,010 | B2 | 10/2018 | Spector |
| 10,123,582 | B2 | 11/2018 | Crossman |
| 10,130,133 | B2 | 11/2018 | Leon |
| 10,130,134 | B2 | 11/2018 | Blair |
| 10,136,691 | B2 | 11/2018 | Degolier |
| 10,136,692 | B2 | 11/2018 | Ide |
| D836,253 | S | 12/2018 | Erb |
| 10,143,255 | B2 | 12/2018 | Golnaraghi |
| 10,149,511 | B2 | 12/2018 | Vito |
| 10,151,565 | B2 | 12/2018 | Fonte |
| 10,158,685 | B1 | 12/2018 | Hobby |
| 10,158,826 | B1 | 12/2018 | Waters |
| 10,159,296 | B2 | 12/2018 | Pietrzak |
| 10,165,818 | B2 | 1/2019 | Suddaby |
| 10,165,979 | B2 | 1/2019 | Kozloski |
| 10,167,922 | B2 | 1/2019 | Mcdonnell |
| 10,172,406 | B2 | 1/2019 | Olivares Velasco |
| 10,172,555 | B2 | 1/2019 | Cam |
| 10,178,889 | B2 | 1/2019 | Wacter |

(56)  References Cited

U.S. PATENT DOCUMENTS

| 10,182,135 B2 | 1/2019 | Black |
| 10,183,423 B2 | 1/2019 | Nauman |
| 10,200,834 B2 | 2/2019 | Tran |
| 10,201,743 B1 | 2/2019 | Simpson |
| 10,219,573 B2 | 3/2019 | Podboy |
| 10,226,094 B2 | 3/2019 | Straus |
| 10,238,950 B2 | 3/2019 | Kuntz |
| 10,241,205 B2 | 3/2019 | Cavallaro |
| 10,244,810 B2 | 4/2019 | Martin |
| 10,244,971 B2 | 4/2019 | Kozloski |
| 10,258,100 B1 | 4/2019 | Erb |
| 10,265,001 B2 | 4/2019 | Kozloski |
| 10,271,603 B2 | 4/2019 | Briggs |
| D850,011 S | 5/2019 | Bologna |
| D850,012 S | 5/2019 | Bologna |
| D850,013 S | 5/2019 | Bologna |
| 10,278,443 B2 | 5/2019 | Miller, II |
| 10,278,444 B2 | 5/2019 | Merrell |
| 10,282,011 B2 | 5/2019 | Mcmillen |
| 10,292,651 B2 | 5/2019 | Kozloski |
| 10,306,941 B2 | 6/2019 | Durocher |
| 10,306,942 B2 | 6/2019 | Hoshizaki |
| 10,315,095 B1 | 6/2019 | Sneed |
| 10,342,280 B2 | 7/2019 | Valentino, Sr. |
| 10,342,281 B2 | 7/2019 | Fischer |
| 10,342,283 B2 | 7/2019 | Glover |
| 10,349,696 B2 | 7/2019 | Ogata |
| 10,350,477 B2 | 7/2019 | Schneider |
| 10,353,377 B2 | 7/2019 | Ingleton |
| 10,357,075 B2 | 7/2019 | Princip |
| 10,362,829 B2 | 7/2019 | Lowe |
| 10,368,604 B2 | 8/2019 | Linares |
| 10,369,452 B2 | 8/2019 | Jimenez |
| 10,369,739 B2 | 8/2019 | Cormier |
| 10,376,009 B2 | 8/2019 | Kennedy |
| 10,376,010 B2 | 8/2019 | Allen |
| 10,376,210 B2 | 8/2019 | Paris |
| 10,384,394 B2 | 8/2019 | Mccluskey |
| 10,433,609 B2 | 10/2019 | Reinhall |
| 10,455,883 B2 | 10/2019 | Brown |
| 10,463,099 B2 | 11/2019 | Allen |
| 10,493,697 B2 | 12/2019 | Miller |
| 10,506,840 B2 | 12/2019 | Walterspiel |
| 10,569,044 B2 | 2/2020 | Dunn |
| 10,588,372 B2 | 3/2020 | Ho |
| 10,647,879 B2 | 5/2020 | Rolland |
| 10,736,373 B2 | 8/2020 | Chilson |
| 10,780,338 B1 | 9/2020 | Bologna |
| 10,813,402 B2 | 10/2020 | Posner |
| 10,948,898 B1 | 3/2021 | Pietrzak |
| 10,966,479 B2 * | 4/2021 | Browd .................. A42B 3/125 |
| 11,020,909 B2 | 6/2021 | Compton |
| 11,026,466 B2 | 6/2021 | Vanhoutin |
| 11,033,796 B2 | 6/2021 | Bologna |
| D927,084 S | 8/2021 | Bologna |
| 11,089,832 B2 | 8/2021 | Frieder, Jr. |
| 11,167,198 B2 | 11/2021 | Bologna |
| D939,150 S | 12/2021 | Bologna |
| 11,213,736 B2 | 1/2022 | Bologna |
| 11,229,254 B1 | 1/2022 | Matteucci |
| D942,698 S | 2/2022 | Schneider |
| 11,241,059 B2 | 2/2022 | Stone |
| 11,304,471 B2 | 4/2022 | Light |
| 11,311,060 B2 | 4/2022 | Ferrara |
| 11,399,589 B2 | 8/2022 | Bologna |
| 11,517,063 B2 | 12/2022 | Boutin |
| 11,523,652 B2 | 12/2022 | Hall |
| 2001/0032351 A1 | 10/2001 | Nakayama |
| 2001/0034895 A1 | 11/2001 | Ikeda |
| 2001/0039674 A1 | 11/2001 | Shida |
| 2002/0011250 A1 | 1/2002 | Stewart |
| 2002/0024450 A1 | 2/2002 | Townsend |
| 2002/0049507 A1 | 4/2002 | Hameen-Anttila |
| 2002/0060633 A1 | 5/2002 | Crisco |
| 2002/0087054 A1 | 7/2002 | Lin |
| 2002/0114859 A1 | 8/2002 | Cutler |
| 2002/0116147 A1 | 8/2002 | Vock |
| 2002/0183657 A1 | 12/2002 | Socci |
| 2003/0014210 A1 | 1/2003 | Vock |
| 2003/0071766 A1 | 4/2003 | Hartwell |
| 2003/0151554 A1 | 8/2003 | Mccarthy |
| 2003/0163287 A1 | 8/2003 | Vock |
| 2003/0217582 A1 | 11/2003 | Reinbold |
| 2004/0008106 A1 | 1/2004 | Konczal |
| 2004/0045078 A1 | 3/2004 | Puchalski |
| 2004/0117896 A1 | 6/2004 | Madey |
| 2004/0139531 A1 | 7/2004 | Moore |
| 2004/0163228 A1 | 8/2004 | Piorkowski |
| 2004/0181854 A1 | 9/2004 | Primrose |
| 2004/0204904 A1 | 10/2004 | Ebisawa |
| 2004/0225236 A1 | 11/2004 | Wheeler |
| 2004/0240198 A1 | 12/2004 | Laar |
| 2004/0250340 A1 | 12/2004 | Piper |
| 2005/0050617 A1 | 3/2005 | Moore |
| 2005/0177929 A1 | 8/2005 | Greenwald |
| 2005/0241048 A1 | 11/2005 | Cattaneo |
| 2005/0241049 A1 | 11/2005 | Ambuske |
| 2005/0278834 A1 | 12/2005 | Lee |
| 2006/0031978 A1 | 2/2006 | Pierce |
| 2006/0038694 A1 | 2/2006 | Naunheim |
| 2006/0059606 A1 | 3/2006 | Ferrara |
| 2006/0074338 A1 | 4/2006 | Greenwald |
| 2006/0101559 A1 * | 5/2006 | Moore, III ............. A42C 2/007 |
| | | 2/410 |
| 2006/0112477 A1 | 6/2006 | Schneider |
| 2006/0143807 A1 | 7/2006 | Udelhofen |
| 2006/0189852 A1 | 8/2006 | Greenwald |
| 2007/0061106 A1 | 3/2007 | Vock |
| 2007/0094769 A1 | 5/2007 | Lakes |
| 2007/0119538 A1 | 5/2007 | Price |
| 2007/0157370 A1 | 7/2007 | Joubert Des Ouches |
| 2007/0266471 A1 | 11/2007 | Lin |
| 2007/0266481 A1 | 11/2007 | Alexander |
| 2008/0052808 A1 | 3/2008 | Leick |
| 2008/0086916 A1 | 4/2008 | Ellis |
| 2008/0092277 A1 | 4/2008 | Kraemer |
| 2008/0155734 A1 | 7/2008 | Yen |
| 2008/0163410 A1 | 7/2008 | Udelhofen |
| 2008/0172774 A1 | 7/2008 | Ytterborn |
| 2008/0250550 A1 | 10/2008 | Bologna |
| 2008/0256686 A1 | 10/2008 | Ferrara |
| 2008/0295228 A1 | 12/2008 | Muskovitz |
| 2009/0031479 A1 | 2/2009 | Rush, III |
| 2009/0038055 A1 | 2/2009 | Ferrara |
| 2009/0044316 A1 | 2/2009 | Udelhofen |
| 2009/0057325 A1 | 3/2009 | Tullio |
| 2009/0106882 A1 | 4/2009 | Nimmons |
| 2009/0222964 A1 | 9/2009 | Wiles |
| 2009/0255036 A1 | 10/2009 | Lim |
| 2009/0260133 A1 | 10/2009 | Del Rosario |
| 2009/0265840 A1 | 10/2009 | Favre-Felix |
| 2009/0265841 A1 | 10/2009 | Ferrara |
| 2009/0274865 A1 | 11/2009 | Wadley |
| 2010/0043126 A1 | 2/2010 | Morel |
| 2010/0050323 A1 | 3/2010 | Durocher |
| 2010/0076321 A1 | 3/2010 | Zhang |
| 2010/0076692 A1 | 3/2010 | Vock |
| 2010/0180362 A1 | 7/2010 | Glogowski |
| 2010/0251465 A1 | 10/2010 | Milea |
| 2010/0258988 A1 | 10/2010 | Darnell |
| 2010/0287687 A1 | 11/2010 | Ho |
| 2010/0319097 A1 | 12/2010 | Turner |
| 2010/0319110 A1 | 12/2010 | Preston-Powers |
| 2011/0047678 A1 | 3/2011 | Barth |
| 2011/0056004 A1 | 3/2011 | Landi |
| 2011/0107503 A1 | 5/2011 | Morgan |
| 2011/0131695 A1 | 6/2011 | Maddux |
| 2011/0167542 A1 | 7/2011 | Bayne |
| 2011/0203038 A1 | 8/2011 | Jones |
| 2011/0209272 A1 | 9/2011 | Drake |
| 2011/0215931 A1 | 9/2011 | Callsen |
| 2011/0225706 A1 | 9/2011 | Pye |
| 2011/0229685 A1 | 9/2011 | Lin |
| 2011/0271428 A1 | 11/2011 | Withnall |

(56)　　　　References Cited

U.S. PATENT DOCUMENTS

| | | |
|---|---|---|
| 2012/0036619 A1 | 2/2012 | Ytterborn |
| 2012/0036620 A1 | 2/2012 | Harris |
| 2012/0047634 A1 | 3/2012 | Vaidya |
| 2012/0060251 A1 | 3/2012 | Schimpf |
| 2012/0066820 A1 | 3/2012 | Fresco |
| 2012/0079646 A1 | 4/2012 | Belanger |
| 2012/0096631 A1 | 4/2012 | King |
| 2012/0151663 A1 | 6/2012 | Rumbaugh |
| 2012/0198604 A1 | 8/2012 | Weber |
| 2012/0210498 A1 | 8/2012 | Mack |
| 2012/0220893 A1 | 8/2012 | Benzel |
| 2012/0297526 A1 | 11/2012 | Leon |
| 2012/0317705 A1 | 12/2012 | Lindsay |
| 2013/0007950 A1 | 1/2013 | Arai |
| 2013/0025032 A1 | 1/2013 | Durocher |
| 2013/0031700 A1 | 2/2013 | Wacter |
| 2013/0040524 A1 | 2/2013 | Halldin |
| 2013/0060168 A1 | 3/2013 | Chu |
| 2013/0061371 A1 | 3/2013 | Phipps |
| 2013/0061375 A1 | 3/2013 | Bologna |
| 2013/0067643 A1 | 3/2013 | Musal |
| 2013/0074248 A1 | 3/2013 | Evans |
| 2013/0110415 A1 | 5/2013 | Davis |
| 2013/0122256 A1 | 5/2013 | Kleiven |
| 2013/0158949 A1* | 6/2013 | Ebisawa ............... A42B 3/127 |
| | | 702/157 |
| 2013/0167290 A1 | 7/2013 | Ben Ezra |
| 2013/0180034 A1 | 7/2013 | Preisler |
| 2013/0185837 A1 | 7/2013 | Phipps |
| 2013/0209977 A1 | 8/2013 | Lathan |
| 2013/0211774 A1 | 8/2013 | Bentley |
| 2013/0212783 A1 | 8/2013 | Bonin |
| 2013/0274778 A1 | 10/2013 | Mercier |
| 2013/0283503 A1 | 10/2013 | Zilverberg |
| 2013/0283504 A1 | 10/2013 | Harris |
| 2013/0298316 A1 | 11/2013 | Jacob |
| 2013/0340146 A1 | 12/2013 | Dekker |
| 2013/0340147 A1 | 12/2013 | Giles |
| 2014/0000012 A1 | 1/2014 | Mustapha |
| 2014/0007322 A1 | 1/2014 | Marz |
| 2014/0007324 A1 | 1/2014 | Svehaug |
| 2014/0013492 A1 | 1/2014 | Bottlang |
| 2014/0020158 A1 | 1/2014 | Parsons |
| 2014/0033402 A1 | 2/2014 | Donnadieu |
| 2014/0035658 A1 | 2/2014 | Osamu |
| 2014/0052405 A1 | 2/2014 | Wackym |
| 2014/0072938 A1 | 3/2014 | Krull |
| 2014/0081601 A1 | 3/2014 | Zhang |
| 2014/0090155 A1 | 4/2014 | Johnston |
| 2014/0196198 A1 | 7/2014 | Cohen |
| 2014/0201889 A1 | 7/2014 | Pietrzak |
| 2014/0208486 A1 | 7/2014 | Krueger |
| 2014/0223641 A1 | 8/2014 | Henderson |
| 2014/0223644 A1* | 8/2014 | Bologna ............... A42B 3/205 |
| | | 2/414 |
| 2014/0259326 A1 | 9/2014 | Carlson |
| 2014/0288432 A1 | 9/2014 | Hennig |
| 2014/0333446 A1 | 11/2014 | Newlove |
| 2014/0364772 A1 | 12/2014 | Howard |
| 2014/0373257 A1 | 12/2014 | Turner |
| 2015/0055085 A1 | 2/2015 | Fonte |
| 2015/0074875 A1 | 3/2015 | Schimpf |
| 2015/0080766 A1 | 3/2015 | Ji |
| 2015/0081076 A1 | 3/2015 | Fernandes |
| 2015/0109129 A1 | 4/2015 | Merril |
| 2015/0119759 A1 | 4/2015 | Gonzales |
| 2015/0121609 A1 | 5/2015 | Cote |
| 2015/0157081 A1 | 6/2015 | Hyman |
| 2015/0157083 A1 | 6/2015 | Lowe |
| 2015/0165690 A1 | 6/2015 | Tow |
| 2015/0196252 A1 | 7/2015 | Iuliano |
| 2015/0208751 A1 | 7/2015 | Day |
| 2015/0223547 A1 | 8/2015 | Wibby |
| 2015/0230534 A1 | 8/2015 | Mcguckin, Jr. |
| 2015/0238143 A1 | 8/2015 | Meurer |
| 2015/0246502 A1 | 9/2015 | Lloyd |
| 2015/0250250 A1 | 9/2015 | Ellis |
| 2015/0264991 A1 | 9/2015 | Frey |
| 2015/0272257 A1 | 10/2015 | Pritz |
| 2015/0272258 A1 | 10/2015 | Preisler |
| 2015/0305430 A1 | 10/2015 | Rush |
| 2015/0313305 A1 | 11/2015 | Daetwyler |
| 2015/0328512 A1 | 11/2015 | Davis |
| 2015/0331522 A1 | 11/2015 | Mcmillen |
| 2015/0359285 A1 | 12/2015 | Rennaker, II |
| 2015/0359477 A1 | 12/2015 | Ramachandran |
| 2015/0377694 A1 | 12/2015 | Shepard, Jr. |
| 2016/0018278 A1 | 1/2016 | Jeter, II |
| 2016/0029731 A1 | 2/2016 | Magee |
| 2016/0051013 A1 | 2/2016 | Mitchell, Jr. |
| 2016/0053843 A1 | 2/2016 | Subhash |
| 2016/0058092 A1 | 3/2016 | Aldino |
| 2016/0100794 A1 | 4/2016 | Miller |
| 2016/0113346 A1 | 4/2016 | Lowe |
| 2016/0128415 A1 | 5/2016 | Tubbs |
| 2016/0150845 A1* | 6/2016 | Leedom ................ A42B 3/283 |
| | | 2/410 |
| 2016/0157544 A1 | 6/2016 | Ning |
| 2016/0183619 A1 | 6/2016 | Del Ramo |
| 2016/0198681 A1 | 7/2016 | Fyfe |
| 2016/0219964 A1 | 8/2016 | Pisano |
| 2016/0238099 A1 | 8/2016 | Perino |
| 2016/0242485 A1 | 8/2016 | Carton |
| 2016/0242486 A1 | 8/2016 | Harris |
| 2016/0255898 A1 | 9/2016 | Cormier |
| 2016/0255900 A1 | 9/2016 | Browd |
| 2016/0262694 A1 | 9/2016 | Calcano |
| 2016/0270472 A1* | 9/2016 | Allen .................... A42B 3/122 |
| 2016/0270473 A1 | 9/2016 | Warmouth |
| 2016/0271482 A1 | 9/2016 | Garland |
| 2016/0278467 A1 | 9/2016 | Irwin |
| 2016/0278470 A1 | 9/2016 | Posner |
| 2016/0278666 A1 | 9/2016 | Kozloski |
| 2016/0286885 A1 | 10/2016 | Hyman |
| 2016/0286891 A1 | 10/2016 | Stramacchia |
| 2016/0302496 A1 | 10/2016 | Ferrara |
| 2016/0318255 A1 | 11/2016 | Ou |
| 2016/0331296 A1 | 11/2016 | Kozloski |
| 2016/0331581 A1 | 11/2016 | Kozloski |
| 2016/0335396 A1 | 11/2016 | Kozloski |
| 2016/0345651 A1 | 12/2016 | Dvorak |
| 2016/0349738 A1 | 12/2016 | Sisk |
| 2016/0370239 A1 | 12/2016 | Cummings |
| 2017/0010603 A1 | 1/2017 | Ingleton |
| 2017/0019629 A1 | 1/2017 | Fukasawa |
| 2017/0065017 A1 | 3/2017 | Janson |
| 2017/0065018 A1 | 3/2017 | Lindsay |
| 2017/0071526 A1 | 3/2017 | Lyren |
| 2017/0095014 A1 | 4/2017 | King |
| 2017/0105461 A1 | 4/2017 | Hancock |
| 2017/0105470 A1 | 4/2017 | Eaton |
| 2017/0143066 A1 | 5/2017 | Avery |
| 2017/0144024 A1 | 5/2017 | Warners |
| 2017/0164678 A1 | 6/2017 | Allen |
| 2017/0188648 A1 | 7/2017 | Larrabee |
| 2017/0188649 A1 | 7/2017 | Allen |
| 2017/0189786 A1 | 7/2017 | Riggs |
| 2017/0196291 A1 | 7/2017 | Glover |
| 2017/0196292 A1 | 7/2017 | Reinhall |
| 2017/0196294 A1 | 7/2017 | Fischer |
| 2017/0196295 A1 | 7/2017 | Glover |
| 2017/0209092 A1 | 7/2017 | Crisco, III |
| 2017/0215507 A1 | 8/2017 | Straus |
| 2017/0220746 A1 | 8/2017 | Marshall |
| 2017/0224042 A1 | 8/2017 | Abraham |
| 2017/0224252 A1 | 8/2017 | Salzar |
| 2017/0225032 A1 | 8/2017 | Jones |
| 2017/0232327 A1 | 8/2017 | Kuntz |
| 2017/0245575 A1 | 8/2017 | Branch |
| 2017/0265556 A1 | 9/2017 | Yang |
| 2017/0273387 A1 | 9/2017 | Sicking |
| 2017/0278420 A1 | 9/2017 | João Viol Vieira |
| 2017/0295881 A1 | 10/2017 | Martin |
| 2017/0300755 A1 | 10/2017 | Bose |

(56) References Cited

U.S. PATENT DOCUMENTS

| | | |
|---|---|---|
| 2017/0303612 A1 | 10/2017 | Morgan |
| 2017/0318891 A1 | 11/2017 | Walterspiel |
| 2017/0332719 A1 | 11/2017 | Aaron |
| 2018/0000186 A1 | 1/2018 | Brown |
| 2018/0014771 A1 | 1/2018 | Merchant-Borna |
| 2018/0021661 A1 | 1/2018 | Bologna |
| 2018/0027913 A1 | 2/2018 | Thiel |
| 2018/0027914 A1 | 2/2018 | Cook |
| 2018/0035952 A1 | 2/2018 | Fraylick |
| 2018/0042326 A1 | 2/2018 | Mini Townson |
| 2018/0049484 A1 | 2/2018 | Markison |
| 2018/0092428 A1 | 4/2018 | Knight |
| 2018/0098594 A1 | 4/2018 | Marcus |
| 2018/0098595 A1 | 4/2018 | Steck |
| 2018/0116543 A1 | 5/2018 | Miller |
| 2018/0125143 A1 | 5/2018 | Herbert |
| 2018/0132557 A1 | 5/2018 | Torres |
| 2018/0153246 A1 | 6/2018 | Baldi |
| 2018/0154242 A1 | 6/2018 | Austin |
| 2018/0184732 A1 | 7/2018 | Plant |
| 2018/0184745 A1 | 7/2018 | Stone |
| 2018/0200591 A1 | 7/2018 | Davis |
| 2018/0213874 A1 | 8/2018 | Lanner |
| 2018/0229436 A1 | 8/2018 | Gu |
| 2018/0235304 A1 | 8/2018 | Fischer |
| 2018/0265738 A1 | 9/2018 | Rolland |
| 2018/0304598 A1 | 10/2018 | Drzal |
| 2018/0310881 A1 | 11/2018 | Yoon |
| 2018/0326288 A1 | 11/2018 | Simpson |
| 2018/0332918 A1 | 11/2018 | Nauman |
| 2018/0343952 A1 | 12/2018 | Lachance |
| 2018/0343953 A1 | 12/2018 | Erb |
| 2018/0360154 A1 | 12/2018 | Halldin |
| 2019/0014848 A1 | 1/2019 | Tutunaru |
| 2019/0014850 A1 | 1/2019 | Johnson, Jr. |
| 2019/0021413 A1 | 1/2019 | Abram |
| 2019/0021434 A1 | 1/2019 | Eiler |
| 2019/0029352 A1 | 1/2019 | Sadegh |
| 2019/0045870 A1 | 2/2019 | Safar |
| 2019/0059498 A1 | 2/2019 | Kovarik |
| 2019/0075876 A1 | 3/2019 | Burek |
| 2019/0090574 A1 | 3/2019 | Shaffer |
| 2019/0090576 A1 | 3/2019 | Guinta |
| 2019/0090578 A1 | 3/2019 | Tubbs |
| 2019/0090807 A1 | 3/2019 | Goode, II |
| 2019/0110546 A1 | 4/2019 | Wacter |
| 2019/0111658 A1 | 4/2019 | Gupta |
| 2019/0114690 A1 | 4/2019 | Paquette |
| 2019/0118486 A1 | 4/2019 | Compton |
| 2019/0133235 A1 | 5/2019 | Domanskis |
| 2019/0145740 A1 | 5/2019 | Czerski |
| 2019/0149644 A1 | 5/2019 | Black |
| 2019/0155969 A1 | 5/2019 | Haaland |
| 2019/0159540 A1 | 5/2019 | Pradeep |
| 2019/0166945 A1 | 6/2019 | Martin |
| 2019/0166946 A1 | 6/2019 | Vito |
| 2019/0167095 A1 | 6/2019 | Krueger |
| 2019/0174859 A1 | 6/2019 | Schmidt |
| 2019/0216158 A1 | 7/2019 | Leclaire |
| 2019/0216159 A1 | 7/2019 | Vanhoutin |
| 2019/0223535 A1 | 7/2019 | Miller, II |
| 2019/0231018 A1 | 8/2019 | Boutin |
| 2019/0239589 A1 | 8/2019 | Gamucci |
| 2019/0290982 A1 | 9/2019 | Davis |
| 2019/0307199 A1 | 10/2019 | Hall |
| 2019/0328071 A1 | 10/2019 | Stone |
| 2019/0380419 A1 | 12/2019 | Fischer |
| 2020/0000169 A1 | 1/2020 | Reinhall |
| 2020/0022444 A1 | 1/2020 | Stone |
| 2020/0039162 A1 | 2/2020 | Waatti |
| 2020/0060374 A1 | 2/2020 | Glover |
| 2020/0188733 A1 | 6/2020 | Beckwith |
| 2020/0205503 A1 | 7/2020 | Vanhoutin |
| 2020/0215415 A1 | 7/2020 | Bologna |
| 2020/0221807 A1 | 7/2020 | Morgan |
| 2021/0000209 A1 | 1/2021 | Neubauer |
| 2021/0001560 A1 | 1/2021 | Cook |
| 2021/0007432 A1 | 1/2021 | Santiago |
| 2021/0085011 A1 | 3/2021 | Santiago |
| 2021/0106091 A1 | 4/2021 | Glover |
| 2021/0187897 A1 | 6/2021 | Reinhall |
| 2021/0315306 A1 | 10/2021 | Robinson |
| 2021/0323263 A1 | 10/2021 | Cagle |
| 2022/0125148 A1 | 4/2022 | Mcdermott |
| 2022/0160068 A1 | 5/2022 | Rietdyk |
| 2022/0225720 A1 | 7/2022 | Frieder, Jr. |
| 2023/0061962 A1 | 3/2023 | Christopher |
| 2023/0119234 A1 | 4/2023 | Stoutamire |

FOREIGN PATENT DOCUMENTS

| | | |
|---|---|---|
| CH | 692011 | 1/2002 |
| CN | 1735921 | 2/2006 |
| CN | 2870519 | 2/2007 |
| CN | 2896943 | 5/2007 |
| CN | 101204904 | 6/2008 |
| CN | 102972901 | 3/2013 |
| CN | 113423296 | 9/2021 |
| DE | 3222681 | 12/1983 |
| DE | 3338188 | 5/1985 |
| DE | 3603234 | 8/1987 |
| DE | 3632525 | 8/1996 |
| DE | 19745960 | 10/1997 |
| DE | 19707495 | 8/1998 |
| DE | 102014106024 | 10/2015 |
| EP | 0315498 | 5/1989 |
| EP | 0512193 | 11/1992 |
| EP | 571065 | 11/1993 |
| EP | 623292 | 11/1994 |
| EP | 630589 | 12/1994 |
| EP | 770338 | 5/1997 |
| EP | 1199000 | 4/2002 |
| EP | 1219189 | 7/2002 |
| EP | 1388300 | 2/2004 |
| EP | 1538935 | 6/2005 |
| EP | 1627575 | 2/2006 |
| EP | 1708587 | 10/2006 |
| EP | 1836913 | 9/2007 |
| EP | 1972220 | 9/2008 |
| EP | 2042048 | 4/2009 |
| EP | 2071969 A2 | 6/2009 |
| EP | 2103229 | 9/2009 |
| EP | 2156761 | 2/2010 |
| EP | 2289360 | 3/2011 |
| EP | 2389822 | 11/2011 |
| EP | 2428129 | 3/2012 |
| EP | 2525187 | 11/2012 |
| EP | 3000341 | 3/2016 |
| EP | 3130243 | 2/2017 |
| GB | 256430 | 8/1926 |
| GB | 2398476 | 8/2004 |
| GB | 2481855 | 1/2012 |
| GB | 2490894 | 11/2012 |
| GB | 2490894 A | 11/2012 |
| JP | 2000045119 | 2/2000 |
| JP | 2000245888 | 9/2000 |
| JP | 2001020121 | 1/2001 |
| NL | 2003713 | 4/2011 |
| RU | 2150874 | 6/2000 |
| RU | 2005129896 | 4/2007 |
| RU | 2308763 | 10/2007 |
| WO | 9534229 | 12/1995 |
| WO | 1998023174 | 6/1998 |
| WO | 9836213 | 8/1998 |
| WO | 9904685 | 2/1999 |
| WO | 9911152 | 3/1999 |
| WO | 1999042012 | 8/1999 |
| WO | 2000067998 | 11/2000 |
| WO | 0152676 | 7/2001 |
| WO | 2002028211 | 4/2002 |
| WO | 02053024 | 7/2002 |
| WO | 2004023913 | 3/2004 |
| WO | 2004052133 | 6/2004 |
| WO | 2005000059 | 1/2005 |

(56) References Cited

FOREIGN PATENT DOCUMENTS

| WO | 2005060392 | 7/2005 |
| WO | 2006036567 | 4/2006 |
| WO | 2007013106 | 2/2007 |
| WO | 2007047923 | 4/2007 |
| WO | 2008085108 | 7/2008 |
| WO | 2010001230 | 1/2010 |
| WO | 2011084660 | 7/2011 |
| WO | 2011087435 | 7/2011 |
| WO | 2011148146 | 12/2011 |
| WO | 2012047696 | 4/2012 |
| WO | 2012074400 | 6/2012 |
| WO | 2012099633 | 7/2012 |
| WO | 2013033078 | 3/2013 |
| WO | 2017029488 | 2/2017 |
| WO | 17171694 | 10/2017 |
| WO | 2018072017 | 4/2018 |
| WO | 2019195339 | 10/2019 |
| WO | 2019200409 | 10/2019 |
| WO | 2019237025 | 12/2019 |

OTHER PUBLICATIONS

International Search Report for PCT/US2005/032903 mailed Mar. 10, 2006.
International Search Report for PCT/US2006/000536 mailed Oct. 2, 2006.
Written Opinion for PCT/US2006/000536 mailed Jul. 10, 2007.
International Search Report and Written Opinion issued in PCT/US2017/043132 on Sep. 28, 2017 (10 pages).
International Search Report and Written Opinion issued in PCT/US2019/066084 on Mar. 9, 2020 (13 pages).
International Search Report and Written Opinion issued in PCT/US2019/062700 on Jan. 30, 2020 (17 pages).
International Search Report and Written Opinion issued in PCT/US2019/062697 on Feb. 3, 2020 (18 pages).
International Search Report and Written Opinion issued in PCT/US2019/046935 on Dec. 23, 2019 (17 pages).
Walmink et al., Interaction opportunities around helmet design, 4 pages (Year: 2014).
Yu et al., Motorcycle helmet safety design research, 5 pages (Year: 2010).
Cai et al., A shape-based helmet fitting system for concussion protection, 4 pages (Year: 2015).
European Search Report dated Sep. 1, 2016 in corresponding EP Appln. No. 14740903.1 (7 pages).
First Examination Report issued in Australian Appln. No. 2014207532 dated Apr. 13, 2017 (3 pages).
Office Action issued in Chinese Appln. No. 201480013229.7 dated Feb. 7, 2018 (26 pages).
Office Action issued in Chinese Appln. No. 201480013229.7 dated Mar. 13, 2017 (55 pages).
Office Action issued in EP Appln. No. 14740903.1 dated Aug. 3, 2017 (5 pages).
Office Action issued in Japanese Appln. No. 2015-553831 dated Dec. 12, 2017 (13 pages).
Office Action issued in Russian Appln. No. 2015129408 dated Dec. 27, 2017 (8 pages).
First Examination Report issued in New Zealand Appln. No. 710449 dated Mar. 2, 2018 (5 pages).
Bai et al., A Portable ECG and Blood Pressure Telemonitoring System, Jul./Aug. 1999, IEEE Engineering in Medicine and Biology, pp. 63-70.
Coleman et al., Ambient Head Temperature and Football Helmet Design, Mar. 1972, Medicine, Science, Exercise and Sports Journal, 19 pages.

Declaration from Nelson Kraemer regarding the discovery of the Radio Telemetry Project materials, Dec. 5, 2017 (2 pages).
Duma, Stefan M., Analysis of Real-time Head Accelerations in Collegiate Football Players, Jan. 2005, Clin J Sport Med, vol. 15, No. 1, pp. 3-8.
Foxlin et al., Miniature 6-DOF Inertial System for tracking HMDs, Apr. 13-14, 1998, SPIE, Helmet and Head-Mounted Displays III, AeroSense 98, vol. 3362.
Greenwald, Richard M., Head Impact Severity Measures for Evaluating Mild Traumatic Brain Injury Risk Exposure, Apr. 2008, Neurosurgery, 62(4), pp. 789-798.
King, A. I. et al., "Mechanics of the Head/Neck." The Biomedical Engineering Handbook: Second Edition. Dec. 28, 1999. CRC Press LLC. pp. 23-1:23-12.
Medendorp et al., Off-centric Rotation Axes in Natural Head Movements: Implications for Vestibular Reafference and Kinematic Redundancy, The American Physiological Society, 1998, pp. 2025-2039.
Merono et al., Movement Evaluator System Via R.F. Transmission, 1995 IEEE, pp. 94-97.
Moon, Donald W., et al., "Peak Head Acceleration of Athletes During Competition-Football," Medicine and Science in Sports, Spring 1971, vol. 3, No. 1, pp. 44-50.
Murray, C., Smart Helmets Monitor Football Injuries, Dec. 18, 2003, Embedded.com.
Naunheim, Rosanne S., et al. "Comparison of impact data in hockey, football, and soccer." Journal of Trauma and Acute Care Surgery 48.5 (2000): 938-941.
Reid et al., Head Protection in Football, Sports Medicine, Mar./Apr. 1974, pp. 86-92.
Schatz, P., et al., "Computer-Based Assessment of Sports-Related Concussion", Applied Neuropsychology, 2003, vol. 10, No. 1, pp. 42-47.
Echeta, I., Feng, X., Dutton, B. et al. Review of defects in lattice structures manufactured by powder bed fusion, International Journal of Advanced Manufacturing Technology 106, 2649-2668 (2020), at https://doi.org/10.1007/s00170-019-04753-4.
Padgaonkar, A.J. et al., "Measurement of Angular Acceleration of a Rigid Body Using Linear Accelerometers," Journal of Applied Mechanics, Sep. 1975, pp. 552-556.
Gibilisco, "Encode." The Illustrated Dictionary of Electronics. McGraw-Hill. 2001. Eighth edition. p. 257.
Puers et al., A Telemetry System for the Detection of Hip Prosthesis Loosening by Vibration Analysis, Aug. 25, 2000, Sensors and Actuators, vol. 85, pp. 42-47.
Report No. 1062—Radio Telemetry Project, Progress Report No. 1, Jun. 9, 1964 (253 pages).
Report No. 1062—Radio Telemetry Project, Appendix A-C, Apr. 1963 (115 pages).
Report No. 1062—Radio Telemetry Project, Appendix D, Book 1, 1964 (108 pages).
Report No. 1062—Radio Telemetry Project, Appendix D, 1963 (159 pages).
Radio Telemetry Project Test Data, Aug. 25, 1964 (24 pages).
Radio Station License for Radio Telemetry Project, Jul. 7, 1965 (2 pages).
Operating Instructions for Radio Telemetry System, Apr. 1967 (10 pages).
Various Photographs related to Radio Telemetry Project, Oct. 1966 (84 pages).
Tan et al., Ballistic impact analysis of an advanced combat helmet with interior cushioning system on a Hybrid3 headform, 5 pages (Year: 2011).
Riddell Diamond Technology (on-line), dated Jun. 10, 2020. Retrieved from Internet Jun. 7, 2023, URL: http://web.archive.org/web/20200610005724/http://content.riddell.com/Diamond/ (4 pages) (Year: 2020).

* cited by examiner

4

4

John T. Riddell

43

41

27

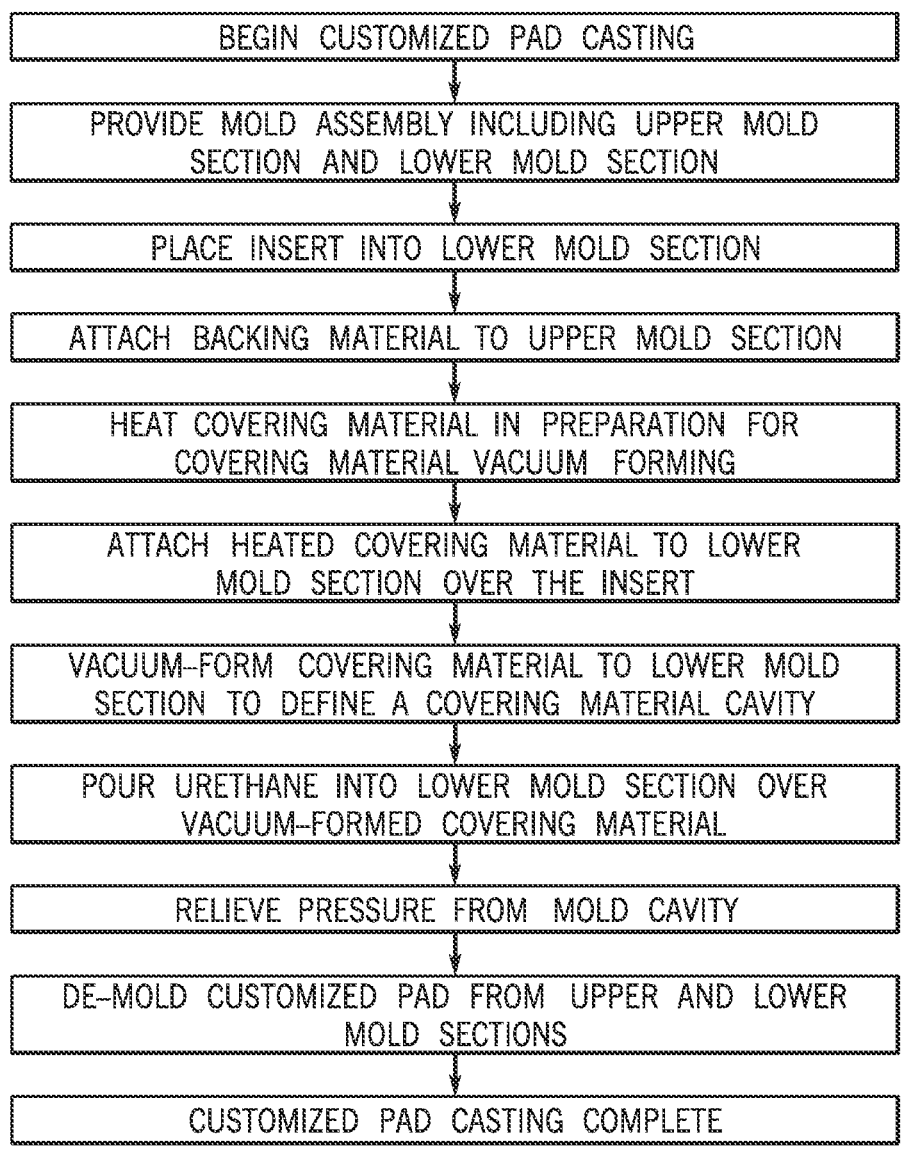

BEGIN CUSTOMIZED PAD CASTING

PROVIDE MOLD ASSEMBLY INCLUDING UPPER MOLD SECTION AND LOWER MOLD SECTION

PLACE INSERT INTO LOWER MOLD SECTION

ATTACH BACKING MATERIAL TO UPPER MOLD SECTION

HEAT COVERING MATERIAL IN PREPARATION FOR COVERING MATERIAL VACUUM FORMING

ATTACH HEATED COVERING MATERIAL TO LOWER MOLD SECTION OVER THE INSERT

VACUUM-FORM COVERING MATERIAL TO LOWER MOLD SECTION TO DEFINE A COVERING MATERIAL CAVITY

POUR URETHANE INTO LOWER MOLD SECTION OVER VACUUM-FORMED COVERING MATERIAL

RELIEVE PRESSURE FROM MOLD CAVITY

DE-MOLD CUSTOMIZED PAD FROM UPPER AND LOWER MOLD SECTIONS

CUSTOMIZED PAD CASTING COMPLETE

FIG. 11

SYSTEM AND METHOD OF ASSEMBLING A PROTECTIVE SPORTS HELMET

CROSS-REFERENCE TO RELATED APPLICATIONS

This application is a continuation of U.S. Utility application Ser. No. 17/567,760, filed Jan. 3, 2022, which is a continuation of U.S. Utility application Ser. No. 17/026,882 filed on Sep. 21, 2020, which is a continuation of U.S. Utility application Ser. No. 15/655,535 filed on Jul. 20, 2017, which claims the benefit of U.S. Provisional Application No. 62/364,629 filed on Jul. 20, 2016, the entire content of which are hereby incorporated by reference in their entirety for all purposes.

TECHNICAL FIELD

This disclosure relates to (i) systems and methods for acquiring, storing and processing a player's unique data, namely the player's anatomical features, where that player is to wear an article of protective sports equipment, (ii) for systems and methods of using the player's unique data to manufacture an article of protective sports equipment with a custom formed internal padding assembly that substantially corresponds to the player's unique data, and (iii) an article of protective sports equipment designed using the acquired and processed unique player's data and including the custom formed internal padding assembly that provides improved fit and comfort for the player. Accordingly, the disclosure provides for a system and method to design and manufacture bespoke protective sports equipment that is purposely designed and manufactured to match the player's anatomical specifications, namely the topography and contours of the player's body part.

BACKGROUND

Most, if not all, contact team sports require players to wear protective equipment, such as a helmet, while playing the sport during both practice and game play. For example, youth, high school, club, college and professional levels of football, lacrosse, hockey, baseball and softball require players to wear a protective helmet and protective equipment for a body part (e.g., shoulder pads for football, hockey and lacrosse, catcher's leg guards and chest guards for baseball and softball). This protective equipment generally comprises at least two layers: a substantially rigid outer shell, typically formed from polymers and composite materials including plastics, and an internal padding assembly, which can be formed from a variety of impact absorbing materials. Most protective helmets for contact team sports also include a chin strap that secures the helmet on the player's head during the course of play such that helmet is not dislodged when the player and/or helmet receives a first impact whereby the helmet is properly positioned to protect the player from a second impact. Football and lacrosse helmets also include a face guard or face mask that overlie the player's facial region. Hockey helmets typically include a face guard, or clear shield that overlies at least the player's eye region. Baseball batter's helmets typically are "open-faced" and thus lack a face guard, although baseball catcher's helmets include a face guard to protect the catcher. Unlike baseball batter's helmets, softball batter's helmets include a face guard, which typically extends over the player's mouth and jaw region while leaving the eye region open.

Conventional protective equipment, including helmets can be found in multiple standard sizes depending upon the playing level—youth, varsity or professional—to which the helmet is intended for use. For example, youth level football helmets can be found in a number of standard sizes, including extra-small, small, medium, large and extra-large, where the helmet size is based upon the circumference of the player's head. Similarly, varsity and professional level football helmets can be found in a number of standard sizes, including small, medium, large and extra-large, where again the helmet size is based upon the circumference of the player's head. For example, a "medium" varsity level football helmet is sized for a player having a head circumference of 20.375-22.0 inches, a "large" varsity level football helmet is sized for a player having a head circumference of 22-23.5 inches, and an "extra large" varsity helmet is sized for a player having a head circumference of 23.5 inches and above. The football helmet's external shell and internal padding assembly are configured to receive a player's head, so a particular helmet size is selected for a player based upon his/her head size, namely his/her head circumference. When properly sized, the football helmet should provide a secure fit on the player's head and be comfortable, while not irritating the player when worn during the course of play.

It is not uncommon for the internal padding assembly found in conventional protective sports helmets to be comprised of multiple pad elements that can be selectively adjusted to a limited extent in order to accommodate a player's (i) head size and (ii) head contours or topography. However, the extent of that adjustment is limited in a number of ways, including that the internal pad assembly comprises an arrangement of pad elements each including an elastically deformable, energy absorbing pad member positioned within a pad housing. Thus, the internal pad assembly is configured in a standard size with maximum dimensions and the internal pad assembly must fit within a standardized helmet shell size. It is understood that the helmet shell is formed to be substantially rigid to withstand multiple impacts and the helmet shell's overall configuration cannot be greatly expanded or contracted. An example of a conventional internal padding assembly is one that features multiple pad elements each with an inflatable component that allows for a fluid, such as air, to be used to selectively inflate or deflate the pad elements to better conform the internal padding assembly to the player's head size and contours. Examples of a conventional internal padding assembly can be found in U.S. Pat. Nos. 6,934,971, 8,544, 117, and U.S. patent application publication US2015000808.

Conformity of the internal padding assembly to the player's head size and contours is limited by a number of factors inherent to pad elements, including, but not limited to, the size and configuration of the pad member, the size and configuration of the pad housings, and the placement of the pad elements in the padding assembly relative to the player's head. As the extent of the adjustment of a conventional internal padding assembly to the player's head contours and topography is limited, the player may perceive the fit of the helmet to be inadequate and/or may not find the fit of the helmet to be sufficiently comfortable. Thus, the player wearing a conventional protective sports helmet might not be entirely happy with the helmet, which may impact his/her selection of the helmet and his/her performance while playing the contact sport. Even if the player is happy with the comfort of the conventional helmet and accepts the conventional helmet's fit on his/her head, the helmet may not be ideally positioned and can be susceptible to excessive movement when the helmet is impacted during the course of play.

The apparatus, systems and methods disclosed herein address the problems discussed above and other problems while providing advantages and aspects not provided by conventional protective sports helmets. A full discussion of the features and advantages of the present disclosure is deferred to the following detailed description, which proceeds with reference to the accompanying drawings.

SUMMARY

The present disclosure provides systems and methods for acquiring, storing and processing a player's unique data set concerning the anatomical features of the player's body part (e.g., head) in order to design and manufacture a piece of bespoke protective sports equipment (e.g., helmet). The bespoke protective sports equipment can include a custom formed internal padding assembly that can be configured to match or substantially correspond to the player's unique anatomical body part data. The bespoke equipment, including its internal padding assembly, provides significantly improved fit and comfort for the player. Accordingly, the disclosure provides for a system and method to design and manufacture bespoke protective sports equipment that is purposely designed to either match or substantially correspond to the player's anatomical specifications, namely the topography and contours of the player's equipment body part and facial region, including the jaw region.

The present disclosure also provides a method for manufacturing a piece of bespoke protective sports equipment. In the context of a bespoke helmet, the method may include placing a scanning hood on a player's head, selecting a scanning helmet size and placing a scanning helmet of the selected scanning helmet size on the player's head over the scanning hood, adjusting the scanning helmet according to the player's wearing preferences, capturing a helmet scan of the player wearing the scanning hood and scanning helmet with a scanning apparatus, removing the scanning helmet from the player's head and capturing a hood scan with the scanning apparatus while the player is wearing the scanning hood, opening the helmet scan in three-dimensional software and properly aligning the helmet scan with a shell template within the three-dimensional software, opening the hood scan in the three-dimensional software and properly aligning the hood scan with the properly-aligned helmet scan within the three-dimensional software, comparing the properly-aligned hood scan with data of the scanning helmet size and determining whether scanning helmet size tolerances are satisfied for the properly-aligned hood scan, creating at least one insert file from the properly-aligned hood scan, fabricating an insert from the insert file, placing the insert into a lower mold section, attaching a backing material to an upper mold section, heating an ethylene-vinyl acetate (EVA) cover and attaching the heated EVA cover to the lower mold section, vacuum-forming the EVA cover to an insert surface, pouring padding material into the vacuum-formed EVA cover, allowing the poured padding material to cool and solidify into a customized pad, removing the customized 4 pad from the vacuum-formed EVA cover and installing the customized pad into the customized protective sports helmet.

The disclosure also provides for a bespoke protective sports equipment fabricated from a process that comprises the numerous steps discussed in the foregoing paragraph. Other features and advantages of the disclosure will be apparent from the following specification taken in conjunction with the following drawings. Implementations of the described techniques may include hardware, a method or process, or software for a mobile device on a computer-accessible medium. The details of one or more implementations are set forth in the accompanying drawings and the description below. Other features will be apparent from the description and drawings, and from the claims.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 11 illustrates a method of casting customized pads using inserts according to exemplary embodiments of the preset disclosure.

DETAILED DESCRIPTION

Figures 1A, 1B:
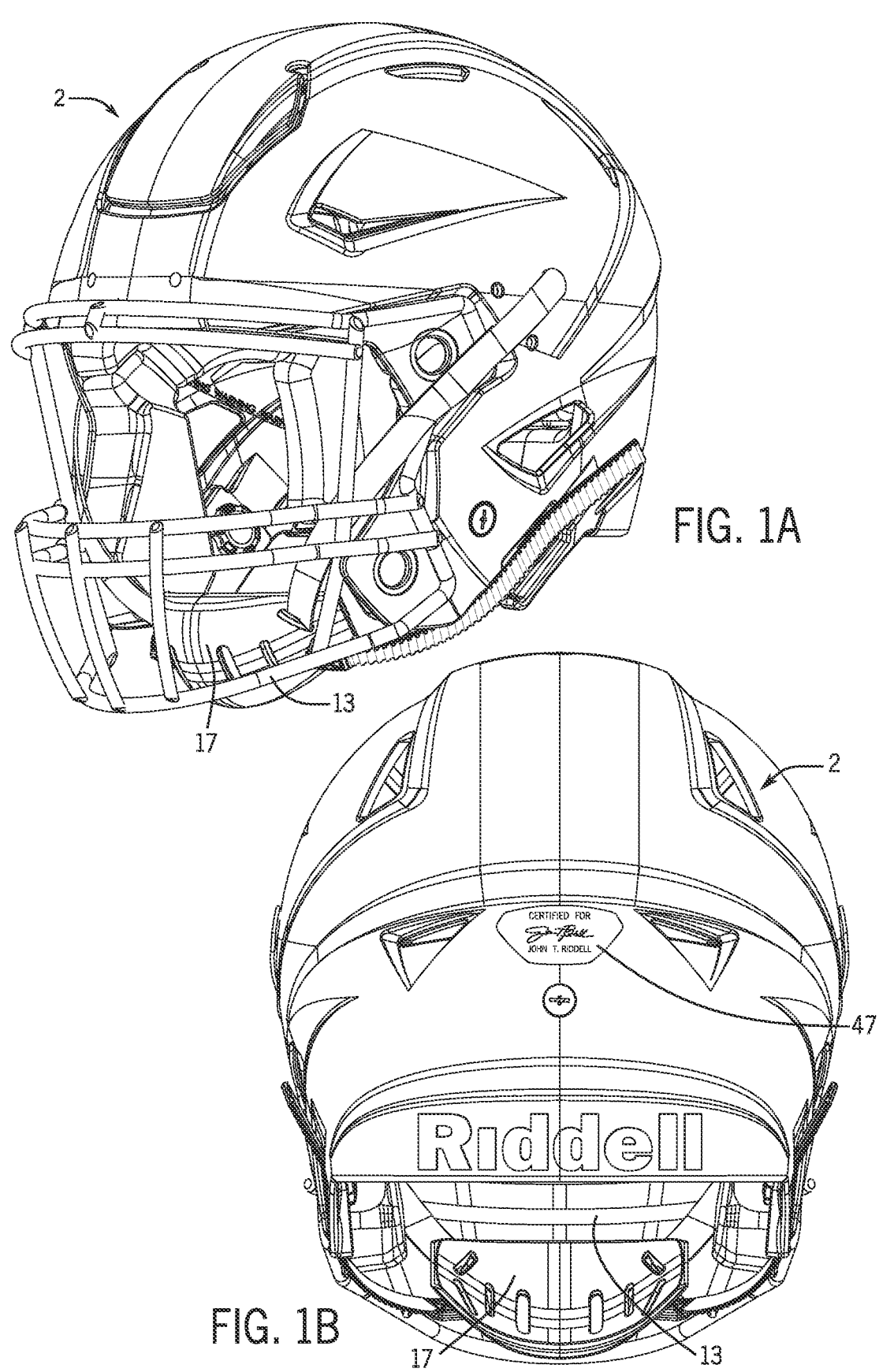
FIG. 1A is a perspective view of a bespoke helmet according to exemplary embodiments of the present disclosure.
FIG. 1B is a rear view of the bespoke helmet of FIG. 1.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present disclosure.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated.

This disclosure relates to (i) systems and methods for acquiring, storing and processing a player's unique data, namely the player's anatomical features, where that player is to wear protective sports equipment worn against a body part while engaged in a sporting activity, (ii) for systems and methods of using the player's unique data to manufacture a piece or article of protective sports equipment with a custom formed internal padding assembly that at least substantially corresponds to the player's unique data, (iii) for systems and methods of using the player's unique data to manufacture the bespoke protective sports equipment with both a custom formed shell and internal padding assembly that match the player's unique data. As one example of the protective sports equipment, a protective sports helmet is designed using the acquired and processed unique player's data and including the custom formed internal padding assembly that provides an improved fit for the player. As used herein, the term "player" is a person who wears the protective sports equipment (e.g., helmet or shoulder pads), is gender neutral and is synonymous with the terms "helmet wearer" or "wearer." The term "anatomical features" means the dimensions, topography and contours of the player's body part (e.g., head including the player's skull, facial region, eye region and jaw region). Because the disclosed protective equipment is worn on the player's body part (e.g., head, shoulder, knee, elbow, hip, shins) the "anatomical features" term includes the outer configuration of the player's body part. In the context of a bespoke helmet, the internal padding assembly makes contact with the player's hair, the "anatomical features" term also includes the type, amount and volume of the player's hair or lack thereof. For example, some players have long hair, while other players have no hair (i.e., are bald).

The inventive bespoke protective sports equipment and system can be configured as a shoulder pad assembly, an elbow pad, a thigh pad, a knee pad, a shin guard, a chest guard, or a hip pad. Shoulder pad assemblies typically include two arches that overlie the shoulder region, an extent of the back region and an extent of the chest region of the player, as well as an internal padding assembly affixed to the arches. In the context of a protective sports helmet worn by a player engaged in football, hockey or lacrosse, the disclosed helmet is "bespoke," meaning that the internal padding assembly is customized to the player wearing the helmet because it is purposely designed, configured and manufactured to match anatomical features of the player's head. Much like a tailor provides a bespoke suit that is made to order with pants and a jacket that match the customer's specific anatomical needs (e.g., waist size, chest size, sleeve length), the system and methods disclosed allow for a bespoke protective sports helmet that provides improved fit and comfort for the player wearing the helmet. In another embodiment, the helmet is "fully bespoke," meaning that both the helmet shell and the padding assembly are purposely designed, configured and manufactured to match the anatomical features of the player's head. In yet another embodiment, the disclosed helmet and its internal padding assembly are "partially bespoke," meaning that the helmet and the padding assembly are purposely designed and configured to substantially correspond to the anatomical features of the player's head. In this embodiment and as explained below, the internal padding assembly of the partially bespoke helmet is comprised of an arrangement of pads that are selected from a large number of pre-manufactured pads. In all three versions—bespoke, fully bespoke and partially bespoke—highly sensitive scans of the player, with and without a helmet, are conducted to capture his/her anatomical features to help design the internal padding assembly.

The disclosed system and methods may be used to design and manufacture an article of bespoke protective equipment worn against the player's body part while engaged in playing the sport. The following paragraphs focus on the system and methods used to design and manufacture a bespoke protective sports helmet for a football player, hockey player, or lacrosse player or any other player in a contact sport wherein the helmet is designed and intended to receive, withstand and absorb multiple impacts during the course of play. As discussed below, the disclosed bespoke protective sports helmet for football, hockey and lacrosse players include at least two layers: (i) an outer shell typically formed from polymers and composite materials, including plastics and carbon fiber-reinforced polymers, and (ii) an internal energy attenuating assembly which is formed from cast urethane foam and is configured to match the player's head topography. The outer shell can be formed from materials that provide it with a generally rigid configuration in a pre-impact state, however, the outer shell may experience some elastic localized deformation in response to an impact or series of impacts in an impact state. Because this localized deformation is elastic, the outer shell returns to its original configuration of the pre-impact state. The disclosed system and methods may also be used to design and manufacture a bespoke protective helmet for baseball, namely a batter's helmet or a catcher's helmet, where these helmets can receive a number of high velocity impacts from a thrown or batted baseball.

Bespoke Helmet and System

Figures 1C, 1D:
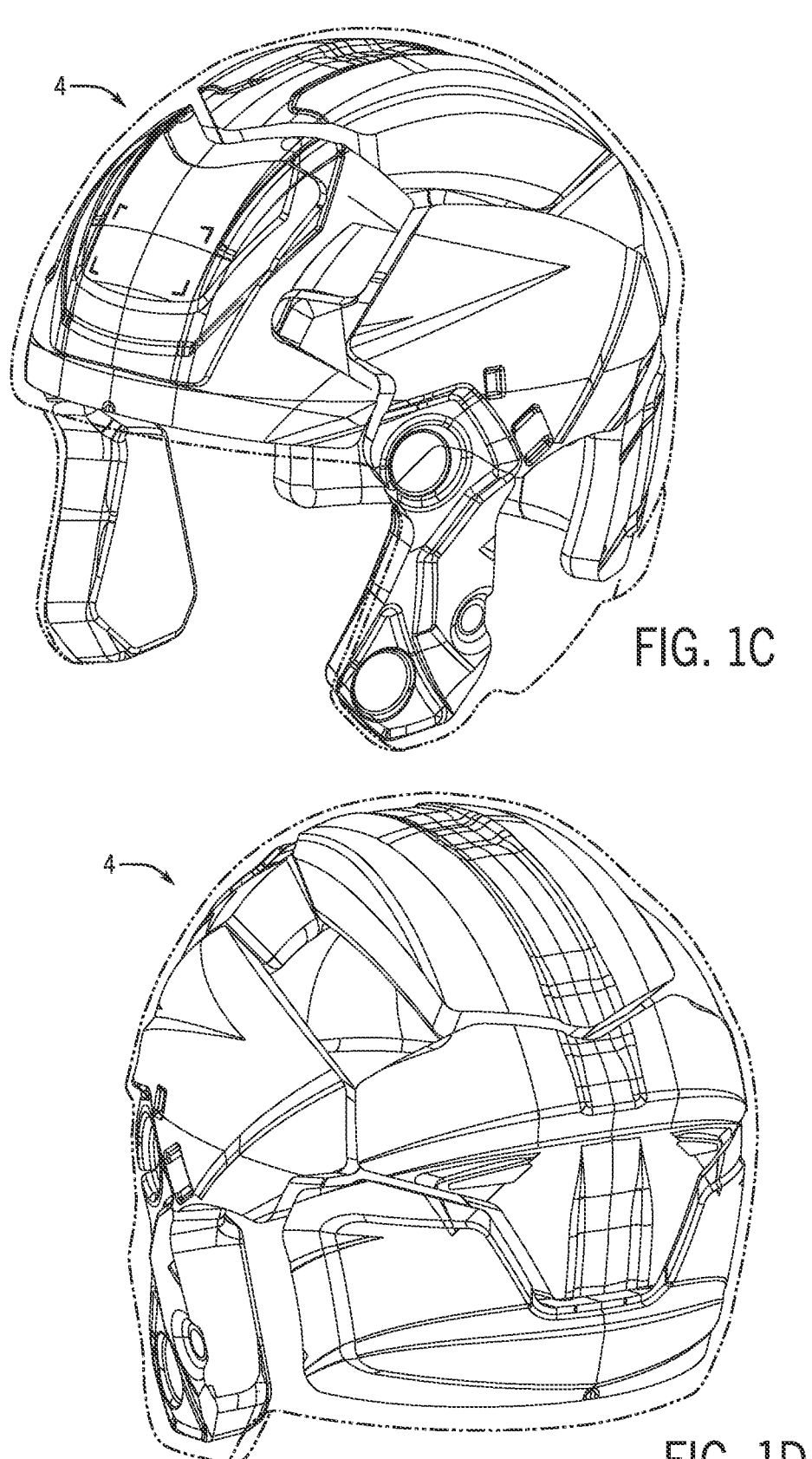
FIG. 1C is an upper perspective view of a customized internal padding assembly according to exemplary embodiments of the present disclosure.
FIG. 1D is a rear perspective view of the customized internal padding assembly of FIG. 1C.
Figures 1E, 1F:
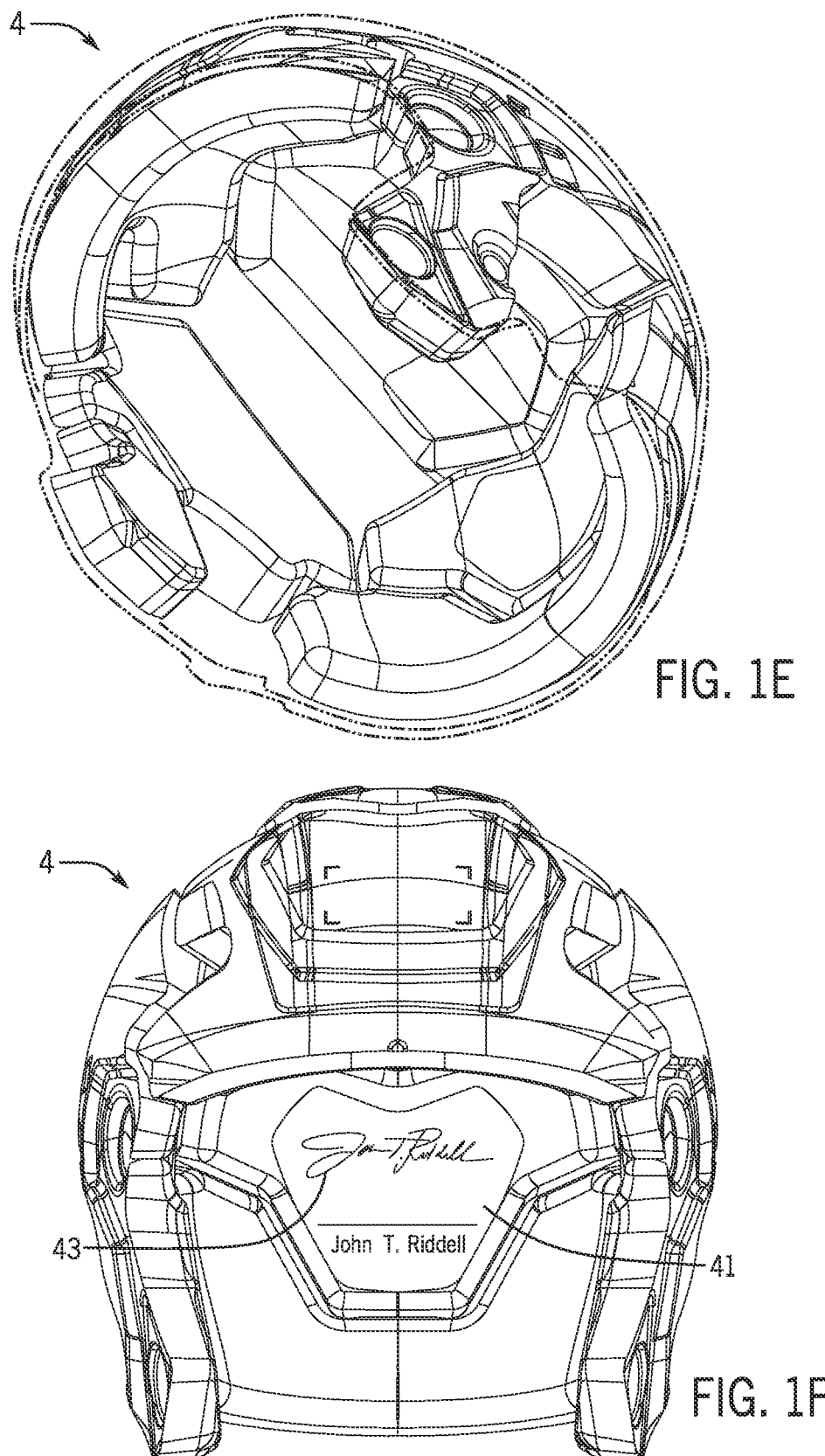
FIG. 1E is a lower perspective view of the customized internal padding assembly of FIG. 1C.
FIG. 1F is a front view of a customized internal padding assembly according to exemplary embodiments of the present disclosure.

In the bespoke helmet and system embodiment, the disclosed system and methods include a number of processes and sub-processes that are used to acquire and process data concerning the player's unique anatomical features and then use the processed data to manufacture a bespoke protective sports helmet, or a customized helmet, 2, exemplary shown in FIG. 1A, with a customized internal padding assembly 4, exemplary shown in FIG. 1C that matches the player's unique data. The bespoke helmet 2 includes a face guard or facemask 13 and a chin strap assembly 17 that secures the helmet 2 to a desired wearing position on the player wearing the helmet 2. Those processes and sub-processes, as well as the bespoke protective sports helmet, are discussed below.

Figure 2A:
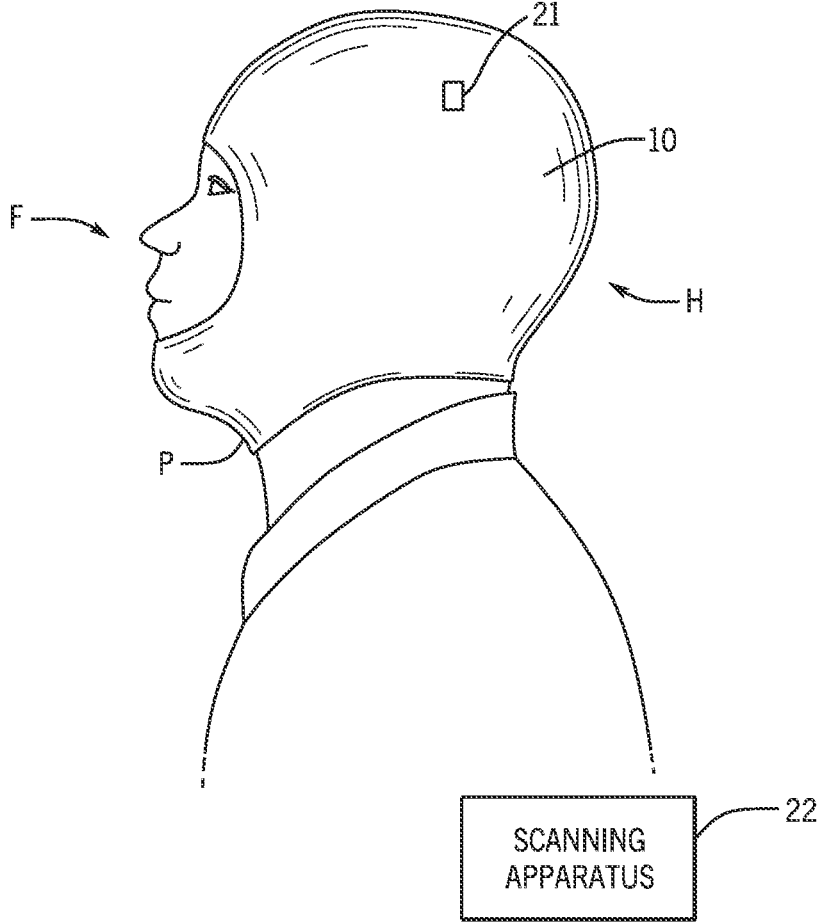
FIG. 2A illustrates a side view of a player wearing a scanning hood according to exemplary embodiments of the preset disclosure.
Figure 2B:
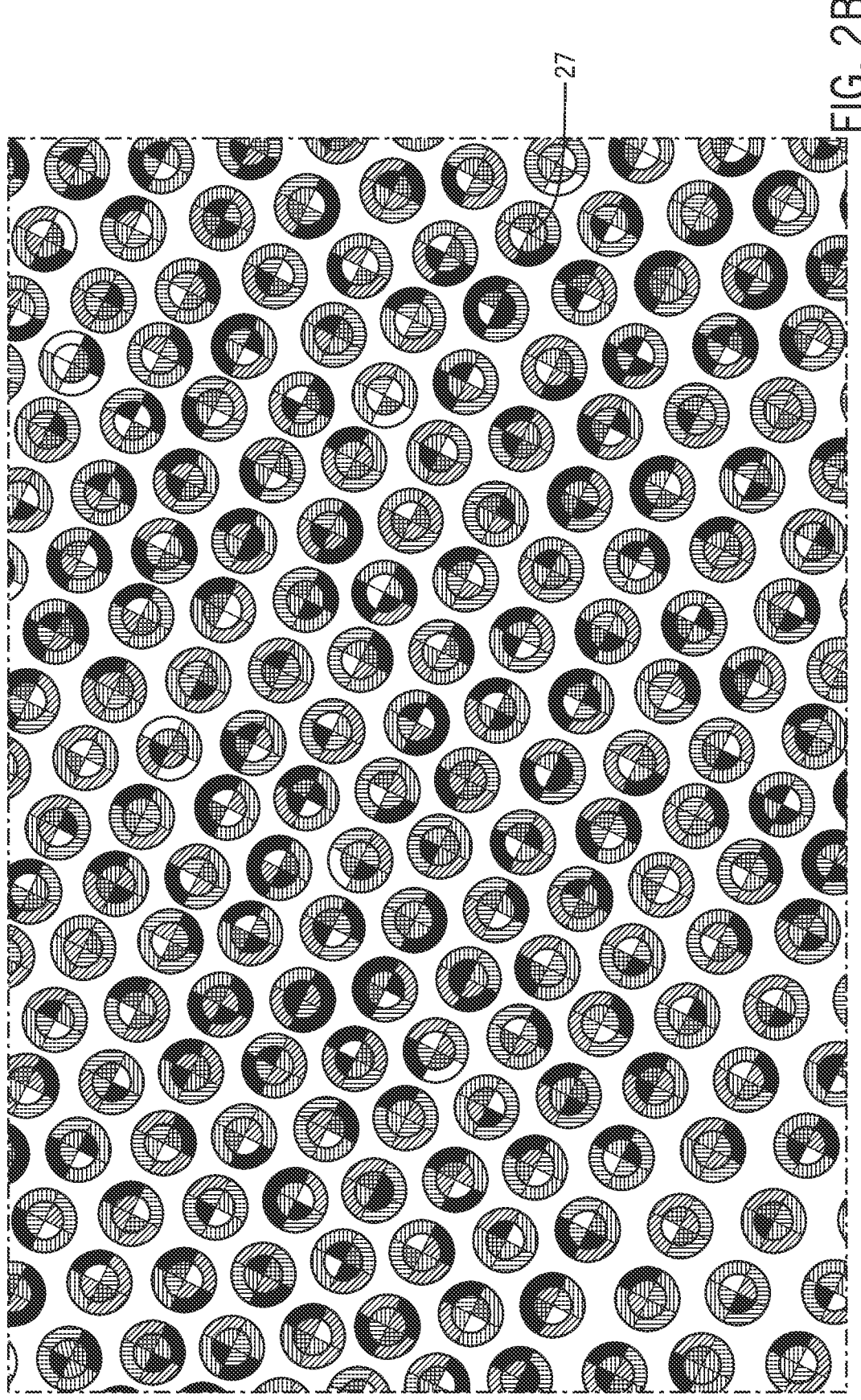
FIG. 2B illustrates a surface of a scanning hood according to exemplary embodiments of the present disclosure.

A method for acquiring, storing and processing a player's unique data, namely the player's anatomical features, commences with conducting at least two scans of the player's head H and facial region F where one scan involves the player P wearing a scanning hood 10 and a scanning helmet 15, and a second scan involves the player P wearing only the scanning hood 10. A person skilled in the art recognizes that the order of the first and second scans can be reversed. FIGS. 2A-3B and 7 illustrate a process for acquiring the player's unique anatomical feature data while he or she is wearing the scanning hood 10 alone, and wearing both the scanning hood 10 and the scanning helmet 15. As an initial step, the scanning hood 10 is placed on, or over, the head H of the player P. The scanning hood 10 may be a flexible apparatus sized to fit over the player's head H and achieve a tight or snug fit around the player's head H due to elastic properties and dimensions of the scanning hood 10, as can be seen in FIG. 2A. The scanning hood 10 provides for increased accuracy when performing a scan of the player's head H by conforming to the anatomical features the player's head H and facial region F, namely the topography and contours of the head H and facial region F, while reducing effects of hair. The scanning hood 10 may be made from neoprene, lycra or any other suitably elastic material known to those skilled in the art. Once the scanning hood 10 is placed over the player's head H, the player and/or another person such as an operator may verify that the scanning hood 10 is appropriately positioned and oriented on the player's head H. The scanning hood 10 is re-adjusted if the scanning hood 10 is found to not be appropriately positioned on the player's head H or is uncomfortable. In some embodiments, it is ensured that the scanning hood 10 fully covers the portions of the player's head H (e.g., upper jaw regions) that contact a customized internal padding assembly 4. In some embodiments, the scanning hood 10 is positioned to fully cover the player's brow line, including the eyebrows. In the event the body part to be scanned is not the player's head, the hood 10 can be configured as a body part scanning interface article, such as a wrap or sleeve, that envelops the body part to be scanned and subsequently protected by the bespoke protective body part equipment.

A size for the scanning helmet 15 is then selected from a range of scanning helmet 15 shell sizes. As an example for an adult player P, the scanning helmet 15 shell sizes may include medium, large and extra-large, although additional or intermediate sizes are certainly within the scope of this disclosure. The selection of the scanning helmet 15 shell size may be by determined by previous player experiences or by estimations or measurements taken during or before the acquisition of the player's unique data. Once the size of the scanning helmet 15 is selected, the scanning helmet 15 is placed over the player's head H while the player P is wearing the scanning hood 10. After the scanning helmet 15 is placed on the player's head H, the player adjusts the scanning helmet 15 to a preferred wearing position or configuration, which includes adjusting the chin strap assembly 17 by tightening or loosening it. It is not uncommon for a player P to repeatedly adjust the scanning helmet 15 to attain his or her preferred wearing position because this position is a matter of personal preference. For example, some players prefer to wear their helmet lower on their head H with respect to their brow line, while other players prefer to wear their helmet higher on their head H with respect to their brow line. The preferred wearing position is also a function of the face guard 13 and the player looking through the face guard 13 to assess the field of view.

Figure 3A:
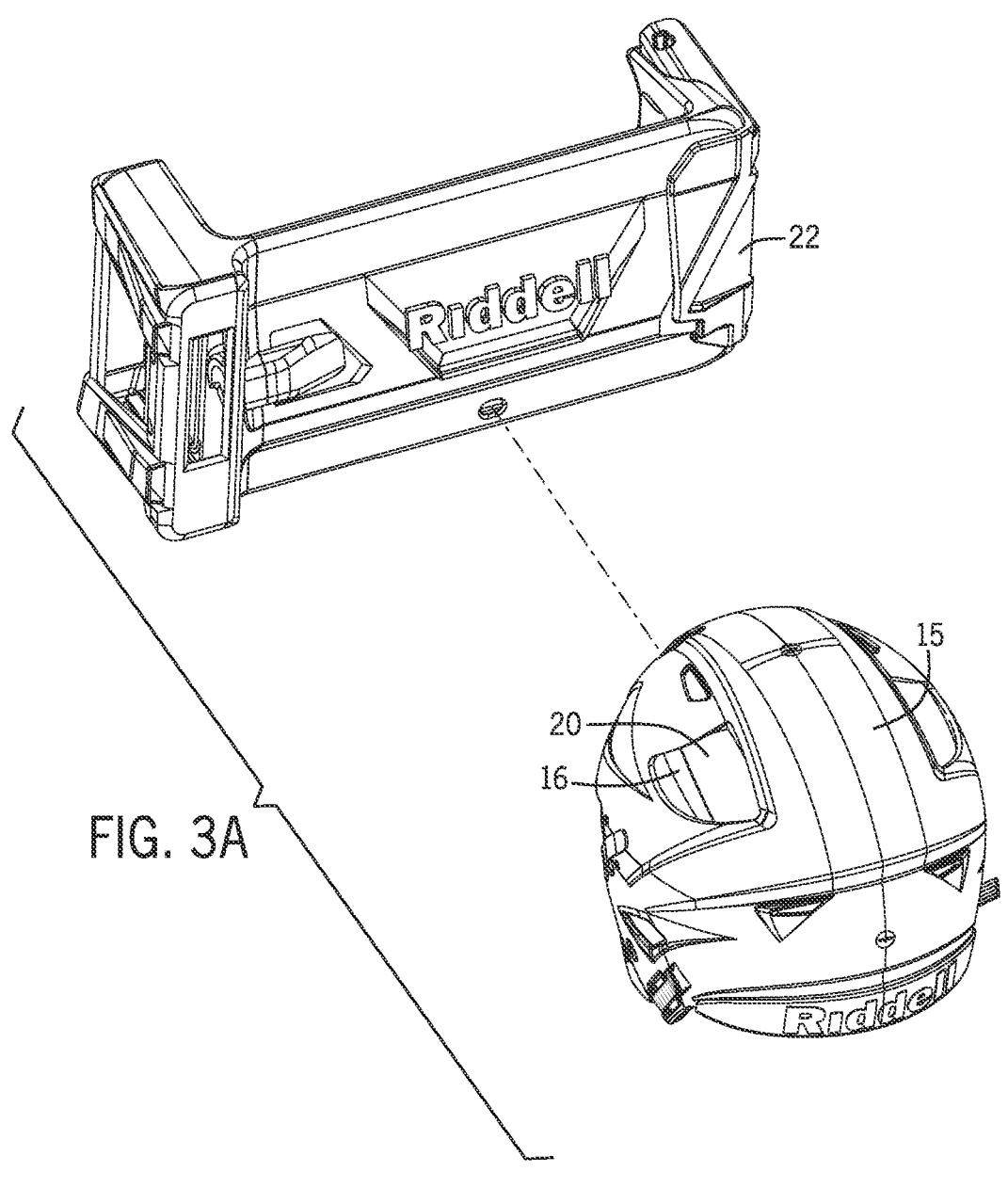
FIG. 3A illustrates a scanning helmet and a scanning apparatus according to exemplary embodiments of the present disclosure.
Figure 3B:
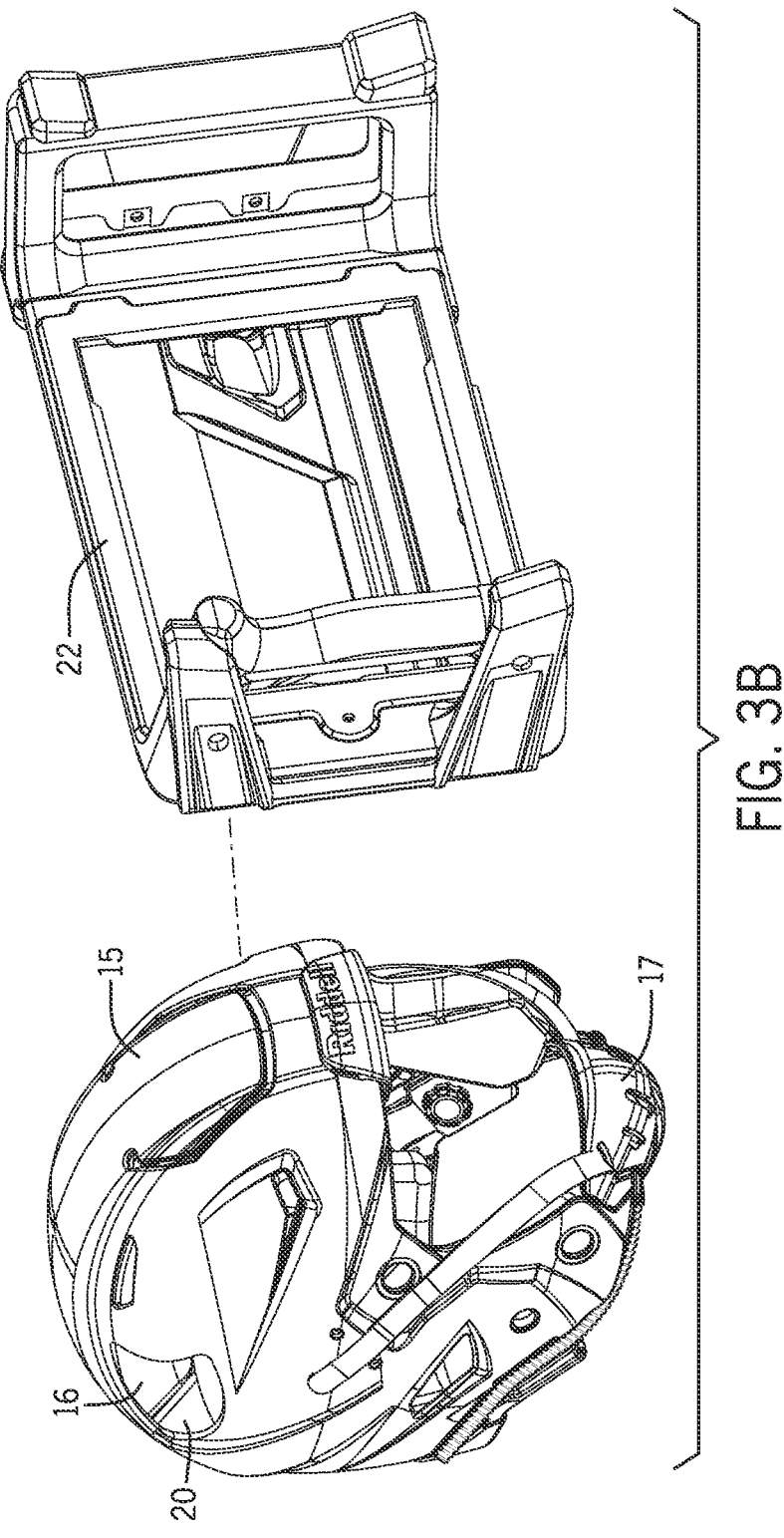
FIG. 3B illustrates the scanning helmet and scanning apparatus of FIG. 3A.

As can be seen in FIGS. 3A and 3B, the scanning helmet 15 includes the chin strap 17, one or more apertures 20 formed in the helmet shell and an internal scanning padding assembly 16. The position, number and shape of the apertures 20 in the scanning helmet 15 are not limited by this disclosure. These apertures 20 allow certain portions of the scanning hood 10 to be seen when the scanning helmet 15 is worn over the scanning hood 10 on the player's head H. In some embodiments, one or more reference markers 21 (shown exemplarily in FIG. 2A) are placed on particular points on the scanning hood 10 through the apertures 20, or on other parts of the scanning hood 10 not covered by the scanning helmet 15, while the scanning hood 10 and scanning helmet 15 are being worn by the player. The particular points may correspond with markings on the scanning hood 10, or with the apertures 20 or other features on the scanning hood 10 or scanning helmet 15. The reference markers 21 are used to aid in the orientation and positioning of the scanning helmet 15 and/or the scanning hood 10 relative to each other, relative to features on the scanning hood or helmet, or relative to the player's head H, as will be described below. The reference markers 21 may attach to the scanning hood 10 using adhesives or using any other mechanical or chemical attachment means, and further may be colored or include electronic properties or features that affect their visibility during scanning, and the reference markers 21 may appear in a hood scan and a helmet scan taken of the player P.

As mentioned above, the scanning helmet 15 includes the face guard 13 that is removably attached to a forward portion of the scanning helmet 15. The face guard 13 may be used by the player, when wearing the scanning helmet 15, to assist the player in determining a preferred helmet wearing position. Once the player positions the scanning helmet 15 such that a preferred helmet wearing position is achieved, the face guard 13 is removed, as exemplarily shown in FIG. 3B, to increase the accuracy of the helmet scan by allowing a scanning apparatus 22 to capture a greater, and less obscured, portion of the player's face. Although the face guard 13 is removed, the chin strap assembly 17 remains secured around the player's chin and jaw thereby securing the scanning helmet 15 in the preferred helmet wearing position during the subsequent scans.

After the player P determines and indicates to an operator that the scanning helmet 15 is properly positioned on the player's head H, the operator conducts a first helmet scan of the player P and the scanning helmet 15 while the player P is wearing both the scanning hood 10 and the scanning helmet 15. The player P and helmet scan is taken by a scanning apparatus 22 utilizing one or more image sensors (e.g., cameras), lasers (e.g., LiDAR) or other scanning technologies (e.g., contact scanning, laser triangulation scanning or structured light scanning). In some embodiments, the scanning apparatus 22 is a single, hand-held unit, such as a personal computer, tablet or cell phone that an operator holds and moves around the player's head H and the scanning helmet 15 to capture images of both. In some embodiments, a plurality of scanning apparatuses 22 is arranged in a pre-determined pattern and orientation relative to the scanning subject, or player P. In some embodiments, photographs are taken of the player P wearing the scanning helmet 15 and used for reference to properly align a hood scan, as described below. Further, physical measurements of the player P wearing the scanning helmet 15 can be taken and used to properly align the hood scan. Regardless of whether a single scanning apparatus 22 or multiple apparatuses 22 are employed, a plurality of scanning images, or a substantially continuous moving set of images, can be captured and recorded. These images can then be "stitched" or electronically combined together in various ways to produce a single three-dimensional scan, or data file.

In some embodiments, the reference markers 21 on certain portions of the scanning hood 10 can be raised or recessed structures (e.g., dimples). The number of markers 21 on the scanning hood 10 is such that there are enough markers 21 to allow for the accurate creation of the three-dimensional model, but low enough to make processing of the model efficient. For example, four and twelve markers 21 per square inch may be used. A person skilled in the art recognizes that more or fewer markers 21 may be used to alter the processing times and the accuracy of the model.

The markers 21 on the scanning hood 10 contain unique portions 27 to enable the computerized modeling system to efficiently and accurately process the images or video. An example of such unique portions 27 is exemplarily shown in FIG. 2B. One method of creating these unique portions 27 is to divide each dimple into four sections and fill each section with a different color. It is to be understood that more or fewer than four sections can also be employed, and that different patterns in each section can also be employed. In addition, to ensure that the computerized modeling system can distinguish each unique portions 27 from one another, the color sections of the unique portions 27 may be rotated relative to each other. For example, a top section of a unique marker may be colored red, while the adjacent unique marker may have the bottom section colored red. A person skilled in the art recognizes that uniquely marking each unique marker can be accomplished in other ways or combinations of other ways, including using different shapes, textures, numbers, letters, etc.

A scanning apparatus 22, such as a camera, is then utilized to obtain either two-dimensional images or video of the scanning hood 10 from a number of different angles or points of view. The images or video are then provided to a computerized modeling system, which first roughly detects the edges of scanning hood 10 in each image or frame of the video. For example, Sobel edge detection or Canny edge detection may be used. The computerized modeling system may then remove parts of the images or frames of the video that are known to not be contained within the scanning hood 10. This reduces the amount of data that will need to be processed by the computerized modeling system in the following steps. In addition, the removal of the parts of the images or frames of the video that are known to not be contained within the scanning hood 10 reduces the chance of errors in the following steps, such as the correlating or matches of a reference marker 21 with the background of the image.

Figure 4A:
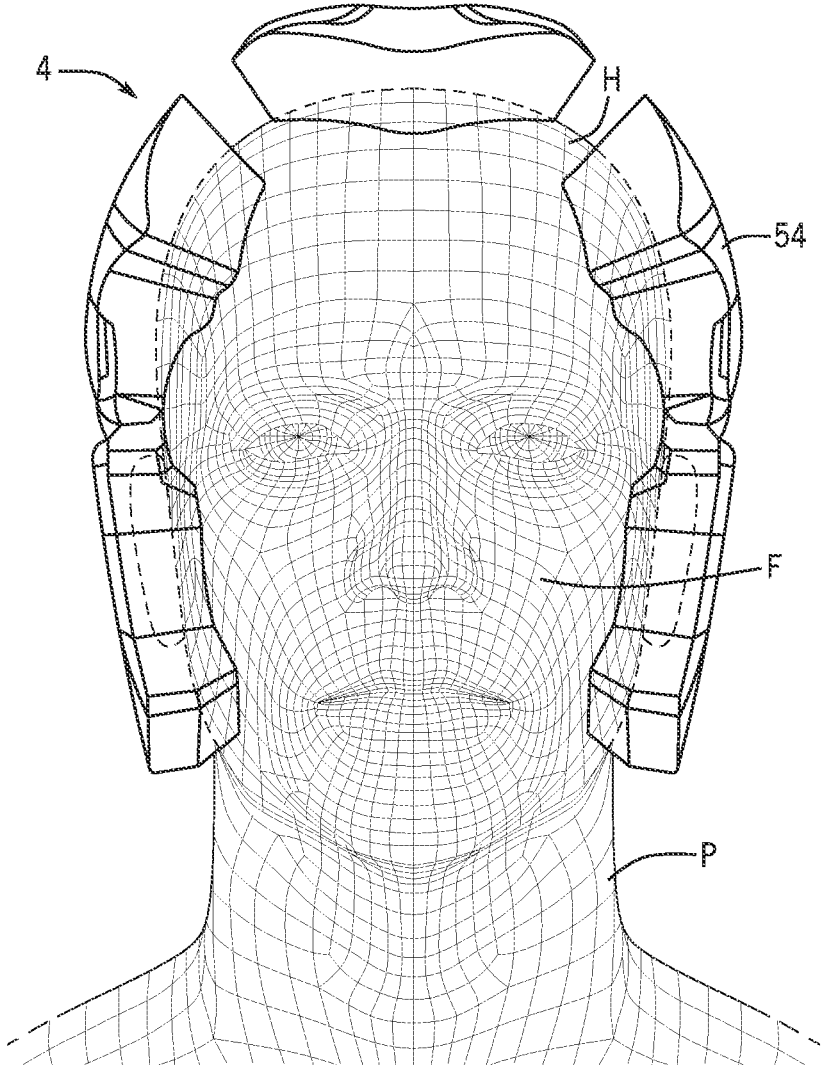
FIG. 4A illustrates a customized padding assembly disposed on a schematic representation of a player according to exemplary embodiments of the present disclosure.
Figure 4B:
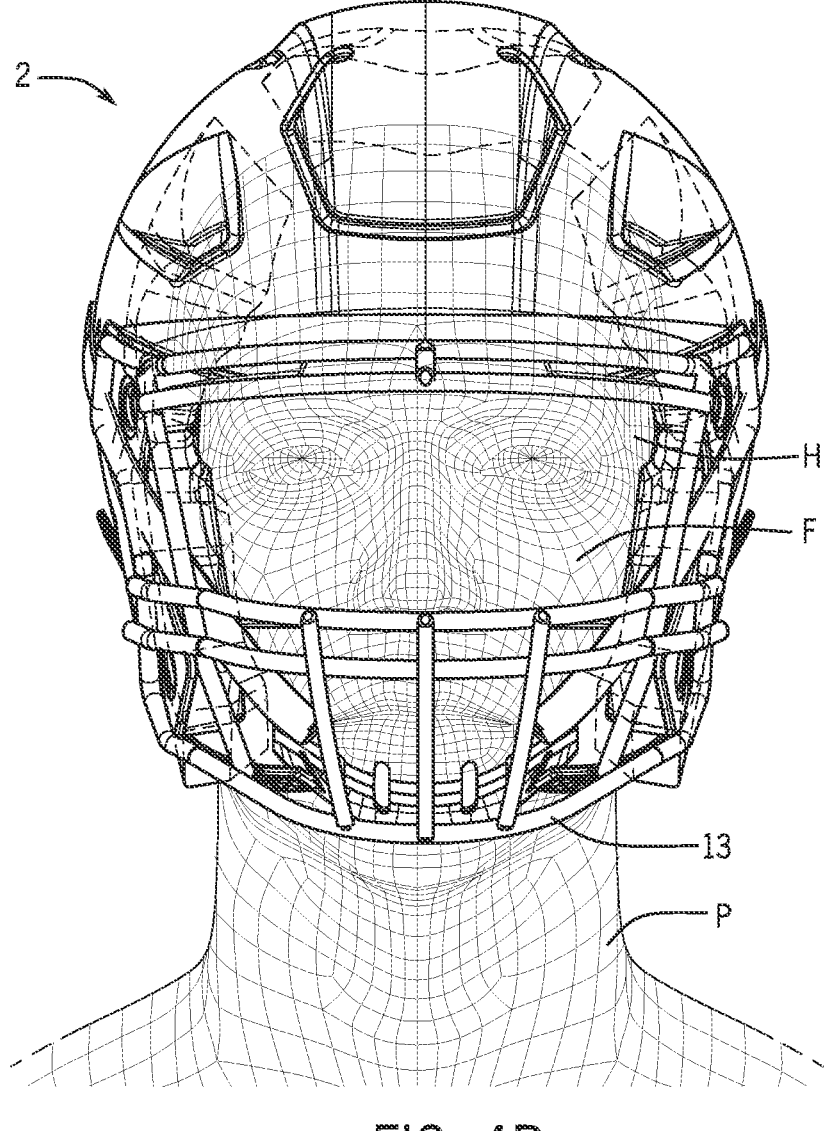
FIG. 4B illustrates a bespoke helmet with a customized padding assembly, both disposed on a schematic representation of a player according to exemplary embodiments of the present disclosure.

Next, the computerized modeling system processes each image or frame of video to detect the reference markers 21, which in some embodiments are the unique markers 27 on the scanning hood 10. After detecting the reference markers 21, the computerized modeling system correlates or matches as many reference markers 21 in each image to other reference markers 21 in other images or frames of the video. This reference marker 21 matching informs the computerized modeling system of the alignment or position of each image or frame of video. Once the alignment or position of each image or frame of video is known, mathematical algorithms are utilized to reconstruct a three-dimensional model of the player with the scanning hood 10. Typically, this three-dimensional model of the scanning hood 10 is represented in wire-frame form: a wire-frame model is a mathematical model in which points that are adjacent on a mathematical surface are connected by line segments. Illustrations of a wire-frame model for a player wearing a scanning hood 10 are shown in FIGS. 4A and 4B.

Once the three-dimensional model of the player with the scanning hood 10 is created, the computerized modeling system determines the scaling factor of the model. This is possible because the size of the reference markers 21 is known and fixed. Thus, the computerized modeling system determines the scaling factor of the model by comparing the known size of the reference markers 21 to the size of the reference markers in the model. Once this scaling factor is determined, the model can be used to accurately represent the player P.

After the helmet scan, or player and helmet scan, is taken, an operator confirms that the helmet scan is of adequate quality based upon predetermined quality criteria, and/or a visual or manual inspection of the helmet scan. These scan quality criteria include scan continuity, the inclusion of wrinkles or other perturbations, and recognition and/or visibility of the reference markers 21 or player facial features. If the helmet scan quality is determined to be of inadequate quality, a new helmet scan is taken of the player P and the scanning helmet 15. If this second helmet scan quality is determined to satisfy the scan quality criteria and/or the visual or manual inspection, then this helmet scan is then saved to a local storage or uploaded to a remote storage or cloud storage device hosted by a separate entity and accessible to the operator. The helmet scan can be saved as a helmet scan data file, and the helmet scan data file can be saved and/or uploaded to a central server.

Following a successful helmet scan, the scanning helmet 15 is removed from the player's head H. The scanning helmet 15 is removed such that the reference markers 21 on the scanning hood 10 are not disturbed or displaced. While the player P is wearing the scanning hood 10, but not the scanning helmet 15, a hood, or a player and hood, scan is taken with the scanning apparatus 22. The hood scan can be taken by one or more scanning apparatuses 22 in a manner similar to the process described above for taking the helmet scan. Similar to the helmet scan, after the hood scan has been taken, the operator confirms that the hood scan satisfies the scan quality criteria, or is approved by a visual or manual inspection of the hood scan. The scan quality criteria include the scan continuity, the inclusion of wrinkles or other perturbations, and a recognition and visibility of the reference markers 21 and player facial features. If the hood scan quality is determined to be of inadequate quality, a new hood scan is taken. If this second hood scan quality is determined to satisfy the scan quality criteria and/or the visual or manual inspection, then this hood scan is then saved to a local storage or uploaded to a remote storage or cloud storage device hosted by a separate entity and accessible to the operator. The helmet scan can be saved as a helmet scan data file, and the helmet scan data file can be saved and/or uploaded to a central server.

The player P removes the scanning hood 10 from his or her head H after the hood scan is saved or uploaded. Following each of the helmet scan and the hood scan, the player P may be shown a resulting two-dimensional or three-dimensional image from each respective scan.

Figure 8:
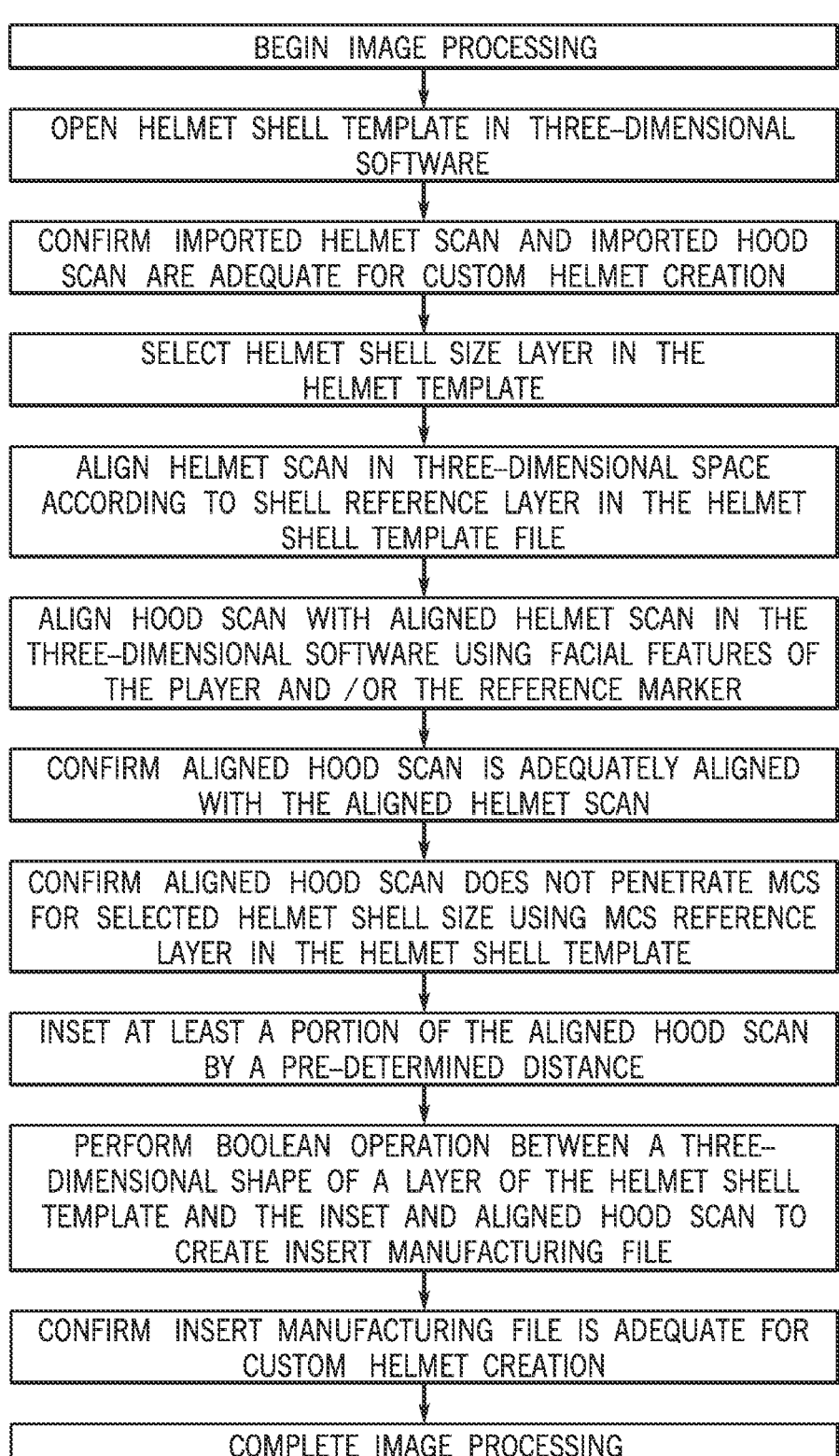
FIG. 8 illustrates a method of analyzing and modifying acquired customized data according to exemplary embodiments of the preset disclosure.
Figure 9:
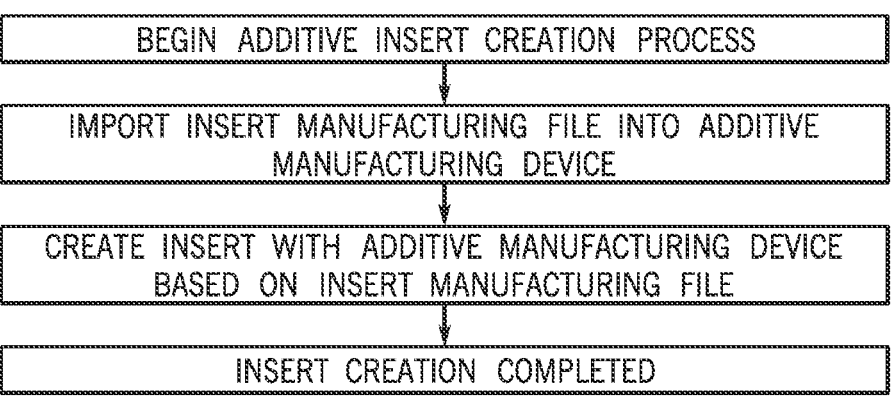
FIG. 9 illustrates a method of creating inserts from insert manufacturing files using additive manufacturing according to exemplary embodiments of the preset disclosure.
Figure 10:
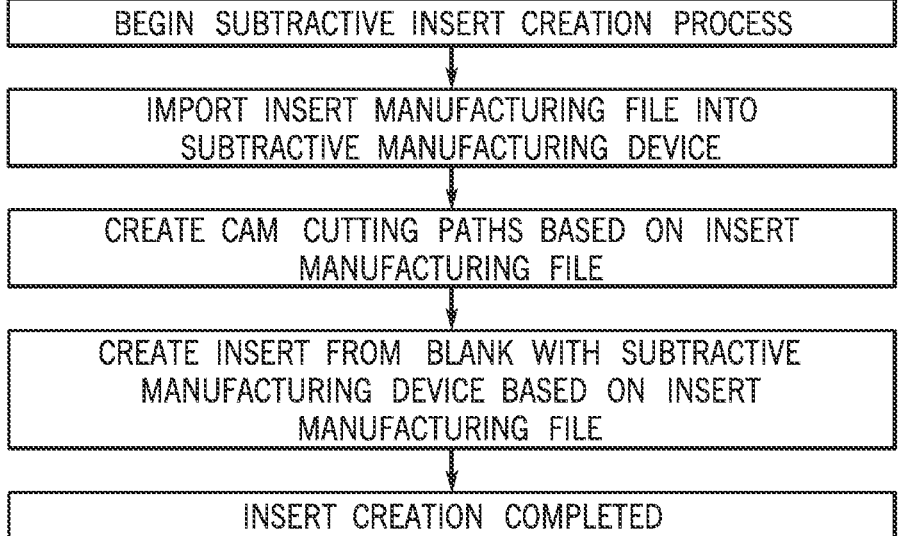
FIG. 10 illustrates a method of creating inserts from insert manufacturing files using subtractive manufacturing according to exemplary embodiments of the preset disclosure.
Figure 12:
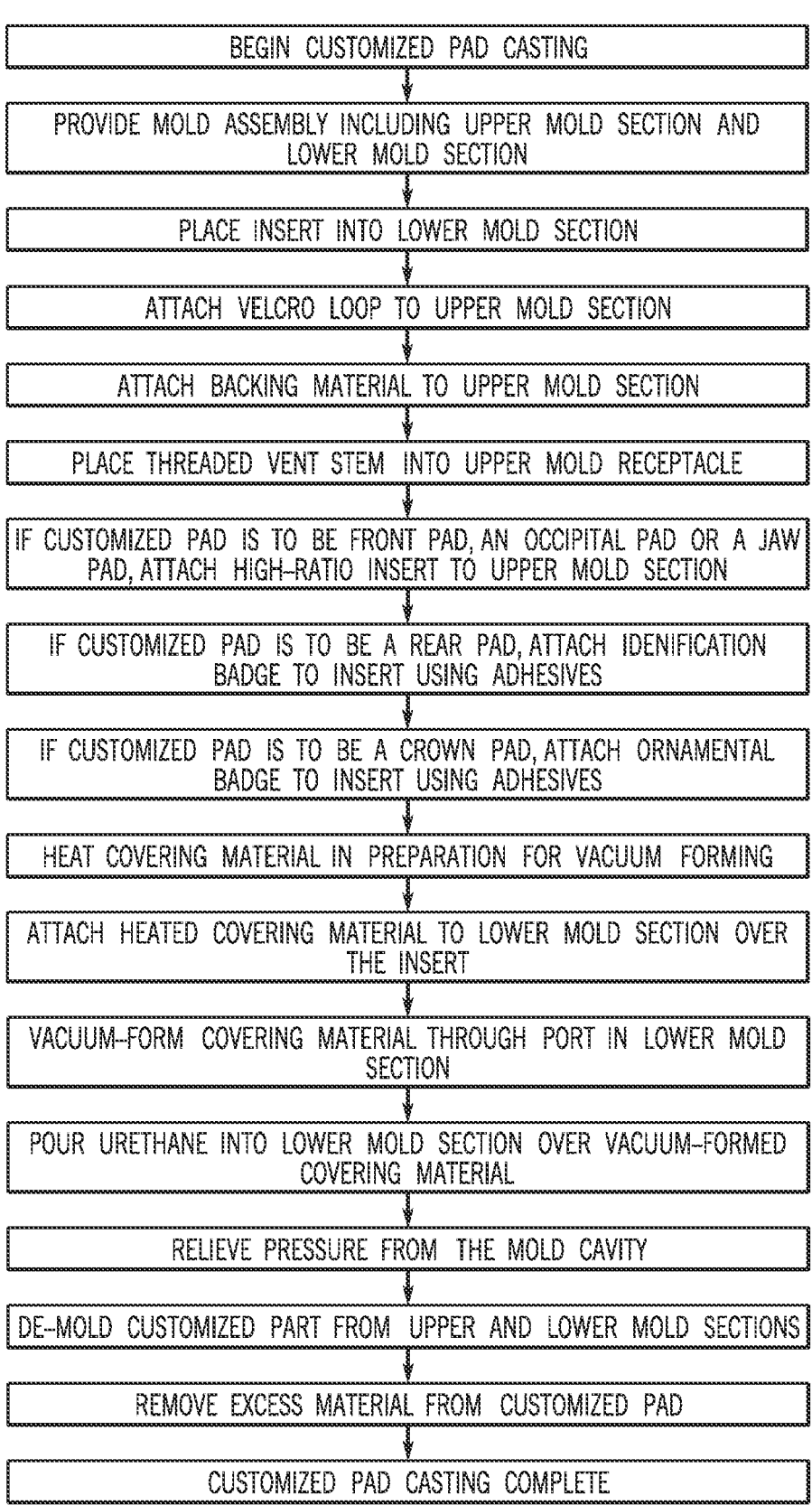
FIG. 12 illustrates a method of casting customized pads using inserts, distinct from that shown in FIG. 11, according to exemplary embodiments of the preset disclosure.

A method for acquiring, storing and processing a player's unique data, namely the player's anatomical features, continues with processing both the player and helmet scan or "helmet scan," and the player and hood scan or "hood scan." As exemplarily shown in FIG. 8, the uploaded helmet and hood scans, or uploaded helmet scan data file and hood scan data file, are opened in software on a computer or other electronic device. In some embodiments, the software is three-dimensional software, which may be Pro/ENGINEER, PTC Creo, SolidWorks, Fusion 360 or Rhinoceros. The uploaded helmet and hood scans, or uploaded helmet scan data file and hood scan data file, can be opened within or alongside, a general helmet shell template image, a minimum certified surface (MCS) template image, blank insert files in the three-dimensional software and/or a customized player helmet shell template or a "helmet shell template" that includes a plurality of layers including, but not limited to, one or more shell size reference layers, a Minimum Certified Surface (MCS) layer and an insert blank layer, as will be described below. The helmet shell template may be a pre-loaded image, model or set of coordinates corresponding to an existing helmet shell, while the MCS layer may be an image or set of coordinates useful in determining whether certain tolerances are satisfied through comparisons with other electronic files or data. Similar to the process described above, at this stage, an operator confirms that the helmet and hood scans satisfy scan quality criteria. Such a confirmation can be performed using numerical quality criteria or algorithms, and/or by a visual or manual inspection of the helmet and hood scans or of the uploaded helmet scan data file and hood scan data file.

Following a confirmation of adequate helmet scan quality, the helmet scan is selected and aligned three-dimensionally within the three-dimensional software. In some embodiments, the helmet scan is aligned in three-dimensional space according to a pre-set template, which may be the helmet shell template. The proper alignment of the helmet scan may be made with reference to a predetermined set of coordinates or reference points, a helmet shape or the player's facial features (e.g., brow region, upper lip region, nose bridge or nose tip) within the helmet shell template, or using another method or reference system. In particular, the helmet scan can be aligned with one or more of the helmet shell size reference layers within the helmet shell template, or one or more features represented in the one or more of the helmet shell size reference layers within the helmet shell template.

Such an alignment can be made along, or according to, multiple axes. A confirmation that the helmet scan is properly aligned in the three-dimensional software and/or the shell template is then made. Such a confirmation can include a visual and/or manual inspection of the alignment. When the helmet scan is determined to be improperly aligned in the three-dimensional software and/or with the helmet shell template, the helmet scan is realigned until the helmet scan is properly aligned in the three-dimensional software and/or with the helmet shell template.

Following a confirmation of adequate hood scan quality, the hood scan is selected and then aligned three-dimensionally within the three-dimensional software. The proper alignment of the hood scan may be made with reference to a predetermined set of coordinates, reference points, reference markers 21 and/or facial features within the properly-aligned helmet scan or using another method or reference. In some embodiments, the facial features in the hood scan, which may include the player's brow region, brow, nose bridge, nose tip or upper lip region, are aligned with a corresponding player facial feature in the properly-aligned helmet scan. Such an alignment can be made along multiple axes. The properly-aligned helmet scan, or reference markers 21 therefrom, may be simultaneously viewed from multiple perspectives when the hood scan, or reference markers 21 therefrom, is selected and viewed.

In some embodiments, the reference markers 21 and/or the nose region of the player are identified in the hood scan and used to properly align the hood scan in the three-dimensional software with respect to the properly-aligned helmet scan, reference markers 21 and/or the player's nose bridge, nose tip or brow in the helmet scan, or other reference means or markers from the properly-aligned helmet scan. A confirmation that the hood scan is properly aligned with respect to aspects of the properly-aligned helmet scan, the hood template or another pre-determined set of coordinates in the three-dimensional software is then made. Such a confirmation can include a visual and/or manual inspection of the alignment. When the hood scan is found to be improperly aligned with respect to the above-mentioned criteria, the hood scan is realigned until it is properly aligned in the software program.

The properly aligned hood scan may then be compared with known helmet shell size data, or to the properly aligned helmet scan, to check for certain relative tolerances and relationships. In some embodiments, the properly aligned hood scan is compared with the Minimum Certified Surface (MCS) layer in the helmet shell template corresponding to a given helmet shell size. The MCS is a reference surface defined by a collection of minimum distance values between an outer surface of the player's head H and a helmet shell. An internal padding assembly typically occupies the MCS when the internal padding assembly is installed in a shell of a protective sports helmet. Consistent with industry standards, every NOCSAE certified protective sports helmet has an MCS. Ideally, the player's head H should not penetrate or extend into the MCS when the player P wears the protective sports helmet. An MCS value, or set of values, may vary based on a given helmet shell location or padding location within the helmet shell. Data from the properly aligned hood scan and/or properly aligned helmet scan can be used to determine whether such an MCS is satisfied based on known measurements of a given helmet shell size. Further, the MCS layer of the helmet shell template, or a separate MCS template or data set, can instead, or additionally, be compared with customized insert files to determine satisfaction of MCS tolerances, as described below. If the MCS, or another tolerance measurement, is satisfied through the comparison of aligned hood scan data and the MCS layer of the helmet shell template for the selected shell size, it is determined that a customized helmet manufactured using the presently disclosed methods can be made for that player P using the given helmet shell size.

If, however, the MCS, or other tolerance measurement, is not satisfied through a comparison of aligned hood scan data and known measurements of a helmet shell size or the MCS layer of the helmet shell template for the shell size, it is determined that a bespoke helmet manufactured using the presently disclosed methods cannot be made for that player P using the given helmet shell size. In this scenario, the player or scan operator will then select a larger helmet shell size and perform a new helmet scan and hood scan using a scanning helmet corresponding to the larger helmet shell size. This selection process can continue until a helmet and hood scan are produced where data from the properly aligned hood scan satisfies the MCS layer of the helmet shell template, or other tolerance measurement, such that a comparison of aligned hood scan data and the MCS layer of the helmet shell template for the selected shell size allows a customized helmet manufactured using the presently disclosed methods to be made for that player using the given selected helmet shell size.

When the MCS, or other tolerance measurement, is not satisfied through a comparison of aligned hood scan data and the MCS layer of the helmet shell template for the selected shell size, or known measurements of a given helmet shell size, and it is determined that a customized helmet manufactured using acquired customized helmet data cannot be made for that player using the given helmet shell size, the scan operator may compare the aligned hood scan data to known measurements of a helmet shell larger than the selected helmet shell size. When such a larger helmet shell size is selected and the aligned hood scan data satisfies the MCS layer of the helmet shell template of the larger shell size or known data of the larger helmet shell size, a customized protective sports helmet can be manufactured using the larger shell size.

Additionally, at least a portion of the properly-aligned and MCS-verified hood scan may be inset by a pre-determined distance and/or a player-preferred distance, as is further described below, to create a compression fit when the helmet is worn on the head of the player. This results in a customized padding assembly slightly compressing to form an interference fit with the player's head H when the helmet is worn by the player P. Such alterations include changing the size, shape, orientation or number of customized pads used in the manufacturing of the customized helmet.

Following the selection of an appropriate helmet shell size for a given player's customized helmet data, insert files, or insert manufacturing files, are created in order to form a set of inserts for the formation of customized helmet pads 54 that form the customized internal padding assembly 4. The insert files are created using the acquired and processed unique player and helmet data acquired from the aligned helmet and hood scans, and may further be created using an insert layer of the helmet shell template. Boolean operations can be used to create the insert files, as will be described below. The insert files may also incorporate various additional factors, variables or considerations in addition to the player's unique data gathered from the aligned helmet and hood scans. For example, the insert files may be adjusted based on the helmet shell size selected.

In some embodiments, a degree of inward pressure against a player's head H is desired while the bespoke helmet is worn by the player P. The inward pressure may be created by the shape, size and/or orientation of one or more customized pads, an arrangement of multiple customized pads, the helmet shell, a spacing element disposed between the helmet shell and one or more of the customized pads, and/or other features of the bespoke helmet. According to some embodiments, the inward pressure is generated by expansive, or restoring, forces of one or more pads that are slightly compressed when the player P wears the helmet on his or her head H relative to the pads' relaxed state when the customized helmet is not worn by a player P. The existence or degree of inward pressure can be selected from a range of pre-set degrees, or can be specified by the manufacturer of the customized helmet along with input from the player P. In other words, the insert files can be designed to create inserts that form a customized padding assembly with non-compressed inner dimensions that are less than a volume occupied by the player's head H, and/or the player P wearing the scanning hood.

In some embodiments, the creation of the insert files accounts for such inwardly directed pressure applied by the internal padding assembly on the player's head H. The inward pressure can be created, or adjusted, by altering the acquired player data and/or helmet data and measurements. For example, an insert file is adjusted to create a dimensional inset in a customized internal pad manufactured using the insert file. The resulting dimensional inset may increase the customized pad's thickness at one or more locations or the pad's overall thickness. As a result, the customized helmet has customized internal pads that feature an inner surface that is dimensioned further from the inner surface of the helmet shell and thereby slightly compress to form an interference fit with the player's head H when the helmet is worn by the player P. Such alterations include changing the size, shape, orientation or number of customized pads used in the manufacturing of the bespoke helmet. Further, the insert files can additionally compensate for a thickness of the scanning hood by including an additional compensating dimensional inset, corresponding to the thickness of the scanning hood, to more accurately reflect the actual topography of the player's head H, rather than the scanning hood on the player's head H. These alteration factors may be applied to any of the helmet scan, hood scan, properly-aligned helmet scan, properly-aligned hood scan and insert files during the processing of the images that allow for the manufacture of the customized helmet.

In some embodiments, a three-dimensional blank insert is placed near, or on, the properly-aligned hood scan in the three-dimensional software. The three-dimensional blank insert may be included with the insert layer of the helmet shell template. Then, optionally, the properly-aligned hood scan is inset by a particular distance or degree, which may be specific for the creation of that particular customized pad. A Boolean operation, or intersection calculation, may then be performed between a surface of the three-dimensional blank insert and at least a portion of the aligned, or aligned and inset, hood scan. An insert file is then created, a surface of which reflects the player's head topography in the surface of the insert file.

In some embodiments, the creation of the insert file accounts for various player preferences regarding the fit of one or more padding elements. For example, if a player prefers a looser or tighter fitting crown pad, such a preference can be accommodated for in the making of the customized helmet with customized pads. The preference can be accommodated by altering the size, shape, orientation or number of the customized internal pads used in the manufacturing of the customized helmet. This preference factor may be applied to any of the helmet scan, hood scan, properly-aligned helmet scan, properly-aligned hood scan and insert file. Additionally, the insert files may be refined, smoothed or optimized manually, by software or by electronic computer-based tools based on a range of factors including, but not limited to, electronic errors, non-continuous surfaces, overlapping surfaces, meshing inconsistencies, meshing anomalies and/or meshing gaps. Such operations may be performed without substantially, or in any degree, altering a shape of any of the aforementioned scans or files, and merely may refine or optimize the electronic files in preparation for customized helmet manufacturing.

Figure 1G:
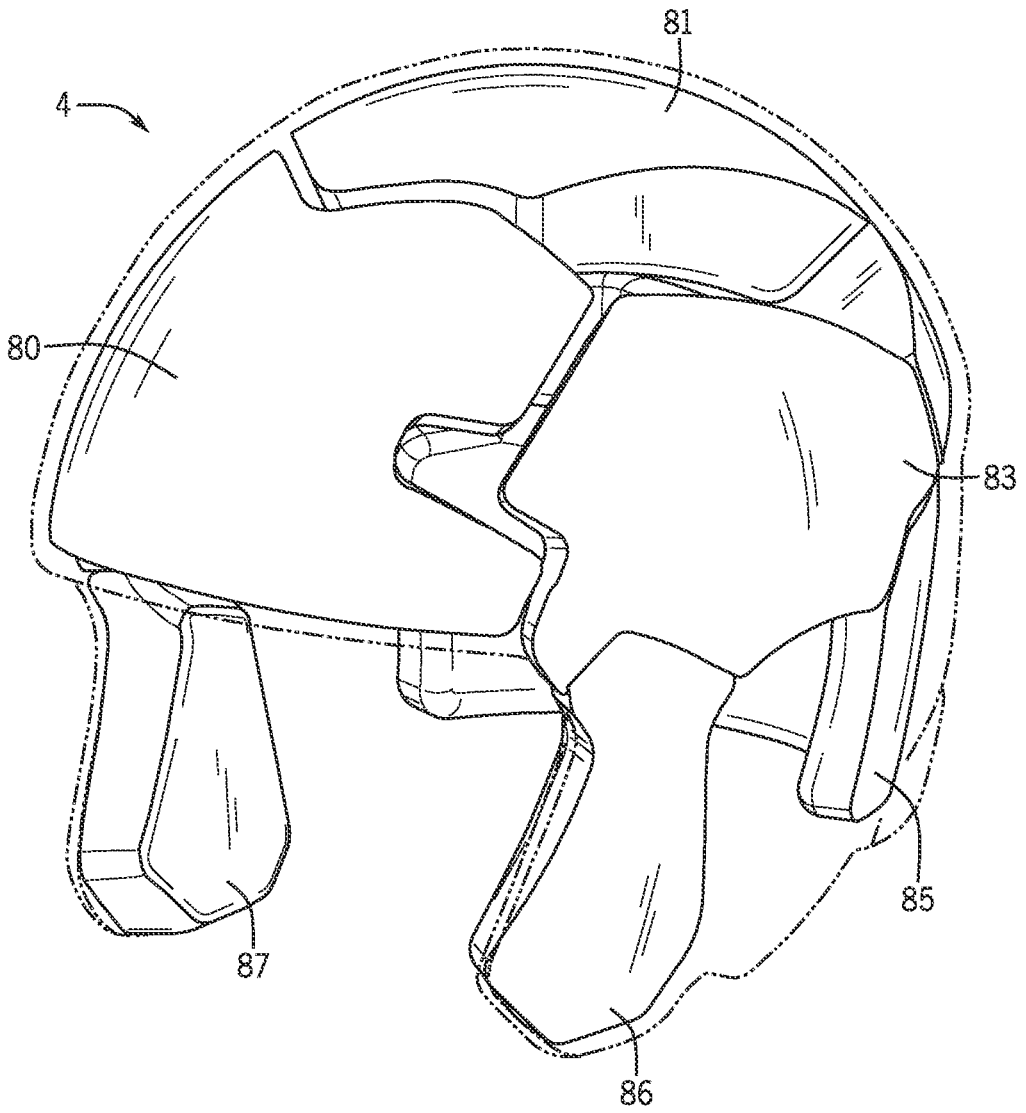
FIG. 1G is an upper perspective view of a customized internal padding assembly according to exemplary embodiments of the present disclosure.
Figure 1H:
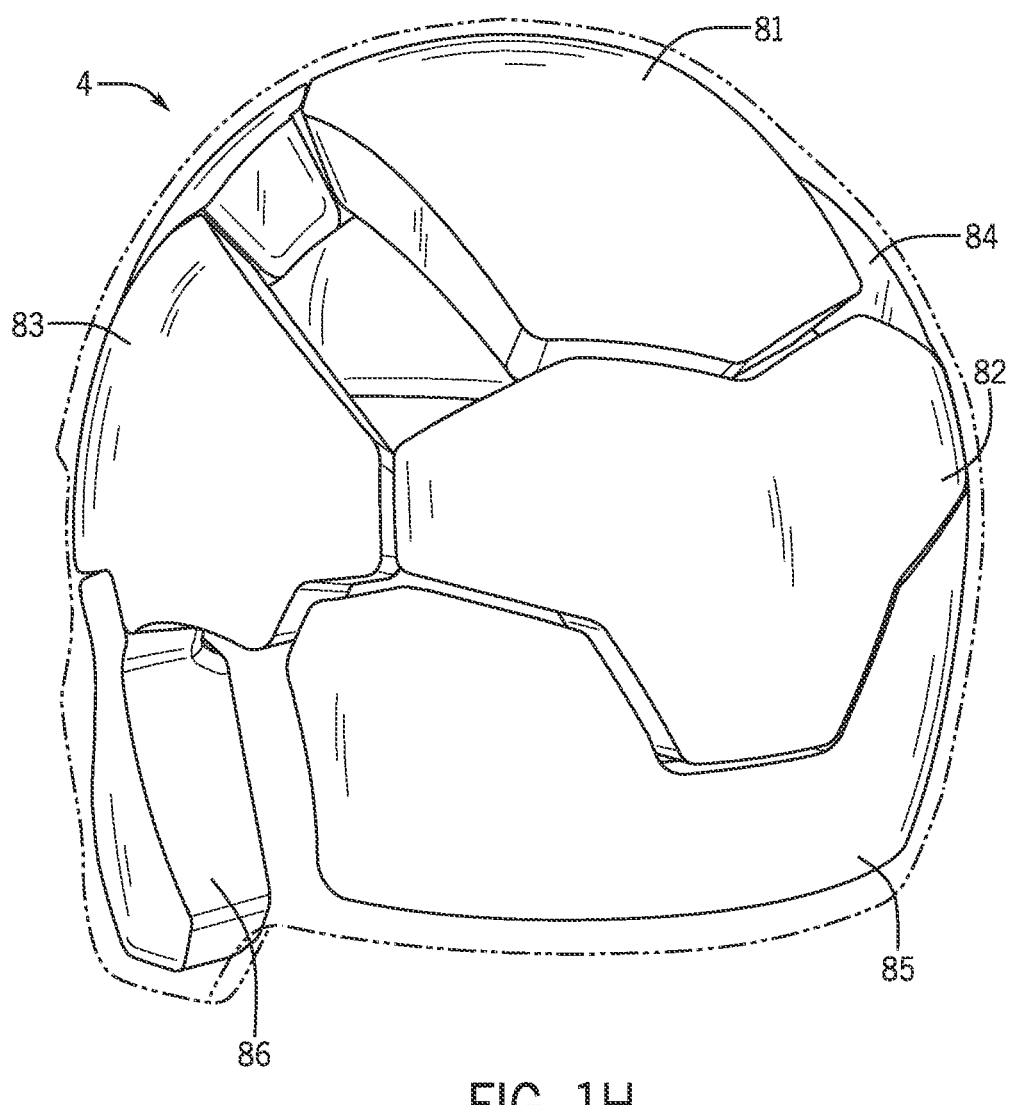
FIG. 1H is a rear perspective view of the customized internal padding assembly of FIG. 1G.
Figure 1I:
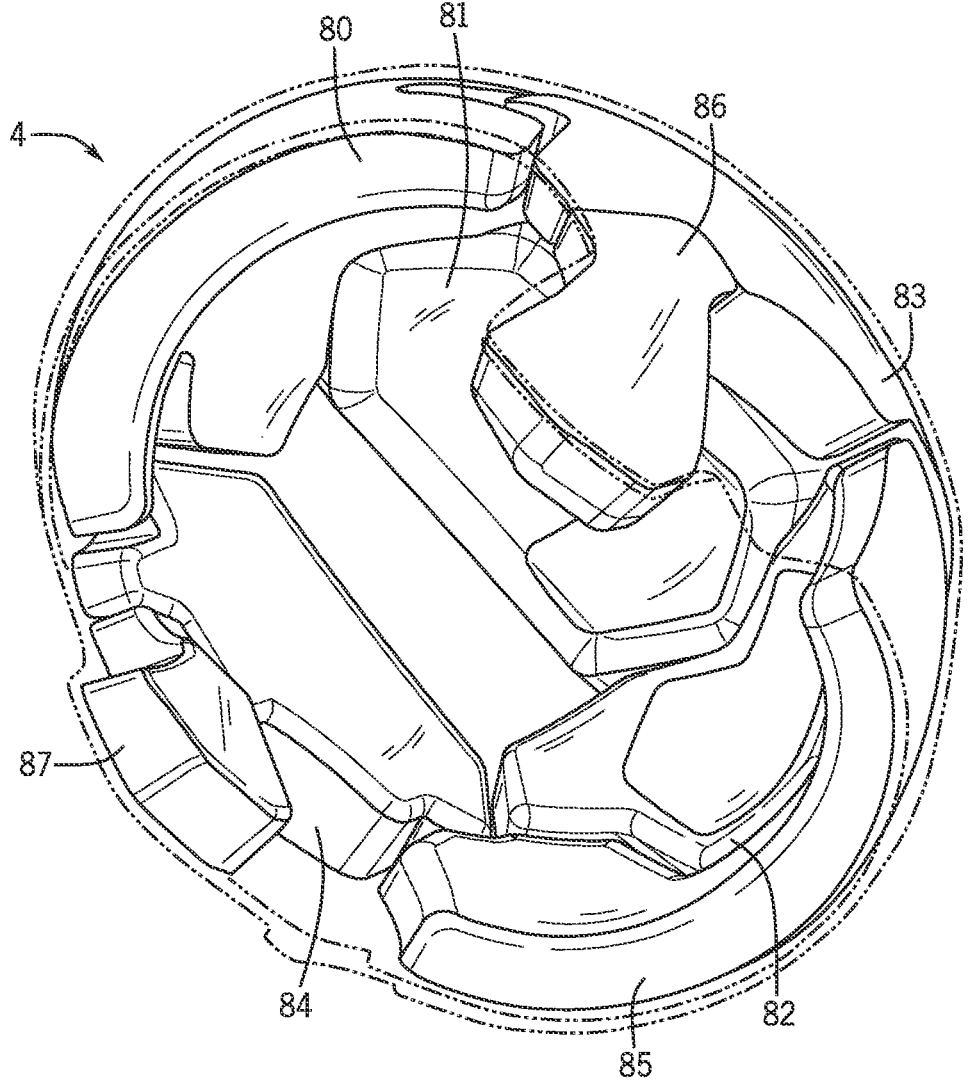
FIG. 1I is a lower perspective view of the customized internal padding assembly of FIG. 1G.

The customized internal padding assembly 4, as exemplarily shown in FIGS. 1G-II comprises individual pad members for use in the customized helmet. For example, the customized pad members include a customized front pad 80, a customized crown pad 81, a customized rear pad 82, a customized left side pad 83, a customized right side pad 84, a customized occipital pad 85, a customized left jaw pad 86 and a customized right jaw pad 87, wherein the jaw pads overlie an extent of the jaw or mandible of the player when the bespoke helmet is worn. It is to be understood that the insert files may be used to create more or fewer customized pads for a given customized helmet. One insert file may be used to create one customized pad, or a single insert file may be used to create multiple customized pads. The insert files, which may be polygon mesh files and/or files in .mesh format, may be checked for file quality, mesh quality and mesh continuity. The insert files may be exported, or converted, to a STereoLithography (STL) or an OBJ/.OBJ file format. The insert files are saved to a local storage device or uploaded to a remote storage device, which may be a remote storage device, a cloud storage system or a central server.

The above steps substantially complete the method for acquiring, storing and processing a player's unique data and the processing of both the helmet scan and the hood scan.

Figure 5A:
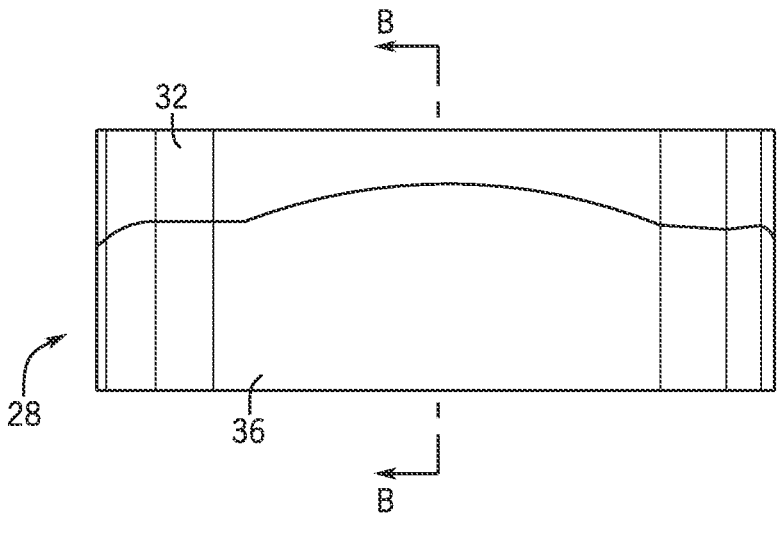
FIG. 5A illustrates an external view of a mold assembly according to exemplary embodiments of the present disclosure.
Figure 5B:
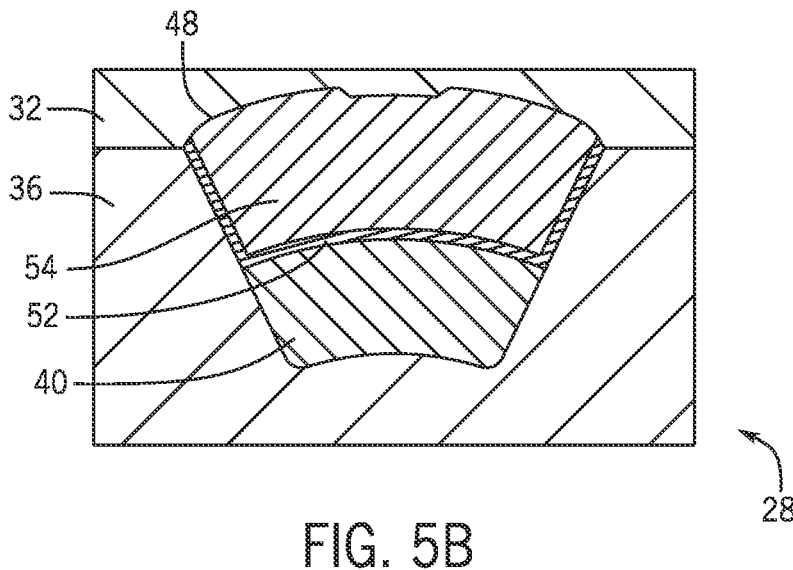
FIG. 5B illustrates a cross-sectional view of the mold assembly of FIG. 5A, taken along line B-B of FIG. 5A, and further showing customized casting elements.
Figure 5C:
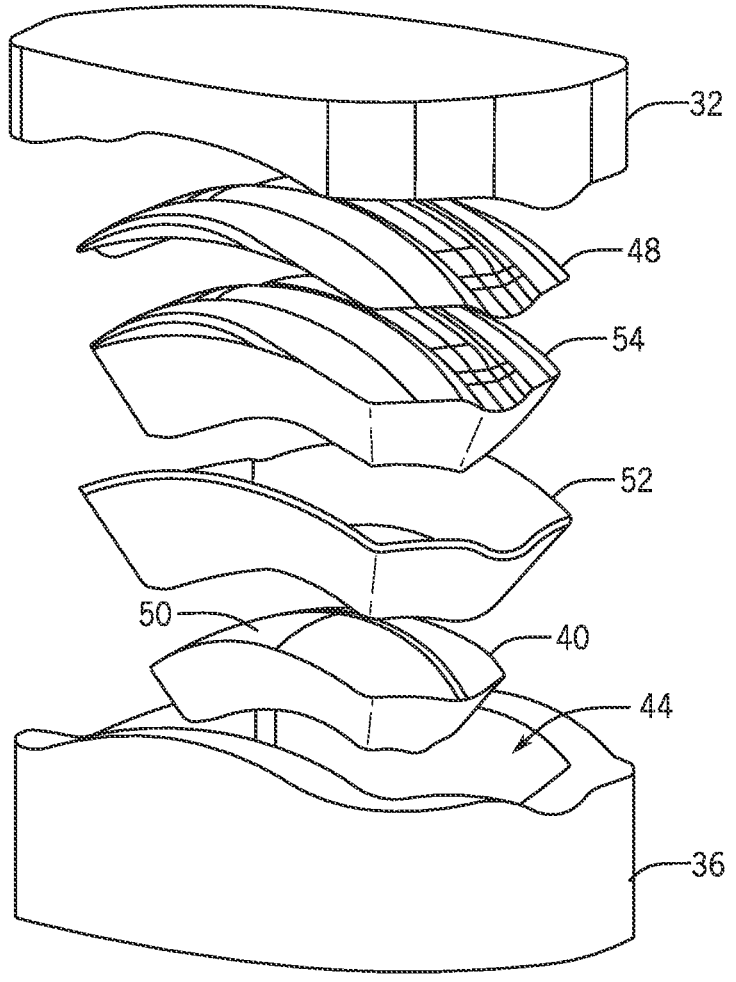
FIG. 5C illustrates an exploded perspective view of the mold assembly and associated customized casting elements of FIG. 5B.

The systems and methods of using the player's unique data to manufacture the customized helmet with a customized internal padding assembly that substantially corresponds to the player's unique data includes creating inserts 40 that are used to form the customized internal padding assembly. Inserts 40, created using the insert files, are best illustrated in FIGS. 5A-5C. The inserts 40 are unique for each player, and further are unique for each customized pad or group of pads fabricated for use in a customized helmet. A given insert 40 is created from an insert file using an additive or subtractive manufacturing process. The additive manufacturing process includes three-dimensional printing. In such a process, the insert file is transferred to a three-dimensional printing apparatus, which then three-dimensionally prints a corresponding insert 40. The additive manufacturing process creates the insert by, continuously or sequentially, adding material to create the insert 40. The material used to create the insert 40 can be any number of polymers, metals, ceramics or other materials.

A subtractive manufacturing process includes machining and any number of machining tools known to those skilled in the art. Such machine tools comprise mills, lathes, saws, drills, bores and reamers, among many others, and operate using manual controls and/or Computer Numeric Controls (CNC). Such CNC machine tools incorporate Computer-Aided Manufacturing (CAM) controls and software to enable precise electronic control of the manufacturing process, and CAM cutting paths may be calculated, before subtractive manufacturing, based on the insert file. The subtractive manufacturing process creates the final insert 40 from a blank made of any number of polymers, metals or ceramics by removing material from the blank with one or more machine tools.

Following insert 40 creating using either the additive or subtractive process, the inserts 40 may be checked for adequate quality, continuity and other properties for use in the manufacturing of customized components for a customized protective sports helmet. Inserts 40 determined to be of adequate quality, continuity and/or other properties for use in the manufacture of a customized protective sports helmet pad are used in the creation of customized helmet pads.

The disclosure continues with the manufacture of customized protective helmet pads. An example of an apparatus for manufacturing bespoke helmet pads, as illustrated in FIGS. 5A-5C, includes a mold 28. The mold 28, which can be called a master mold, includes one or more components used to cast customized, or bespoke, helmet components or helmet pads. In some embodiments, the mold 28 includes an upper section 32 and a lower section 36. The upper section 32 and lower section 36 form an internal cavity 44 when the upper section 32 is placed on top of the lower section 36. The mold 28 may be made from any suitable material, and is made of urethane in some embodiments.

Prior to casting, a weight of the urethane casting material is verified based upon volume calculations derived from the Boolean operations and/or insert files, described above. Further, a ratio of isocyanate and resin may be verified for the customized pad, or customized part, being created. The ratio may be determined for a particular type of pad, such as a front pad, and/or may be determined for a particular player based on one or more of player preferences, player head topographical features, player history, player skill level and player position. It may be understood that various properties of a finished and cast customized pad, such as hardness and compression deflection ratings, may be altered by adjusting the aforementioned ratio of isocyanate and resin.

One or more inserts 40, created as described in the preceding sections, are placed into the internal cavity 44, and the insert 40 may be placed substantially within a portion of the internal cavity 44 formed in the lower section of the mold 36. A velcro panel, or a loop panel, may be affixed to a portion of the upper mold section 32. The loop panel may be affixed to the upper mold section 32 using adhesives, or any other mechanical attachment system.

A backing material 48, which in some embodiments is nubuck, may then be secured to the upper section of the mold 32 via a positioning apparatus, or a backing loop, adhesives, magnets, vacuum-forces or any other mechanical attachment system. The backing loop can be an embroidery loop, and the backing material 48 may be secured to the positioning apparatus using various mechanical fasteners. When employed, the positioning apparatus facilitates a consistent placement of the backing material 48 relative to the upper section of the mold 32. The backing material 48 may also be waterproof or water resistant. The positioning apparatus may attach to the upper section of the mold 32 by conventional fastening means, including mechanical fasteners, mechanical positioning devices, magnets and/or adhesives. When the positioning apparatus, including the attached backing material 48, is properly attached to the upper section of the mold 32, the backing material 48 is disposed on an underside of the upper section of the mold 32 when the upper section of the mold 32 is properly placed on the lower section of the mold 36. An electronic identification device, which may be a Radio Frequency Identification (RFID) device, may be attached to the backing material 48 and used to verify that the correct insert 40 is being used for the manufacturing of the correct customized pad for the correct player.

When the mold upper section 32 is properly placed on top of the mold lower section 36, a vent stem, configured as a threaded male member, may allow gasses to escape the internal cavity 44. The vent stem may be selectively opened to allow various flow rates when the threaded vent is opened. In some embodiments, the vent stem is placed into a receptacle in the upper mold section 32. Such a placement ensures the correct location of the threaded vent relative to the backing material. The vent stem may also be secured to the backing material 48. When forming certain customized pads, for example jaw pads, crown pads and rear pads, the vent is left in place when the customized pad is completed, and serves to aid in the attachment of the customized pad to the helmet shell. When forming other customized pads, for example occipital, front and side pads, all or a portion of the vent is removed from the customized pad when the customized pad is completed.

In some embodiments, the vent comprises a channel formed in one or more of the upper mold section 32 and the backing material 48, and gasses are selectively allowed to pass from the internal cavity 44 to the exterior of the top mold section via the channel. In a further embodiment, a grommet formed in the upper mold section 32 frictionally secures, and properly aligns, the vent stem relative to the upper mold section 32, internal cavity 44 and/or the backing material 48.

In some embodiments, a pre-formed insert, or a high-ratio internal insert, may be attached to the upper and/or lower mold sections 32, 36. The pre-formed internal insert may have a particular ratio of isocyanate to resin, and may have a relatively high ratio of isocyanate to resin relative to the urethane cast material used to form the customized pad. In some embodiments, a plug in the high-ratio internal insert mates with a grommet in the upper mold section 32 to thereby secure the high-ratio internal insert in place during the molding process. The urethane casting material may, wholly or partially, surround the high-ratio internal insert during the molding process such that the high-ratio internal insert becomes a portion of the completed customized pad. In some embodiments, a high-ratio internal insert may be used in the casting of a customized front pad, occipital pad and jaw pad.

A forming element, which may be formed from silicone, may be placed into the mold cavity 44 during molding. The forming element may be freely placed into the mold cavity 44, or may be affixed to one or more of the upper or lower mold sections 32, 36, high-ratio internal insert or insert 40, and may serve to create desired shapes, forms, tolerances and/or characteristics of the final customized pad. In some embodiments, the forming element creates a particular radius, or radii, on the customized pad, and the forming element may further be employed when forming a customized front pad and a customized occipital pad.

At least one badge which may include indicia such as a player's name, jersey number and/or signature, and/or a name, slogan or images of an entity such as a company, may be affixed to one of the completed customized pads. In particular, a player identification badge 41, as exemplarily shown in FIG. IF, may be disposed on a customized rear pad while a product identification badge, identifying the helmet model and/or manufacturer, may be placed on a customized crown pad. The identification badge 41 may also include a reproduction of the player's actual signature 43. In addition to enhancing aesthetic appeal and product desirability, the identification badge 41 is useful in helping a player quickly ascertain his or her helmet from among a group of similarly-appearing helmets. A spacing member, which may be a badge, may be secured to an insert 40 via adhesives or another mechanical attachment method to conform the shape of the finalized customized pad to accommodate the attachment of the identification badge and the product identification badge to the corresponding customized pads and ensure a proper fit within the customized helmet.

A covering material 52 is heated for use in the casting process. The covering material 52 may include Ethylene-Vinyl Acetate (EVA) and/or may include expanded vinyl and Lycra (elastic polyurethane fabric) layers. The covering material 52 may form a complete or partial moisture and/or gas barrier. In some embodiments, the covering material 52 includes EVA in the form of a foam. Further, the EVA in the covering material 52 may represent closed cell foam and may thereby form the moisture barrier.

The covering material 52 may be heated in an oven in isolation, may be heated in the oven while attached to a covering material positioning apparatus, or may be heated in the over while attached to a portion of the lower mold section 36. The covering material positioning apparatus facilitates a consistent placement of the covering material 52 relative to the lower section of the mold 36. Upon the covering material 52 reaching a pre-set temperature, or a pre-set temperature range, the covering material 52 (optionally via the covering material positioning apparatus and/or a portion of the lower mold section 36) is attached to the lower section of the mold 36 by conventional fastening methods, including mechanical fasteners, mechanical positioning devices, magnets and/or adhesives. The pre-set temperature, or temperature range, may be a temperature, or temperature range, appropriate for covering material vacuum forming, such that the covering material will deform, or respond to, the vacuum-forming by a particular degree to adequately form to the insert 40 and lower mold section 36. When the covering material 52 is properly attached to the lower section of the mold 36, the covering material 52 is disposed over the insert 40, such that the insert 40 is disposed substantially between the covering material 52 and the lower section of the mold 36 within the internal cavity 44.

When the covering material 52 is properly attached to the lower section of the mold 36 and the covering material 52 is thus properly disposed over the insert 40 as described, a vacuum apparatus is operated and creates a partial or complete vacuum within the internal cavity 44 and vacuum-forms the covering material 52 to one or more contours of the insert 40 and/or the lower mold section 36. The vacuum apparatus may be in fluid communication with the internal cavity 44 through a vacuum aperture formed in the lower section 36 of the mold, and the vacuum apparatus may create the partial or complete vacuum within the internal cavity 44 by negatively pressurizing the internal cavity 44 relative to the exterior of the mold 28 via the vacuum aperture.

In some embodiments, the covering material 52 is vacuum-formed to an upper insert surface 50. In this process, the covering material 52 may form to, and adopt the shapes and contours of, the upper insert surface 50. A weight of the urethane casting material may be checked for accuracy at this stage.

After the covering material 52 has been vacuum-formed to a surface of the insert 40, or the upper insert surface 50, the covering material 52 may form a substantially concave surface within the lower section of the mold 36. Liquid, solid or semi-solid casting material, which may also be called urethane and/or padding material, is then poured into the substantially concave surface formed in the covering material 52. This process can be termed 'casting.'

The casting material includes isocyanate and resin combined at a particular ratio. As described above, the ratio of isocyanate and resin may be determined for the customized pad being created. The ratio may be determined for a particular type of pad, such as a front pad or a jaw pad, and/or may be determined for a particular player based on one or more of player preferences, player head topographical features, player history, player skill level and player position.

The upper and lower mold sections 32, 36 are then brought substantially or wholly together, forming the cavity 44, and the poured casting material is allowed to cool, cure, solidify, and take the form of portions of the vacuum-formed covering material 52. In particular, a lower portion of the casting material, or urethane, may take the form of the vacuum-formed covering material 52, which had previously been vacuum-formed to the upper insert surface 50. Thus, contours and shapes of the upper insert surface 50 and lower mold section 36 are transferred to the vacuum-formed covering material 52 and then to the poured casting material. Further, upper and lateral portions of the casting material may take the form of a portion of the upper mold section 32, transferred to the casting material via the backing material 48. After the poured casting material cools and solidifies, the now-solidified casting material reflects the shapes and contours of the vacuum-formed covering material 52 and the upper insert surface 50, as well as the upper and lower sections of the mold 32, 36. Specifically, a lower surface of the solidified casting material, or an inner surface of the solidified casting material or customized pad, may reflect the shapes and contours of the vacuum-formed covering material 52 and the upper insert surface 50.

After the casting material is cast into the vacuum-formed covering material 52, pressure may be released from the mold cavity 44. This may be accomplished by puncturing a seal in the threaded vent, puncturing the backing material 48, opening a venting element built into the upper or lower mold sections 32, 36 or partially separating the upper and lower mold sections 32, 36.

Following the cooling and/or solidification of the casting material, the customized pad is extricated, or de-molded, from the now-separated upper and lower mold sections 32, 36. A sealant material may then be applied to one or more surfaces of the customized pad. In some embodiments, the sealant material is lycra (elastic polyurethane fiber), or elastane. In some embodiments, the sealant material is laminated on, or over, one or more surfaces of the customized pad. In some embodiments, edges of the customized pad are sealed with a silicone ring. In some embodiments, edges of the customized pad are molded with silicone, a sprayed or painted rubberized material or waterproof tape.

If excess, or undesirable, casting material is present on the de-molded customized pad, the excess casting material may be removed by die cutting, or other manual cutting or removal methods. The dies may include two-dimensional dies and/or three-dimensional dies. Once separated from the excess casting material, the customized pad may be checked for various properties, including density, compression deflection, size, weight, shape, consistency and color, among other possible properties. In some embodiments, in addition to or instead of individualized customized pad testing, test samples are cast and tested at various points to ensure the consistency and quality of the casting material. Acceptable ranges or threshold figures may be determined for each variable for which the customized pad, or test sample, is tested. If a given customized pad or test sample does not meet an acceptable range or threshold value for one or more properties, the customized is re-cast and again checked for the one or more properties. If the given customized pad meets the acceptable range or threshold value for the one or more properties, the customized pad is suitable for use in a customized helmet manufactured using acquired customized helmet data.

After one or more customized helmet pads 54 are formed by the above-described process, the one or more customized helmet pads 54 are then attached directly or indirectly to the interior surface of a helmet shell for use by the player. An example of a customized internal padding assembly 4 manufactured using the above-described methods and systems is exemplarily illustrated in FIG. 4A. Further, turning to FIG. 1B, the customized helmet 2 may also include a removable external badge 47, adding to the aesthetic appeal and desirability of the customized helmet. The external badge 47 may include a range of indicia, images and text including, but not limited to, a signature of the player.

Fully Bespoke Helmet and System

In the fully bespoke helmet embodiment, the disclosed system and methods include a number of processes and sub-processes that are used to acquire and process data concerning the player's unique anatomical features and then use the processed data to manufacture a bespoke protective sports helmet where the helmet shell and the internal padding assembly are both purposely designed, configured and manufactured to match the anatomical features of the player's head. The internal padding assembly is purposely designed, configured and manufactured in the manner explained in the foregoing paragraphs of the Bespoke Helmet and System section. The fully bespoke helmet shell is designed based upon (i) the helmet and hood scans discussed in the foregoing paragraphs of the Bespoke Helmet and System section, and (ii) a combination of the player's playing style (including his/her tackling technique), the player's impact history, the player's skill level, the player's position(s) (e.g., quarterback, wide receiver, offensive line, linebacker, etc.), and the extent, if any, of the player's prior injuries.

With these considerations in mind, the fully bespoke helmet shell can designed to provide increased protection in a particular region(s) of the shell. This increased protection can be accomplished by: increasing the thickness of the desired shell region, adjusting the material properties of the desired shell region (e.g., increasing the stiffness of the rear region of the shell), or changing the configuration of the desired shell region including the shell corrugations in that region (e.g., increasing the dimensions of the corrugation in the rear shell region).

Partially Bespoke Helmet and System

Embodiments of the present disclosure also include processes and sub-processes used to acquire and process data concerning the player's unique anatomical features and subsequently use the processed data to design, select and optimize a padding assembly configured to substantially correspond to anatomical features of the player's head. In some embodiments, the internal padding assembly of a partially-customized helmet 1000, or a custom-selected internal padding assembly 1002, includes an arrangement of custom-selected pads 1004 selected from a large number of pre-manufactured pads. FIGS. 6A-6D illustrate a partially-customized helmet 1000, a custom-selected internal padding assembly 1002 and custom-selected pads 1004.

As described in the above-section detailing acquisition of the player's anatomical features data, process for creating the partially-customized helmet 1000 similarly includes gathering dimensional, topographical and preference data from the player. In particular, similar to the processes described above, the process for creating the partially-customized helmet 1000 may include i) placing the scanning hood 10 on, or over, the head H of the player P, ii) verifying that the scanning hood 10 is appropriately positioned and oriented on the player's head H, iii) selecting a scanning helmet 15 shell size, iv) placing the scanning helmet 15 over the player's head H while the player P is wearing the scanning hood 10, v) determining a preferred helmet wearing position, vi) obtaining a helmet scan using a scanning apparatus 22, vii) removing the scanning helmet 15 from the player's head H and viii) obtaining a hood scan using a scanning apparatus 22. However, it is to be understood that the process for creating the partially-customized helmet 1000 may include any and all steps, techniques, technologies, methods and devices, used in any order or combination, from the section detailing acquisition of the player's anatomical features data.

Further, the process for creating the partially-customized helmet 1000 may include all steps, techniques, technologies, templates, methods, and devices as described in the section detailing acquisition of the player's anatomical features data. In particular, the process may include ix) confirming adequate helmet scan quality, x) aligning the helmet scan within three dimensional software according to the helmet shell template, xi) confirming adequate hood scan quality, xii) aligning the hood scan relative to the aligned helmet scan or other reference points, xiii) verification of MCS satisfaction based on known measurements of a given helmet shell size, xiv) creating a dimensional inset in the aligned and MCS-verified hood scan, xv) accounting for player preferences, history, position, skill level or other factors in the aligned, inset, and MCS-verified hood scan and modifying the hood scan accordingly and xvi) comparing the aligned, inset, MCS-verified hood scan with one or more partially-customized pad selection layers in the helmet shell template.

The partially-customized pad selection layer may include three-dimensional models of a range of custom-selected pads 1004. The custom-selected pads 1004 are pre-formed, and include a wide range of physical characteristics. For example, the custom-selected pads 1004 include a variety of lengths, widths, heights, compression deflections, contours, concavities, angles, radii, attachment systems, colors and materials, as well as a range of isocyanate to resin ratios. As will be understood by one skilled in the art, upon a comparison of the aligned, inset, MCS-verified hood scan data with the one or more partially-customized pad selection layers in the helmet shell template, a custom-selected internal padding assembly 1002 may be selected for that player's partially-customized helmet 1000 that includes an arrangement of custom-selected pads 1004. The custom-selected pads 1004 may be selected based upon the aligned, inset and MCS-verified hood scan data, a dimensional fit or connection between a particular custom-selected pad 1004 and a helmet shell, and/or a dimensional fit or connection between custom-selected pads 1004.

Figure 6A:
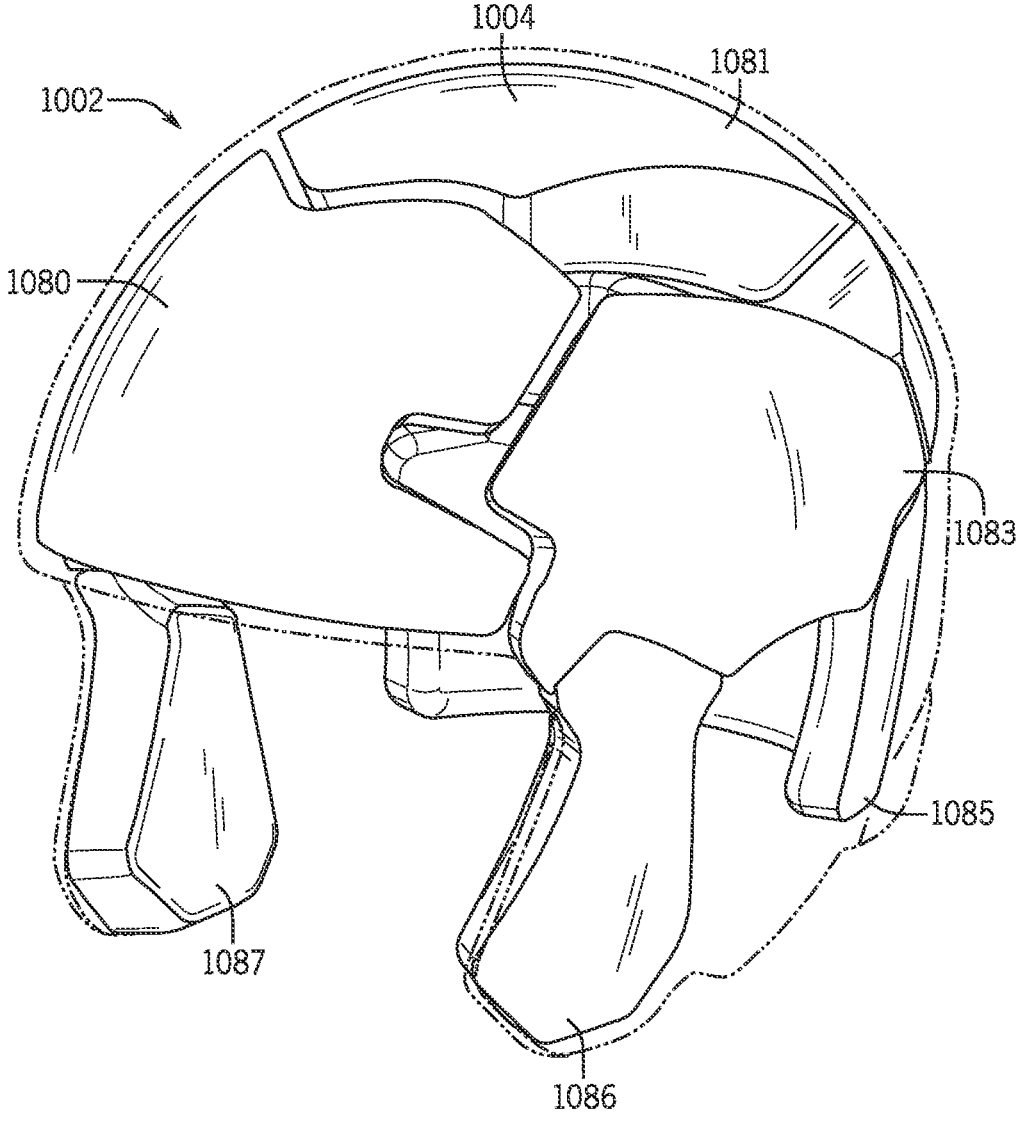
FIG. 6A is an upper perspective view of a custom-selected padding assembly according to exemplary embodiments of the present disclosure.
Figure 6B:
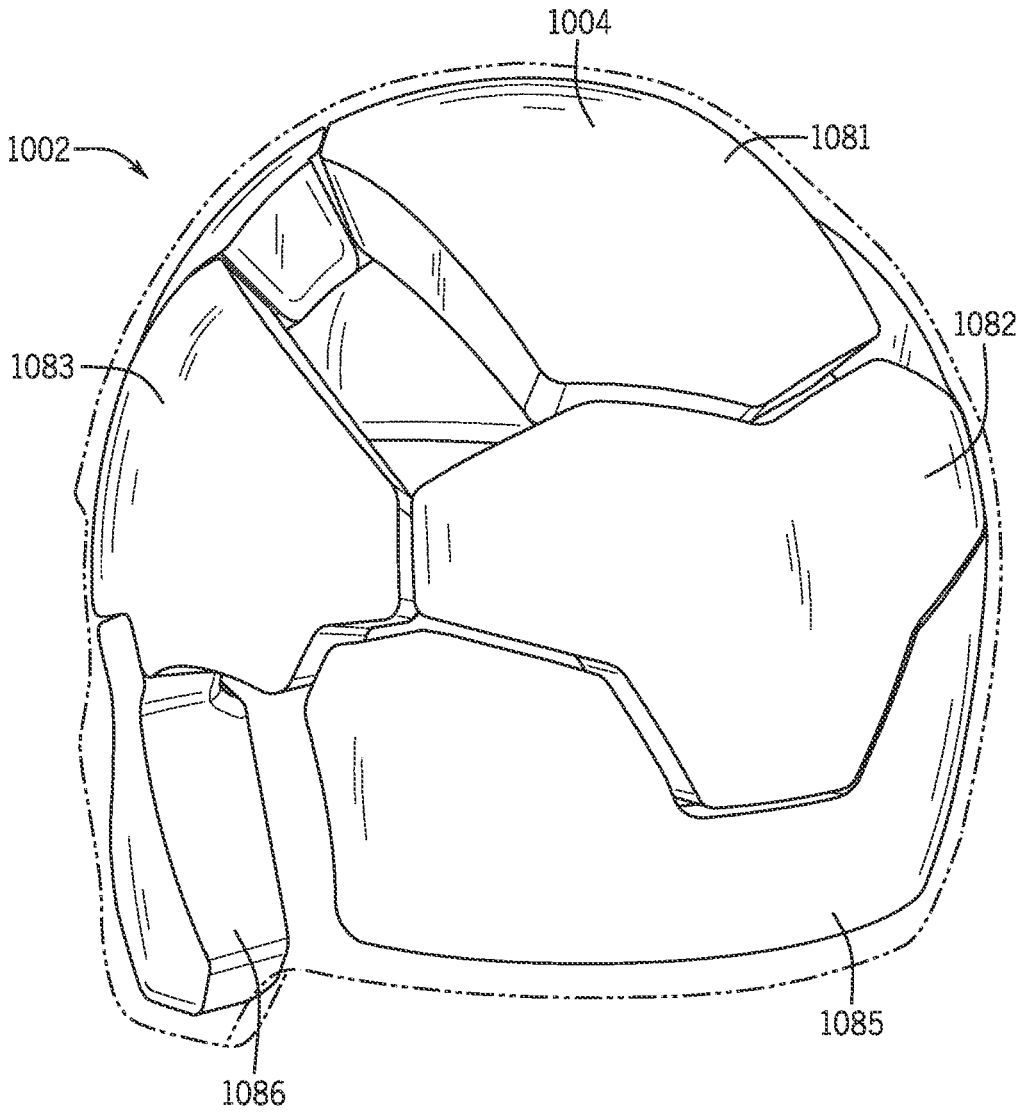
FIG. 6B is a rear perspective view of the custom-selected padding assembly of FIG. 6A.
Figure 6C:
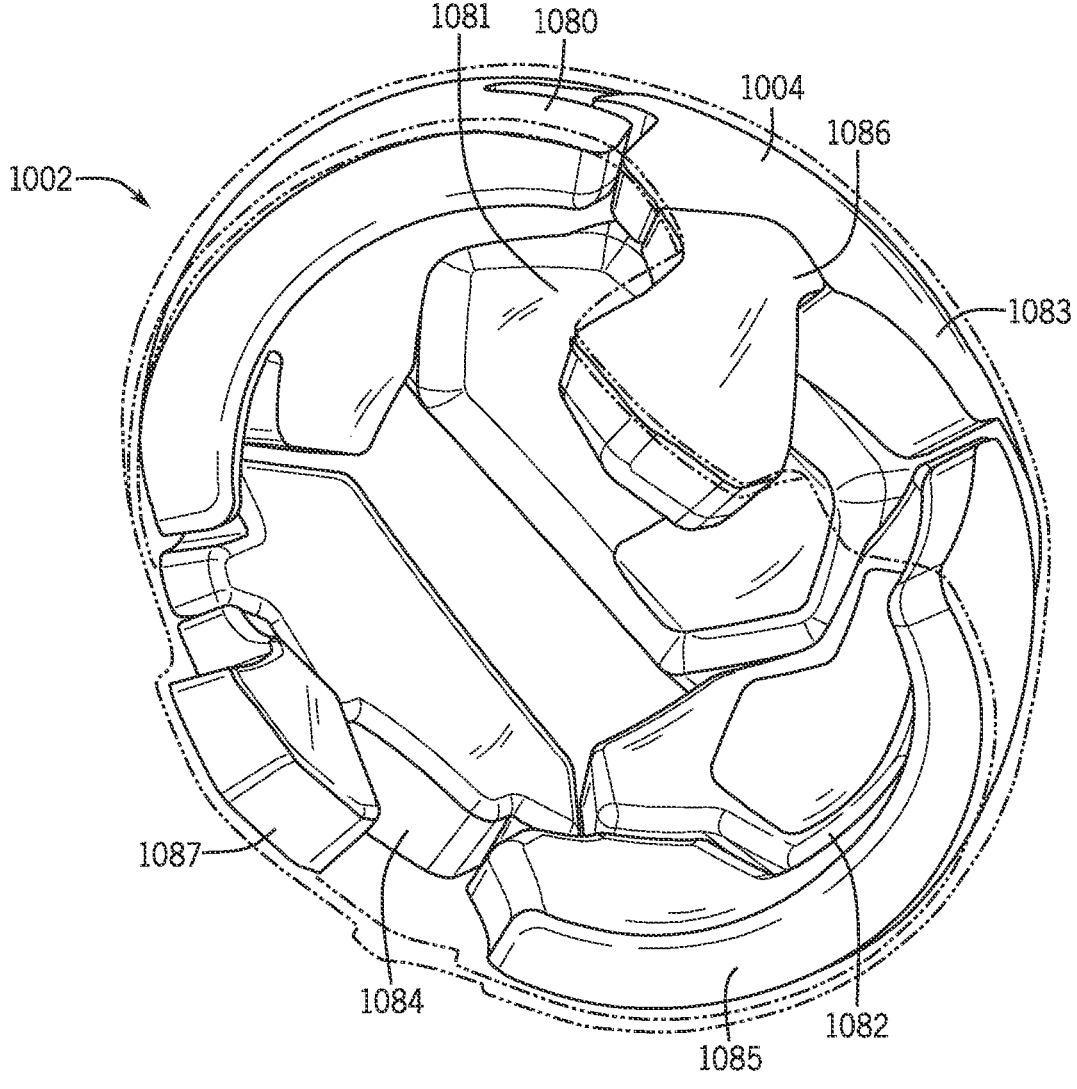
FIG. 6C is a lower perspective view of the custom-selected padding assembly of FIG. 6A.
Figure 6D:
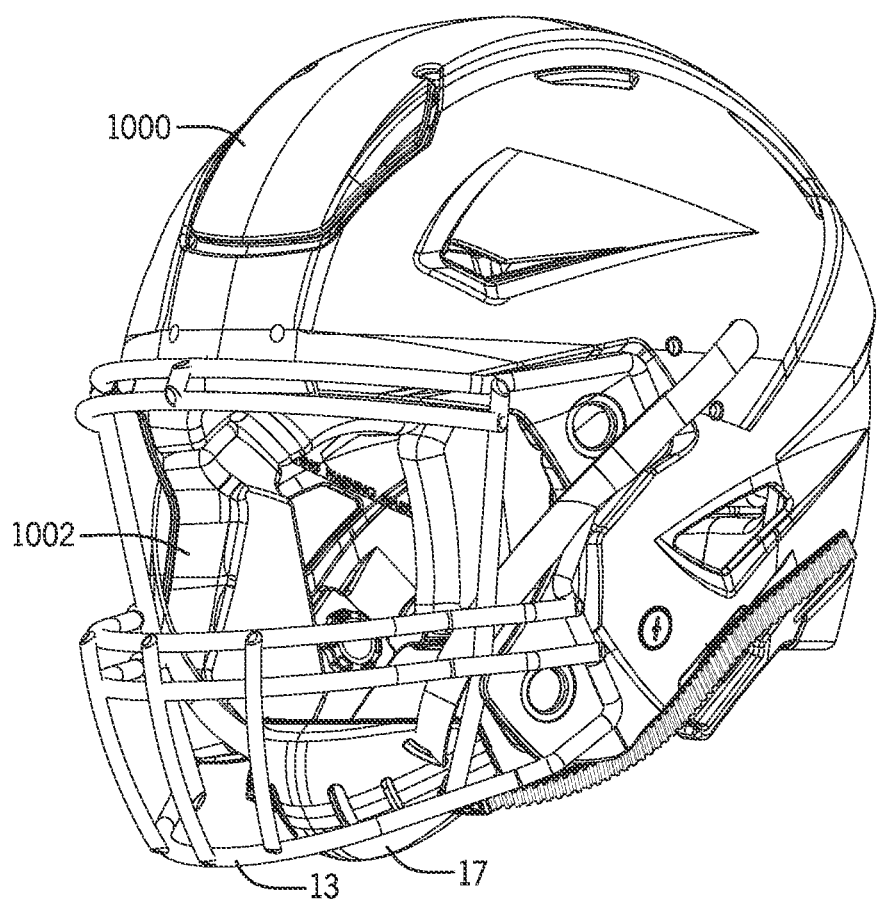
FIG. 6D is a perspective view of a partially-bespoke helmet according to exemplary embodiments of the present disclosure, which includes the custom-selected padding assembly of FIG. 6A.
Figure 7:
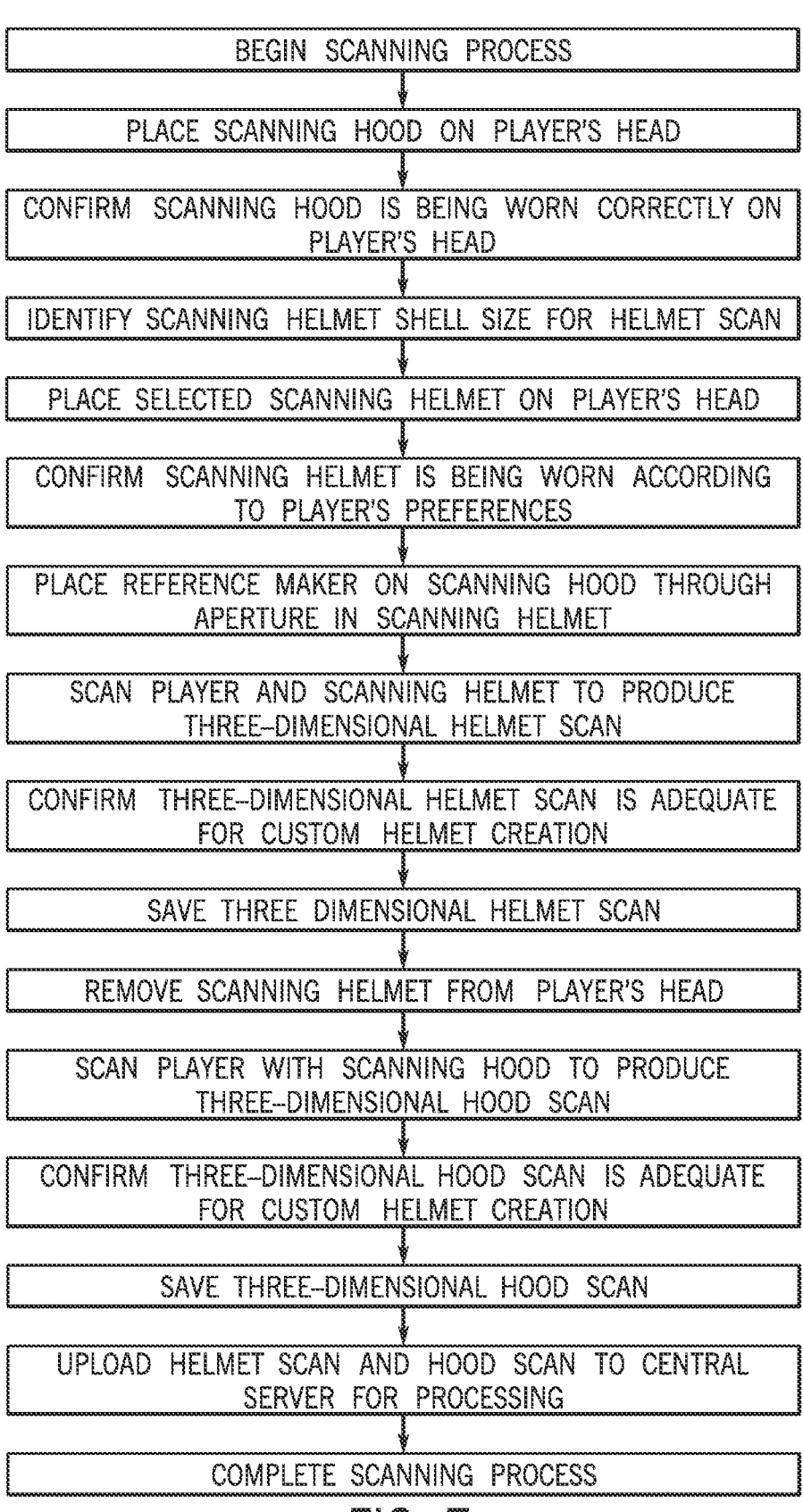
FIG. 7 illustrates a method of gathering customized data regarding topographical features of a player according to exemplary embodiments of the present disclosure.

The custom-selected internal padding assembly 1002, as exemplarily shown in FIGS. 6A-6C, comprises individual custom-selected pads 1004 for use in the partially-customized helmet 1000. For example, the custom-selected pads 1004 include a custom-selected front pad 1080, a custom-selected crown pad 1081, a custom-selected rear pad 1082, a custom-selected left side pad 1083, a custom-selected right side pad 1084, a custom-selected occipital pad 1085, a custom-selected left jaw pad 1086 and a custom-selected right jaw pad 1087. Further, although the use of a partially-customized pad selection layer within a helmet shell template is described, it is to be understood that any method of forming a partially-customized helmet 1000 using custom-selected pads 1004 selected from a large number of pre-manufactured pads based upon gathered player physical data is within the scope of this disclosure.

On-field results of monitored head impact exposures (HIE) collected by the proprietary technologies owned by the assignee of the present Application can be used to inform certain design parameters of the bespoke helmet discussed above. The monitored HIE results were obtained by the assignee's advanced wearable monitoring systems, that features an arrangement of impact monitoring sensors, disclosed in U.S. patent application Ser. No. 13/603,319 and U.S. Pat. Nos. 6,826,509, 7,526,389, 8,797,165 and 8,548,768, each of which including the content thereof are hereby incorporated by reference. For instance, a football player's skill or age level and playing position may, when compared to a larger database of similar players, indicate certain preferred helmet design characteristics. These characteristics may provide benefit to players based upon expected HIE levels at differing skill/age levels and/or on-field playing positions or groups of playing positions. Hypothetically, a college football quarterback may expect an elevated HIE metric of high-intensity impacts directed to the back of the head. The bespoke helmet, including the internal padding assembly, can be adjusted to provide greater protection levels accordingly.

Examples of using the HIE results to inform design parameters include using the impact data collected and stored in a database to create a position and/or skill level specific helmet that is designed based upon a generic data set based on skill level and position, but not influenced by a specific player's impact results and data. Another example of utilizing the HIE results includes using the HIE data collected from a specific player in combination with the broader data that has been collected and stored in the repository to create a fully personalized helmet. Another example of utilizing the HIE results involves installing sensor instrumentation in a player's helmet to enable further customization based on additional data that is collected after a pre-set amount of time or play. This instrumentation is included in the personalized helmet to further inform the data set and how to alter the inserts to provide a greater bespoke fit. These examples and the usage of HIE results applies to all three bespoke embodiments discussed above—the bespoke helmet and system, the fully bespoke helmet and system, and the partially bespoke helmet and system.

As is known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. The software code is executable by the general-purpose computer. In operation, the code is stored within the general-purpose computer platform. At other times, however, the software may be stored at other locations and/or transported for loading into the appropriate general-purpose computer system.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. The server functions may be implemented in a distributed fashion on a number of similar platforms, to distribute the processing load.

Hence, aspects of the disclosed methods and systems outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Thus, another type of media that may bear the software elements includes optical, electrical and electro-magnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

A machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the disclosed methods and systems. Volatile storage media include dynamic memory, such as main memory of such a computer platform. Tangible transmission media include coaxial cables, copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Other implementations are also contemplated

The invention claimed is:

1. A method of assembling a protective sports helmet to be worn by a player while participating in a sports activity, comprising:
   capturing head data from an electronic scan of a player's head;
   providing a plurality of pre-manufactured pad models within a computer program, wherein said pre-manufactured pad models include varying configurations of the same type of pre-manufactured pad;
   using the computer program to identify a pre-manufactured pad model from the plurality of pre-manufactured pad models based on a comparison between: (i) at least one pre-manufactured pad model of the plurality of pre-manufactured pad models, and (ii) the captured head data or data derived from the captured head data;
   selecting a pre-manufactured pad that corresponds to the identified pre-manufactured pad model;
   installing the pre-manufactured pad in a protective sports helmet; and,
   wherein a design parameter of the protective sports helmet has been adjusted to provide said helmet with position-specific attributes of the player that is to wear the protective sports helmet.

2. The method of claim 1, wherein the comparison between: (i) the at least one pre-manufactured pad model of the plurality of pre-manufactured pad models, and (ii) the captured head data or data derived from the captured head data also includes comparing a reference dimension that extends from the captured head data to a helmet shell against a dimension associated with the at least one pre-manufactured pad model.

3. The method of claim 2, wherein the dimension of the at least one pre-manufactured pad model is a thickness of an associated pre-manufactured pad.

4. The method of claim 1, further comprising the step of inwardly adjusting an outer surface of the captured head data by a predetermined amount.

5. The method of claim 1, further comprising the steps of:
   providing a helmet shell; and
   installing the selected pre-manufactured pad within the helmet shell.

6. The method of claim 5, wherein the selected pre-manufactured pad is pre-compressed when the protective sports helmet is worn by the player, but prior to an impact being applied to said helmet.

7. The method of claim 1, further comprising the step of adding an identification device to the selected pre-manufactured pad.

8. The method of claim 7, wherein the step of adding the identification device to the selected pre-manufactured pad includes affixing a player identification badge to the selected pre-manufactured pad.

9. The method of claim 1, wherein said varying configurations of the same type of pre-manufactured pad include different overall dimensions of the same type of pre-manufactured pad, and wherein the same type of pre-manufactured pad is configured as one of a front pad or a rear pad to be installed in the protective sports helmet.

10. The method of claim 1, further comprising the step of forming a bespoke pad with a thickness based on: (i) a portion of the captured head data, and (ii) a helmet shell model.

11. The method of claim 1, wherein the design parameter of the protective sports helmet ensures that said helmet has greater impact protection in a rear region of said helmet.

12. The method of claim 1, wherein the design parameter of the protective sports helmet ensures that said helmet has greater impact protection in a front region of said helmet.

13. The method of claim 1, wherein the design parameter of the protective sports helmet is determined based upon based upon analysis of a generic data set of prior helmet impacts categorized by at least one of (i) player skill level and (ii) player position.

14. A method of assembling a protective sports helmet to be worn by a player while playing a sports activity, comprising:

providing a plurality of pre-manufactured pads, wherein each pre-manufactured pad within the plurality of pre-manufactured pads has a physical characteristic;

capturing head data from a player's head using a handheld electronic device;

selecting a pre-manufactured pad from the plurality of pre-manufactured pads based upon a comparison between: (i) the physical characteristic of the pre-manufactured pad, and (ii) the captured head data or data derived from the captured head data;

installing the pre-manufactured pad in a protective sports helmet; and, wherein an extent of the protective sports helmet is determined based upon an analysis of a generic data set of prior helmet impacts accounting for at least one of (i) player skill level and (ii) player position while playing a sports activity.

15. The method of claim 14, wherein the physical characteristic of the pre-manufactured pad is a thickness of the pre-manufactured pad.

16. The method of claim 14, wherein the physical characteristic of the pre-manufactured pad is a thickness of the pre-manufactured pad; and the step of comparing the physical characteristic of the pre-manufactured pad and data derived from the captured head data also includes comparing a reference dimension that extends from the captured head data to a helmet shell against the thickness of the pre-manufactured pad.

17. The method of claim 14, wherein the step of capturing head data from the player's head includes placing a scanning hood over an extent of the player's head.

18. The method of claim 14, further comprising the step of adjusting the position of the captured head data based on the player's playing position.

19. The method of claim 14, further comprising the step of inwardly adjusting an outer surface of the captured head data by a predetermined amount.

20. The method of claim 14, further comprising the steps of:

providing a helmet shell; and installing the selected pre-manufactured pad within the helmet shell.

21. The method of claim 20, wherein the selected pre-manufactured pad is pre-compressed when the protective sports helmet is worn by the player, but prior to an impact being applied to said helmet.

22. The method of claim 14, further comprising the step of adding an identification device to the selected pre-manufactured pad.

23. The method of claim 22, wherein the step of adding the identification device to the selected pre-manufactured pad includes affixing a player identification badge to the selected pre-manufactured pad.

24. The method of claim 22, wherein the step of adding the identification device to the selected pre-manufactured pad includes affixing a Radio Frequency Identification Device to the selected pre-manufactured pad.

25. The method of claim 14, further comprising the step of forming a bespoke pad with a thickness based on: (i) a portion of the captured head data, and (ii) a helmet shell model.

26. The method of claim 14, wherein said extent of the protective sports helmet includes the pre-manufactured pad that was selected and installed.

27. A method of assembling a protective sports helmet to be worn by a player while playing a sports activity, comprising:

providing a plurality of pre-manufactured pads, wherein each pre-manufactured pad within the plurality of pre-manufactured pads has a dimension;

capturing head data from a player's head using a handheld electronic device;

adjusting the position of the captured head data based on the player's playing position in the sports activity; and selecting a pre-manufactured pad from the plurality of pre-manufactured pads based upon a comparison between: (i) the dimension of the pre-manufactured pad, and (ii) the adjusted captured head data or data derived from the adjusted captured head data.

28. The method of claim 27, wherein the comparison between: (i) the dimension of the pre-manufactured pad, and (ii) the captured head data or data derived from the captured head data also includes comparing a reference dimension that extends from the captured head data to a helmet shell against the dimension of the of the pre-manufactured pad.

29. The method of claim 27, wherein the step of capturing head data from the player's head includes placing a scanning hood over an extent of the player's head.

30. The method of claim 27, further comprising the step of inwardly adjusting an outer surface of the captured head data by a predetermined amount.

31. The method of claim 27, further comprising the steps of:

providing a helmet shell; and installing the selected pre-manufactured pad within the helmet shell.

32. The method of claim 27, wherein the selected pre-manufactured pad is pre-compressed when the protective sports helmet is worn by the player, but prior to an impact being applied to said helmet.

33. The method of claim 27, further comprising the step of adding an identification device to the selected pre-manufactured pad.

34. The method of claim 33, wherein the step of adding the identification device to the selected pre-manufactured pad includes affixing a player identification badge to the selected pre-manufactured pad.

35. The method of claim 33, wherein the step of adding the identification device to the selected pre-manufactured pad includes affixing a Radio Frequency Identification Device to the selected pre-manufactured pad.

36. The method of claim 27, further comprising the step of forming a bespoke pad with a thickness based on: (i) a portion of the captured head data, and (ii) a helmet shell model.

37. The method of claim 27, further comprising:

installing the pre-manufactured pad in an extent of a protective sports helmet, wherein the extent of the protective sports helmet is determined based upon an analysis of a generic data set of prior helmet impacts accounting for at least one of (i) player skill level and (ii) player position while playing a sports activity.

38. The method of claim 27, further comprising:

installing the pre-manufactured pad in a protective sports helmet, wherein at least a portion of the pre-manufactured pad is determined based upon an analysis of a generic data set of prior helmet impacts accounting for at least one of (i) player skill level and (ii) player position while playing a sports activity.

39. The method of claim 27, further comprising:

installing the pre-manufactured pad in an energy attenuation assembly of a protective sports helmet, wherein at least a portion of the energy attenuation assembly is determined based upon an analysis of a generic data set of prior helmet impacts accounting for at least one of (i) player skill level and (ii) player position while playing a sports activity.

\*  \*  \*  \*  \*